US012780280B2

(12) United States Patent
Elden

(10) Patent No.: US 12,780,280 B2
(45) **Date of Patent: *Nov. 3, 2026**

(54) MOTORIZED COLLAPSIBLE CART

(71) Applicant: dbest products, Inc., Carson, CA (US)

(72) Inventor: Richard Elden, Manhattan Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/190,489

(22) Filed: Apr. 25, 2025

(65) Prior Publication Data

US 2026/0070595 A1 Mar. 12, 2026

Related U.S. Application Data

(63) Continuation of application No. 18/766,407, filed on Jul. 8, 2024, now Pat. No. 12,291,255, which is a continuation-in-part of application No. 18/161,677, filed on Jan. 30, 2023, which is a continuation-in-part of application No. 17/712,032, filed on Apr. 1, 2022, now Pat. No. 11,565,735, which is a continuation of application No. 17/143,116, filed on Jan. 6, 2021, now Pat. No. 11,338,835.

(60) Provisional application No. 63/633,163, filed on Apr. 12, 2024, provisional application No. 63/628,273, filed on Jul. 7, 2023, provisional application No.

(Continued)

(51) Int. Cl.
*B62B 3/02* (2006.01)
*B62B 5/00* (2006.01)

(52) U.S. Cl.
CPC .................................... *B62B 3/025* (2013.01)

(58) Field of Classification Search
CPC ........... B62B 3/007; B62B 3/025; B62B 3/02; B62B 5/0026; B62B 5/003; B62B 5/0013
See application file for complete search history.

(56) References Cited

U.S. PATENT DOCUMENTS

| | | | |
|---|---|---|---|
| 1,554,034 | A | 9/1925 | Richie |
| 2,132,069 | A | 10/1938 | Hall |

(Continued)

FOREIGN PATENT DOCUMENTS

| | | |
|---|---|---|
| CN | 303947734 | 11/2016 |
| CN | 206813544 U | 12/2017 |

(Continued)

OTHER PUBLICATIONS

Central District Court of California Case 2:23-cv-5982, Document 1, Complaint for Declaratory Judgment of Patent Invalidity; Tortious Interference; and Unfair Competition, dated Jul. 24, 2023, in 10 pages.

(Continued)

*Primary Examiner* — John D Walters
(74) *Attorney, Agent, or Firm* — Orbit IP, LLP

(57) ABSTRACT

A collapsible cart configured to convert from a collapsed position to an expanded position, the cart having opposing side walls and a bottom wall, and, in the expanded position, forming one or more open compartments which may be enclosed by a cover comprising one or more panels. The side walls may include one or more pairs of panels rotatably together connected at joints such that distal edges of each pair of panels are rotatable inwardly toward each other and a collapsed position or outwardly away from each other toward an expanded position. Also, disclosed is a motorized collapsible cart.

23 Claims, 48 Drawing Sheets

Related U.S. Application Data

62/995,375, filed on Jan. 27, 2020, provisional application No. 62/974,956, filed on Jan. 6, 2020.

(56) References Cited

U.S. PATENT DOCUMENTS

| | | | |
|---|---|---|---|
| 2,362,721 | A | 11/1944 | Reynolds |
| 2,514,849 | A | 7/1950 | Dewing |
| 2,564,939 | A | 8/1951 | Weast |
| 2,715,533 | A | 8/1955 | Strausburg |
| 2,742,973 | A | 4/1956 | Ingolf |
| 2,757,935 | A | 8/1956 | Sofia |
| 2,786,692 | A | 3/1957 | Jackson |
| 2,957,700 | A | 10/1960 | Beaurline |
| 3,041,026 | A | 6/1962 | Wilson |
| 3,092,395 | A | 6/1963 | Sol et al. |
| 3,135,527 | A | 6/1964 | Knapp |
| 3,276,786 | A | 10/1966 | Ward |
| 3,804,432 | A | 4/1974 | Lehrman |
| 3,981,410 | A | 9/1976 | Schurch |
| 4,202,521 | A | 5/1980 | Harding |
| 4,205,413 | A | 6/1980 | Collignon |
| 4,509,461 | A | 4/1985 | Peck |
| 4,662,532 | A | 5/1987 | Anderson et al. |
| D292,135 | S | 9/1987 | Grube et al. |
| 4,765,644 | A | 8/1988 | Bell |
| 4,765,646 | A | 8/1988 | Cheng |
| 4,852,520 | A | 8/1989 | Goetz |
| 4,887,837 | A | 12/1989 | Bonewicz, Jr. et al. |
| 4,977,857 | A | 12/1990 | Slawinski |
| 5,168,601 | A | 12/1992 | Liu |
| 5,197,754 | A | 3/1993 | Ward |
| 5,244,219 | A | 9/1993 | Hadlum |
| 5,289,933 | A | 3/1994 | Streich et al. |
| 5,294,158 | A | 3/1994 | Cheng |
| D352,145 | S | 11/1994 | Perez |
| 5,598,898 | A | 2/1997 | Mutoh et al. |
| 5,603,573 | A | 2/1997 | Mercier et al. |
| 5,651,791 | A | 7/1997 | Zavlodaver et al. |
| 5,653,194 | A | 8/1997 | Guy |
| 5,660,476 | A | 8/1997 | Decoster |
| 5,678,842 | A | 10/1997 | Hook et al. |
| 5,765,665 | A | 6/1998 | Cheng et al. |
| 5,884,982 | A | 3/1999 | Yemini |
| 5,918,474 | A | 7/1999 | Khanpara et al. |
| 5,988,671 | A | 11/1999 | Abelbeck et al. |
| 6,021,740 | A | 2/2000 | Martz |
| 6,076,485 | A | 6/2000 | Peeples et al. |
| 6,126,183 | A | 10/2000 | Lensing |
| 6,431,580 | B1 | 8/2002 | Kady |
| 6,561,524 | B1 | 5/2003 | Medina |
| 6,598,898 | B2 | 7/2003 | Chu |
| D477,916 | S | 8/2003 | Nykoluk |
| 6,601,859 | B2 | 8/2003 | Durham |
| 6,626,634 | B2 | 9/2003 | Hwang et al. |
| 6,651,791 | B1 | 11/2003 | Nykoluk et al. |
| 6,688,516 | B1 | 2/2004 | Ussen |
| 6,918,474 | B2 | 7/2005 | Nykoluk |
| 7,066,476 | B2 | 6/2006 | Elden |
| D525,758 | S | 7/2006 | Lynch |
| 7,140,635 | B2 | 11/2006 | Johnson et al. |
| 7,147,243 | B2 | 12/2006 | Kady |
| D545,025 | S | 6/2007 | Elden |
| 7,270,223 | B2 | 9/2007 | Miller |
| 7,316,407 | B1 | 1/2008 | Elden |
| D565,269 | S | 3/2008 | Tomasiak et al. |
| 7,458,451 | B2 | 12/2008 | Godshaw et al. |
| 7,600,618 | B2 | 10/2009 | Fenton et al. |
| 7,617,797 | B2 | 11/2009 | Lam |
| 7,631,575 | B2 | 12/2009 | Gard et al. |
| 7,731,221 | B2 | 6/2010 | Bess |
| 7,766,367 | B2 | 8/2010 | Dotsey et al. |
| 7,789,044 | B2 | 9/2010 | McGrade |
| 7,914,015 | B2 | 3/2011 | Tompkins |
| D642,764 | S | 8/2011 | Elden |
| 8,220,824 | B2 | 7/2012 | Chen et al. |
| 8,317,219 | B2 | 11/2012 | Bruce |
| 8,366,124 | B1 | 2/2013 | Caldwell |
| 8,439,374 | B1 | 5/2013 | Elden |
| 8,453,711 | B2 | 6/2013 | Hirschfeld |
| D690,893 | S | 10/2013 | O'Brien |
| 8,579,305 | B2 | 11/2013 | Hou |
| 8,641,059 | B2 | 2/2014 | Khodor et al. |
| 8,757,412 | B2 | 6/2014 | Sommer et al. |
| 8,915,504 | B1 | 12/2014 | Seibert |
| D723,237 | S | 2/2015 | Maddux et al. |
| 9,056,621 | B1 | 6/2015 | Jin et al. |
| 9,073,564 | B2 | 7/2015 | Yang et al. |
| 9,145,154 | B1 * | 9/2015 | Horowitz .............. B62B 5/0013 |
| 9,233,700 | B1 | 1/2016 | Elden |
| 9,278,775 | B2 | 3/2016 | Meers et al. |
| 9,382,035 | B2 | 7/2016 | Fritz |
| 9,392,766 | B1 | 7/2016 | Elden |
| 9,738,298 | B1 | 8/2017 | Yang et al. |
| 9,796,402 | B1 | 10/2017 | Suarez |
| 10,040,470 | B1 * | 8/2018 | Horowitz ................ B62B 3/102 |
| 10,232,867 | B1 | 3/2019 | Jones et al. |
| 10,246,115 | B2 | 4/2019 | Ryan |
| 10,562,556 | B1 * | 2/2020 | Horowitz ................ B62B 5/064 |
| 10,588,388 | B2 | 3/2020 | Kabalin |
| 10,676,235 | B1 | 6/2020 | Song et al. |
| D904,716 | S | 12/2020 | Shen |
| D906,229 | S | 12/2020 | Han |
| D930,314 | S | 9/2021 | Huang |
| D932,186 | S | 10/2021 | Brunner et al. |
| D942,107 | S | 1/2022 | Ren |
| 11,338,835 | B2 | 5/2022 | Elden |
| D975,953 | S | 1/2023 | Cohen et al. |
| 11,565,735 | B2 | 1/2023 | Elden |
| D984,077 | S | 4/2023 | Elden |
| D985,225 | S | 5/2023 | Elden |
| D1,000,833 | S | 10/2023 | Song |
| 11,845,484 | B2 | 12/2023 | Wercholuk |
| 11,851,097 | B2 * | 12/2023 | Chu ........................ B62B 5/067 |
| 11,912,326 | B2 | 2/2024 | Elden |
| 11,981,364 | B2 * | 5/2024 | Ma ............................ B62B 3/02 |
| 12,103,576 | B2 | 10/2024 | Elden |
| 12,151,731 | B2 * | 11/2024 | Gavin ................... B62B 5/0046 |
| D1,056,616 | S | 1/2025 | Dai |
| 12,202,532 | B2 | 1/2025 | Elden |
| D1,069,309 | S | 4/2025 | Elden |
| 12,275,446 | B2 | 4/2025 | Elden |
| 12,291,254 | B2 | 5/2025 | Elden |
| 12,291,255 | B2 | 5/2025 | Elden |
| 12,304,546 | B1 | 5/2025 | Elden |
| 2002/0050429 | A1 | 5/2002 | Nykoluk et al. |
| 2002/0089134 | A1 | 7/2002 | Salzberger et al. |
| 2002/0139628 | A1 | 10/2002 | Chang |
| 2002/0144874 | A1 | 10/2002 | Nykoluk et al. |
| 2002/0171228 | A1 | 11/2002 | Kady |
| 2003/0011173 | A1 | 1/2003 | Shall |
| 2004/0075248 | A1 | 4/2004 | Elden |
| 2004/0211635 | A1 | 10/2004 | Lu |
| 2005/0275195 | A1 | 12/2005 | Matula et al. |
| 2006/0278173 | A1 | 12/2006 | Kamijo |
| 2007/0215425 | A1 | 9/2007 | Slater |
| 2008/0203044 | A1 | 8/2008 | Elden |
| 2008/0238011 | A1 | 10/2008 | Hammel et al. |
| 2009/0145913 | A1 | 6/2009 | Panosian et al. |
| 2009/0205578 | A1 | 8/2009 | Alves |
| 2009/0212536 | A1 | 8/2009 | Tadeo |
| 2010/0026080 | A1 | 2/2010 | Colchiesqui |
| 2010/0175633 | A1 | 7/2010 | Krauss et al. |
| 2011/0056441 | A1 | 3/2011 | Chang |
| 2011/0197823 | A1 | 8/2011 | Pietra |
| 2012/0055122 | A1 | 3/2012 | Beauchamp |
| 2012/0274052 | A1 | 11/2012 | Zhu |
| 2013/0257009 | A1 | 10/2013 | Rogers |
| 2013/0320641 | A1 | 12/2013 | Zhang |
| 2015/0076143 | A1 | 3/2015 | Ryan |
| 2015/0360710 | A1 | 12/2015 | Thompson |
| 2017/0001654 | A1 | 1/2017 | Obrien |
| 2017/0120679 | A1 | 5/2017 | Naiva |
| 2017/0297601 | A1 | 10/2017 | Carbonaro |
| 2018/0014502 | A1 | 1/2018 | O'Shaughnessy |

(56) References Cited

U.S. PATENT DOCUMENTS

| | | | |
|---|---|---|---|
| 2019/0216193 A1 | 7/2019 | Kabalin | |
| 2019/0270545 A1 | 9/2019 | Apps et al. | |
| 2019/0322302 A1 | 10/2019 | Greenup | |
| 2020/0269898 A1 | 8/2020 | Frankel et al. | |
| 2021/0206414 A1 | 7/2021 | Elden | |
| 2022/0177018 A1* | 6/2022 | Parubrub | B62B 3/007 |
| 2024/0001979 A1 | 1/2024 | Elden | |
| 2024/0075973 A1* | 3/2024 | Lin | B62B 5/0036 |
| 2024/0132133 A1 | 4/2024 | Elden | |
| 2024/0326885 A1 | 10/2024 | Elden | |
| 2024/0351625 A1 | 10/2024 | Elden | |
| 2025/0187642 A1 | 6/2025 | Elden | |
| 2025/0236326 A1 | 7/2025 | Elden | |

FOREIGN PATENT DOCUMENTS

| | | |
|---|---|---|
| CN | 107668883 A | 2/2018 |
| CN | 207120985 U | 3/2018 |
| CN | 207191693 U | 4/2018 |
| CN | 304632396 | 5/2018 |
| CN | 207506081 U | 6/2018 |
| CN | 108328065 A | 7/2018 |
| CN | 207809426 | 9/2018 |
| CN | 208070260 U | 11/2018 |
| CN | 304926177 S | 12/2018 |
| CN | 305015819 S | 1/2019 |
| CN | 208915679 | 5/2019 |
| CN | 209177176 U | 7/2019 |
| CN | 210707487 | 6/2020 |
| CN | 210747711 U | 6/2020 |
| CN | 112918890 A | 6/2021 |
| CN | 214777508 U | 11/2021 |
| CN | 214987334 U | 12/2021 |
| CN | 215555681 | 1/2022 |
| CN | 215826756 | 2/2022 |
| CN | 116039741 | 5/2023 |
| CN | 116620376 | 8/2023 |
| CN | 219806849 | 10/2023 |
| CN | 220053845 | 11/2023 |
| CN | 220076407 | 11/2023 |
| CN | 220076458 | 11/2023 |
| CN | 220374545 | 1/2024 |
| CN | 220374551 | 1/2024 |
| CN | 118843580 | 10/2024 |
| CN | 222756644 | 4/2025 |
| DE | 9203114 U1 | 5/1992 |
| DE | 202020102798 U1 | 5/2020 |
| EP | 3318465 A1 | 5/2018 |
| FI | 128389 B | 4/2020 |
| GB | 2243198 A | 10/1991 |
| GB | 2349186 A | 10/2000 |
| TW | M576553 | 4/2019 |
| TW | M631749 | 9/2022 |
| WO | 2022121393 | 6/2022 |
| WO | 2024082970 | 4/2024 |
| WO | 2024120294 | 6/2024 |
| WO | 2024250461 | 12/2024 |
| WO | 2025011182 | 1/2025 |

OTHER PUBLICATIONS

Central District Court of California, Case 2:23-cv-5982, Document 27, Plaintiff's Counterclaims and Answer to Defendants' Counterclaims, dated Oct. 23, 2023, in 13 pages.

Central District Court of California, Case 2:24-cv-10694, Document 57, Third Amended Complaint for Declaratory Judgment and Other Relief, dated Jul. 18, 2025, in 37 pages.

Central District Court of California, Case 2:24-cv-10694, Document 59, Answer, Affirmative Defenses, and Counterclaims to Third Amended Complaint, with accompanying preliminary infringement claim charts, dated Jul. 22, 2025, in 155 pages.

Central District Court of California, Case 2:24-cv-10842, Document 21, Seespring's Second Amended Complaint, dated May 10, 2025, in 15 pages.

Central District Court of California, 2:24-cv-10961, Document 23, Aborder Products, Inc's Second Amended Complaint for Declaratory Judgment and Other Relief, with accompanying copy of Provisional Patent Application S.N. U.S. Appl. No. 63/577,068, dated May 6, 2025, in 28 pages.

Central District Court of California, Case 2:25-cv-350, Document 19, Second Amended Complaint for Declaratory Judgment, with accompanying non-infringement contentions, invalidity contentions, and alleged prior art references, dated May 2, 2025, submitted in parts A and B in 101 pages.

Central District Court of California, Case 2:25-cv-471, Document 23, First Amended Complaint for Damage and for Declaratory Judgment of Non-Infringement of U.S. Pat. No. 12,103,576, with accompanying alleged prior art disclosure claim charts, references, and search report documents, dated Apr. 18, 2025, submitted in parts A and B in 342 pages.

Central District Court of California, Case 2:25-cv-584, Document 21, First Amended Complaint for Damage and for Declaratory Judgment of Non-Infringement of U.S. Pat. No. 12,103,576, with accompanying alleged alleged prior art disclosure claim charts, references, and search report documents, dated Apr. 18, 2025, submitted in parts A and B in 339 pages.

Central District Court of California, Case 2:25-cv-2311, Document 1, Complaint for Declaratory Judgment of Patent Non-Infringement and Patent Invalidity, dated Mar. 14, 2025, in 19 pages.

Central District Court of California, Case 2:25-cv-4573, Document 16, Defendant's Answer to Plaintiff's Complaint, Affirmative Defenses, and Counterclaims, dated Jul. 10, 2025, in 46 pages.

Central District Court of California, Case 2:25-cv-4573, Document 17, Defendant and Counterclaimant's Application for Temporary Restraining Order and Order To Show Cause Why a Preliminary Injunction Should Not Issue, with accompanying alleged prior art references, invalidity claim charts, and non-infringement claim charts, dated Jul. 11, 2025, in 107 pages.

Central District Court of California, Case 2:25-cv-4573, Document 19, Civil Minutes, dated Jul. 11, 2025, in 3 pages.

Central District Court of California, Case 2:25-cv-4573, Document 21, Counterclaimant's Second Application for Temporary Restraining Order and Order To Show Cause Why a Preliminary Injunction Should Not Issue, with accompanying declaration and exhibit, dated Jul. 15, 2025, in 28 pages.

Central District Court of California, Case 2:25-cv-4573, Document 22, Plaintiff's Opposition to Defendant's Second Ex Parte Application for Temporary Restraining Order and Order To Show Cause Why a Preliminary Injunction Should Not Issue, with accompanying declaration and exhibit, dated Jul. 16, 2025, in 46 pages.

Central District Court of California, Case 2:25-cv-4573, Document 23, Civil Minutes, dated Jul. 17, 2025, in 4 pages.

Central District Court of California, Case 2:25-cv-4573, Document 24, Counterclaimant's Ex Parte Application for Reconsideration of Order Denying Second Ex Parte Application for Temporary Restraining Order, dated Jul. 23, 2025, in 23 pages.

Central District Court of California, Case 2:25-cv-4573, Document 26, Civil Minutes, dated Jul. 25, 2025, in 3 pages.

Central District Court of California, Case 2:25-cv-4573, Document 27, Counterclaimant's Motion for Preliminary Injunction, with accompanying alleged prior art references, invalidity claim charts, and non-infringement claim charts, dated Jul. 29, 2025, in 107 pages.

District Court of New Jersey, Civil Action No. 2:23-cv-2675, Document 4, First Amended Complaint, dated Jul. 17, 2023, in 5 pages.

Southern District Court of New York, Civil Action No. 1:25-cv-353, Document 7, Amended Complaint, dated Jan. 14, 2025, in 12 pages.

Southern District Court of New York, Civil Action No. 7:24-cv-10019, Document 24, Amended Complaint, dated Jun. 8, 2025, in 22 pages.

Southern District Court of New York, Civil Action No. 1:24-cv-10045, Document 22, Plaintiff Sanders Collection Inc's First Amended Complaint, with accompanying letter and alleged prior art references, dated Apr. 25, 2025, in 111 pages.

(56) References Cited

OTHER PUBLICATIONS

Western District Court of Washington, Case 2:24-cv-2043, Document 1, Complaint For Declaratory Judgment, with accompanying alleged prior art exhibits, dated Dec. 11, 2024, in 113 pages.
Western District Court of Washington, Case 2:25-cv-288, Document 1, Complaint for Declaratory Judgement, dated Feb. 13, 2025, in 10 pages.
Western District Court of Washington, Case 2:25-cv-370, Document 10, Complaint for Declaratory Judgment, with accompanying non-infringement claim charts, invalidity claim charts, and alleged prior art references, dated May 22, 2025, in 136 pages.
"Packster"TM flyer/advertisement by Direct Source International, LLC, copy filed in Central District Court of California, Case No. 2:07-cv-4895 on Dec 30, 2008, in 1 page.
Central District Court of California, 2:25-cv-4573, Document 40, Plaintiff's Opposition to Motion for a Preliminary Injunction, with accompanying declarations, asserted claims, preliminary infringement charts, and related materials, dated Aug. 22, 2025, in 242 pages.
District Court of New Jersey, Civil Action No. 2:24-cv-4523, Document 4, First Amended Complaint, dated Jul. 17, 2023, in 5 pages.
Central District Court of California 2:25-cv-4573, Document 56, Order Denying Motion for Preliminary Injunction, dated Sep. 15, 2025, in 18 pages.
Central District Court of California 2:25-cv-4573, Document 57, Answer to First Amended Counterclaim, dated Sep. 18, 2025, in 10 pages.
Central District Court of California 2:25-cv-4573, Document 32, Order Denying Ex Parte Application To Shorten Time for Hearing on Preliminary Injunction Motion, dated Aug. 5, 2025, in 2 pages.
Central District Court of California 2:25-cv-4573, Document 38, First Amended Counterclaim, dated Aug. 21, 2025, in 31 pages.
Central District Court of California 2:25-cv-4573, Document 47, Ex Parte Application for Order Striking Untimely Reply Evidence, Theories, and Arguments, or in the Alternative for Leave To File Sur-Reply, dated Sep. 4, 2025, in 37 pages.
Central District Court of California 2:25-cv-4573, Documents 42 to 45, Reply in Support of Motion for Preliminary Injunction, with supporting Yang and Bayramoglu Declarations and various exhibits, dated Aug. 29 and 30, 2025, in 100 pages.
Central District Court of California 2:25-cv-4573, Document 46, Zheng Declaration in Support of Reply re: Preliminary Injunction Motion, dated Aug. 30, 2025, in 7 pages.
Central District Court of California 2:25-cv-4573, Exhibit B to Zheng Declaration (Document 46)—purported printout of Amazon listing for Asin B003ES5TM4 Olympia Tools 85-404 Pack-N-Roll, dated Aug. 30, 2025, in 7 pages.
Central District Court of California 2:25-cv-4573, Exhibit C to Zheng Declaration (Document 46)—purported printout of Amazon listings for ASINs B003ES5TM4 and B000UZ0P7I, dated Aug. 30, 2025, in 25 pages.
Central District Court of California 2:25-cv-4573, Exhibit D to Zheng Declaration (Document 46)—purported printout of Amazon listing for Asin B0BYR7L319, dated Aug. 30, 2025, in 22 pages.
Central District Court of California 2:25-cv-4573, Exhibit E to Zheng Declaration (Document 46)—purported printout of Amazon Seller Central Selling Policies and Seller Code of Conduct, dated Aug. 30, 2025, in 5 pages.
Central District Court of California 2:25-cv-4573, Exhibit F to Zheng Declaration (Document 46)—purported printout of Amazon Seller Central Customer Product Reviews Policies, dated Aug. 30, 2025, in 6 pages.
Central District Court of California 2:25-cv-4573, Exhibit G to Zheng Declaration (Document 46)—purported printout of Amazon listings for ASIN B0FCCPWYTM, dated Aug. 30, 2025, in 9 pages.
Central District Court of California 2:24-cv-10694, Document 66, Motion for Judgment on the Pleadings as to All Inequitable Conduct Claims, dated Sep. 5, 2025, in 25 pages.
Central District Court of California 2:24-cv-10694, Document 67, Response to Motion for Judgment on the Pleadings, dated Sep. 19, 2025, in 28 pages.
Central District Court of California 2:24-cv-10694, Document 68, Reply in Support of Motion for Judgment on the Pleadings, dated Sep. 26, 2025, in 15 pages.
Central District Court of California 2:24-cv-10694, Preliminary Invalidity Contentions, with claim chart Exhibits D13-15, dated Sep. 15, 2025, in 394 pages.
Central District Court of California 2:24-cv-10694, Exhibit D1 to Preliminary Invalidity Contentions—purported printout of Amazon ASIN B07YFFPK7B listings, dated Sep. 15, 2025, in 17 pages.
Central District Court of California 2:24-cv-10694, Exhibit D2 to Preliminary Invalidity Contentions—purported printout of Amazon listing of Olympia Tools 85-015 cart, dated Sep. 15, 2025, in 15 pages.
Central District Court of California 2:24-cv-10694, first portion of Exhibit D3 to Preliminary Invalidity Contentions—purported printout of Amazon listing of dbest Quik Cart Sport, dated Sep. 15, 2025, in 13 pages.
Central District Court of California 2:24-cv-10694, second portion of Exhibit D3 to Preliminary Invalidity Contentions—records of U.S. Trademark Reg. No. 2797558 for QUIK CART, dated Sep. 15, 2025, in 7 pages.
Central District Court of California 2:24-cv-10694, Exhibit D4 to Preliminary Invalidity Contentions—purported printout of Amazon direct and archived ASIN B001QKGLZQ listings, dated Sep. 15, 2025, in 13 pages.
Central District Court of California 2:24-cv-10694, Exhibit D5 to Preliminary Invalidity Contentions—purported printout of Amazon direct and archived ASIN B0BN2ZCQ9C listings, dated Sep. 15, 2025, in 13 pages.
Central District Court of California 2:24-cv-10694, Exhibit D6 to Preliminary Invalidity Contentions—purported printout of Amazon direct and archived ASIN B07PG4BZYG listings, dated Sep. 15, 2025, in 26 pages.
Central District Court of California 2:24-cv-10694, Exhibit D11 to Preliminary Invalidity Contentions - purported printout of direct and archived Amazon ASIN B0B4FZWRVR listings, dated Sep. 15, 2025, in 25 pages.
Central District Court of California 2:24-cv-10694, Storage Cart Installation Manuals produced with Preliminary Invalidity Contentions, dated Sep. 15, 2025, in 11 pages.
Amazon.com, "Foldable Utility Cart Portable Rolling Crate Handcart Shopping Trolley Collapsible 4 Rotate Wheels with Durable Heavy Duty Plastic Telescoping Handle for Travel Shopping Moving Storage Office Use", Available online □ at: "https://www.amazon.com/Portable-Handcart-Telescoping-Collapsible-Shopping/dp/B08HT17X39?th=1 ", Retrieved on Sep. 6, 2023, 8 pages.
Amazon.com, Foldable Utility Cart Folding Portable Rolling Crate Handcart with Durable Heavy Duty Plastic Telescoping Handle Collapsible 4 Rotate Wheels for Travel Shopping Moving Luggage Office Use (Red), Available onl i ne at: "https://www. amazon.com/Fol dabl e-Portabl e-Handcart-T el escopi ng-col. lapsi bl e/dp/B07YFG4BW6/ref=sr_ 1_ 1 ?dchild=1&keywords=B07YFG4BW6 &qid=1627442148&sr=8-1 &th=1" Retrieved on Sep. 6, 2023, 9 pages.
Amazon.com, "Olympia Tools 85-015 Grand Folding Storage Rolling Cart with Telescopic Handle for Easy Transportation, Weight Capacity up to 150 Pounds", Available online at: "https://www.amazon.ca/Pack-NRoll-85-015-917-85-015-Portable-Capacity/dp/B076D9XG7T?th=1 ", Retrieved on Sep. 6, 2023, 7 pages.
Amazon.com, "Olympia Tool 85-010 Grand Pack-N-Roll Portable Tool Carrier, Black" Available online at: "https://web. archive.org/web/20150727103951 /http://www. amazon.com: 80/Olym pia-85-010-Pack-N-Rol I-Portable-Carrier/dp/ B000UZOP7I", Retrieved on Sep. 6, 2023, 5 pages.
Bed Bath and Beyond.com, "Folding Crate Cart in Grey", 2022, 9 pages.
Ebay.com, "Dbest Products Quik Cart Elite Stair Climber wheeled rolling crate", May 31, 2022, 4 pages, https://www.ebay. co m/itm/394062298897.

(56) References Cited

OTHER PUBLICATIONS

Global Industrial, "Olympia Tools Grand Pack-N-Roll® Rolling Folding Crate Cart 85-010-80 Lb. Capacity", Available online at: "https://www. globali ndustrial. com/p/pack-n-roll-grand-rol li ng-foldi ng-crate-cart-85-01 0", Retrieved on Sep. 6, 2023, 3 pages.
"Utility Carts", Web page <https://www.amazon.com/Foldable-Portable-Handcart-Telescoping-Collapsible/dp/B07YFG4BW6/ref=sr_ 1_ 1? dchild=I &keywords=B07YFG4BW6&qid=| 627442148 &sr=8-1 >, 16 pages, retrieved on Aug. 19, 2021.
Amazon.com "Felicon Selorss Foldable Utility Cart Folding Portable Rolling Crate Handcart with Durable Heavy Duty Plastic Telescoping Handle Collapsible 4 Rotate Wheels for Travel Shop Move Luggage Office(Black)" Available online at: "https://www.amazon.com/dp/B07YFFPK7B?th=1", retrieved on Jul. 17, 2025, 15 pages.
Amazon.com "Haixin Closet Organizers and Storage—Trunk Car Organizer with Lids and Doors, Dorm Room Essentials, 8.4 Gal Collapsible Stackable Storage Bins, Plastic, 3 Pack", Available online at "https://www.amazon.com/dp/BOB4FZWRVR?th=1", retrieved Jul. 17, 2025, 15 pages.
Amazon.com "dbest products Quik Cart Sport Collapsible Rolling Crate on Wheels for Teachers Tote Basket 80 lbs Capacity, Made from Heavy Duty Plastic Used as a Seat, Black", Available online at "https://www.amazon.com/dp/B0CFDCLJ3G?th=1", retrieved Jul. 17, 2025, 13 pages.
Amazon.com "Litheli Electric Utility Wagon Cart, 200L Capacity, 300 lbs Load, Foldable Heavy-Duty Design with All-Terrain Wheels, Variable Speed Drive & Battery Power for Camping, Beach, Garden & Shopping", Available online at https://www.amazon.com/dp/B0F9N88196?th=1.
Amazon.com "Electric Collapsible Garden Wagon Cart with Wheel, Rolling Foldable Metal Utility Wagon Carts, 100w Power and 300lb Capacity, Portable for Camping, Sports, Shopping, Groceries, Laundry", Available online at https://www.amazon.com/dp/B0D1XZV8KB?th=1.
Amazon.com "Landworks Utility Service Cart Wheelbarrow Power Wagon, Super Duty Electric 48V DC Li-Ion Battery Powered, 500 lbs Load & 1000+ Ibs Hauling Capacity, Farm & Garden Dump with Modular Cargo Bed"—Available online at https://www.amazon.com/dp/B07T3DTC7D.
Amazon.com "SuperHandy Electric-Assist Garden Cart—5.7 Cubic Ft Utility Wagon, 440lbs Load, All-Terrain 10in Wheels, Anti-Rust Steel Frame, Convertible Flatbed Design", Available online at https://www.amazon.com/dp/B0CDF95C8S?th=1.
Amazon.com "SuperHandy Utility Service Cart Power Wagon Wheelbarrow Electric 48V DC Li-Ion Powered 660Lbs Load and 1000Lbs+ Hauling Capacity Farm and Garden All Purpose Modular Cargo Bed", Available online at https://www.amazon.com/dp/B08FXFDR5G.
U.S. Appl. No. 62/995,375, filed Jan. 27, 2020, Elden, Richard.
U.S. Appl. No. 62/974,956, filed Jan. 6, 2020, Elden, Richard.
U.S. Appl. No. 63/551,851, filed Feb. 9, 2024, Elden, Richard.
U.S. Appl. No. 63/576,750, filed Mar. 6, 2023, Elden, Richard.
U.S. Appl. No. 63/577,068, filed Mar. 28, 2023, Elden, Richard.
U.S. Appl. No. 63/632,651, filed Apr. 11, 2024, Elden, Richard.
U.S. Appl. No. 63/633,163, filed Apr. 12, 2024, Elden, Richard.
U.S. Appl. No. 63/628,273, filed Jul. 7, 2023, Elden, Richard.
U.S. Appl. No. 63/642,331, filed May 3, 2024, Elden, Richard.
U.S. Appl. No. 63/678,609, filed Aug. 2, 2024, Elden, Richard.
U.S. Appl. No. 63/683,973, filed Aug. 16, 2024, Elden, Richard.
U.S. Appl. No. 63/642,354, filed May 3, 2024, Elden, Richard.
U.S. Appl. No. 63/648,294, filed May 16, 2024, Elden, Richard.
U.S. Appl. No. 63/659,889, filed Jun. 14, 2024, Elden, Richard.
U.S. Appl. No. 19/177,060, filed Apr. 11, 2025, Elden, Richard.
U.S. Appl. No. 18/759,664, filed Jun. 28, 2024, Elden, Richard.
U.S. Appl. No. 19/190,489, filed Apr. 25, 2025, Elden, Richard.
U.S. Appl. No. 18/161,677, filed Jan. 30, 2023, Elden, Richard.

* cited by examiner

MOTORIZED COLLAPSIBLE CART

RELATED APPLICATIONS

This application is a continuation of Ser. No. 18/766,407, filed on Jul. 8, 2024, which is a continuation-in-part which is a continuation of U.S. patent application Ser. No. 18/161,677, filed on Jan. 30, 2023, which is a continuation-in-part of U.S. patent application Ser. No. 17/712,032, filed on Apr. 1, 2022 and issued as U.S. Pat. No. 11,565,735 on Jan. 31, 2023, which is a continuation of U.S. patent application Ser. No. 17/143,116, filed on Jan. 6, 2021 and issued as U.S. Pat. No. 11,338,835 on May 24, 2022, which claims the benefit of the filing date of U.S. Provisional Patent Application Ser. No. 62/974,956, filed on Jan. 6, 2020, and U.S. Provisional Patent Application Ser. No. 62/995,375, filed on Jan. 27, 2020, the disclosures of each of which are incorporated herein by reference in their entirety. application Ser. No. 18/766,407, filed on Jul. 8, 2024 also claims the benefit of U.S. Provisional Patent Application Ser. No. 63/633,163, filed on Apr. 12, 2024, and of U.S. Provisional Patent Application Ser. No. 63/628,273, filed on Jul. 7, 2023, the benefit of each of which is claimed by this application and the disclosures of each of which are incorporated herein by reference in their entirety.

FIELD OF THE INVENTION

This application relates to collapsible carts, and more particularly, to collapsible carts capable of folding up for convenient storage, including accordion-style collapsible carts and motorized collapsible carts.

DESCRIPTION OF THE RELATED ART

Collapsible carts have been widely used in household and commercial settings. They provide a convenient way to transport objects when needed, but can be folded or collapsed for storage.

The following patents and published applications are representative prior art: 1. U.S. Pat. No. 2,564,939 issued to Louis S. Weast on Aug. 21, 1951 for "Foldable Shopping Cart"; 2. U.S. Pat. No. 2,786,692 issued to Anne Jackson Timpson on Mar. 26, 1957 for "Collapsible Cart"; 3. U.S. Pat. No. 3,092,395 issued to Sol Mitty et al. on Jun. 4, 1963 for "Corrugated Shopping Cart and Parts"; 4. U.S. Pat. No. 3,135,527 issued to Philip B. Knapp on Jun. 2, 1964 for "Wheeled Market Carts"; 5. U.S. Pat. No. Des. 292,135 issued to John W. Grube et al. on Sep. 29, 1987 for "Collapsible Cart"; 6. U.S. Pat. No. 4,765,644 issued to Laurence G. Bell on Aug. 23, 1988 for "Foldable Cart"; 7. U.S. Pat. No. 4,765,646 issued to Karen Cheng on Aug. 23, 1988 for "Collapsible Shopping Cart"; 8. U.S. Pat. No. 5,197,754 issued to Lyla B. Ward on Mar. 30, 1993 for "Collapsible Beach Cart"; 9. U.S. Pat. No. 5,244,219 issued to Sidney R. Hadlum on Sep. 14, 1993 for "Hand Held Carrier"; 10. U.S. Pat. No. 5,988,671 issued to Kevin G. Abelbeck et al. on Nov. 23, 1999 for "Collapsible Cart"; 11. United States Published Patent Application No. 2002/0050429 to Cory O. Nykoluk et al. on May 2, 2002 for "Pivotal Handle for Towable Baggage"; 12. United States Published Patent Application No. 2002/0139628 to Wen-Cheng Chang on Oct. 3, 2002 for "Retractable Handle Assembly"; 13. United States Published Patent Application No. 2002/0144874 to Cory O. Nykoluk et al. on Oct. 10, 2002 for "Pivotal Handle for Towable Baggage"; 14. U.S. Pat. No. 6,598,898 issued to Yong S. Chu on Jul. 29, 2003 for "Folding Cart"; 15. U.S. Pat. No. D477,916 issued to Cory O. Nykoluk on Aug. 5, 2003 for "Towing Member For a Piece of Baggage"; 16. U.S. Pat. No. 6,651,791 issued to Cory O. Nykoluk et al. on Nov. 25, 2003 for "Pivotal Handle for Towable Baggage"; 17. United States Published Patent Application No. 2004/0211635 to Chen-Tien Lu on Oct. 28, 2004 for "Apparatus for Mounting Telescopic Handle on Trunk"; 18. U.S. Pat. No. 6,918,474 issued to Cory O. Nykoluk on Jul. 19, 2005 for "Towable Wheeled Backpack"; 19. United States Published Patent Application No. 2009/0212536 to Maria I. Tadeo on Aug. 27, 2009 for "Collapsible Rolling Tote Bag"; 20. U.S. Pat. No. 7,731,221 issued to Suzan L. Bess on Jun. 8, 2010 for "Collapsible and Portable Wheeled Dolly Particularly Suitable for Use by Students or Others in the Transport of Items"; 21. U.S. Pat. No. 7,066,476 issued to Richard Elden on Jun. 27, 2006 for "Side Attachable Cover/Seat for a Cart Carrying Box"; 22. U.S. Pat. No. 7,147,243 issued to Darren Kady on Dec. 12, 2006 for "Accessories for a Collapsible Rolling Caddy"; and 23. U.S. Pat. No. 8,439,374 issued to Richard Elden on May 14, 2013 for "Lightweight High Load Capacity Folding Utility Cart with Unique Support Structure and Ergonomic Handle."

SUMMARY

Embodiments of the present disclosure include a collapsible cart that has a top, a bottom, a front, a rear, and left and right sides, and which is convertible between a collapsed position and an expanded position wherein the cart forms one or more interior compartments suitable for holding items. The cart may comprise front and rear walls each having top, bottom, left, and right edges, and left and right walls each having top, bottom, front, and rear edges. A front left corner joint may rotatably connect the front edge of the left wall to the left edge of the front wall; a front right corner joint may rotatably connect the front edge of the right wall to the right edge of the front wall; a rear left corner joint may rotatably connect the rear edge of the left wall to the left edge of the rear wall; and a rear right corner joint may rotatably connect the rear edge of the right wall to the right edge of the rear wall. The cart may further comprise a bottom wall, which may comprise one or more (for example, two) panels connectable to the cart at the bottom of the cart when the cart is in the expanded position.

In some embodiments, left wall and right walls of a collapsible cart may each comprise one or more (for example, two) collapsible portions, each collapsible portion having a pair of panels with a joint rotatably connecting the proximate edges of the pair of panels to each other so that the edges of the pair of panels distal from the joint can be rotated inwardly toward, or outwardly away from, each other at the joint. In some embodiments, each of the two side walls may further comprise one or more interstitial members each connecting together an opposing pair of collapsible portions, at a respective pair of joints.

In some embodiments, a collapsible cart may also comprise one or more (for example, two) cover panels each connectable to the cart so as to enclose one or more interior compartments formed by the cart when the cart is in the expanded position.

In some embodiments, bottom wall panels and/or cover panels (if present) of a collapsible cart may further be adapted to reside in or on the cart while the cart is in the collapsed (or a partly-expanded) position; such adapted cover panels in some embodiments may further be adapted to selectively (at a user's discretion, as desired) be left or otherwise placed in the cart even while the cart is in the expanded position, so as to partition the space between the front wall and the rear wall of the cart into multiple compartments (for example, two) instead of a single combined compartment.

In some embodiments, a collapsible cart may include a plurality of wheel assemblies on the bottom of the cart, and in some embodiments, such wheel assemblies may be adapted to include a braking mechanism.

In some embodiments, a collapsible cart may comprise means for selectively holding the cart securely in a collapsed position, such as one or more clips. In some embodiments, a collapsible cart may comprise means for selectively holding the cart securely in an expanded position, such as one or more slidable members each on a track.

In some embodiments, a collapsible cart may comprise a handle connected to (e.g., the rear of) the cart, which handle may be pivotally connected to the cart and include means for disengaging the handle from the cart to allow one end of the handle to pivot outwardly away from the cart; and/or in some embodiments, the handle may be telescoping and include means for securing the handle in a selected position of extension.

In some embodiments, a collapsible cart may be motorized and comprise a battery-powered electric motor drivably-connected to one or more wheel assemblies. Such a motorized collapsible cart may have rigid or soft sides or a combination of rigid and soft sides, and in some embodiments may include a handle that is operably connected to one or more steerable wheel assemblies and/or incorporates manual controls governing steering and/or power.

Each of the foregoing various aspects, together with those set forth in the claims and described in connection with the embodiments summarized above and disclosed herein may be combined to form claims for a device, apparatus, system, methods of manufacture and/or use in any way consistent with the present disclosure.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

DETAILED DESCRIPTION

Figure 1:
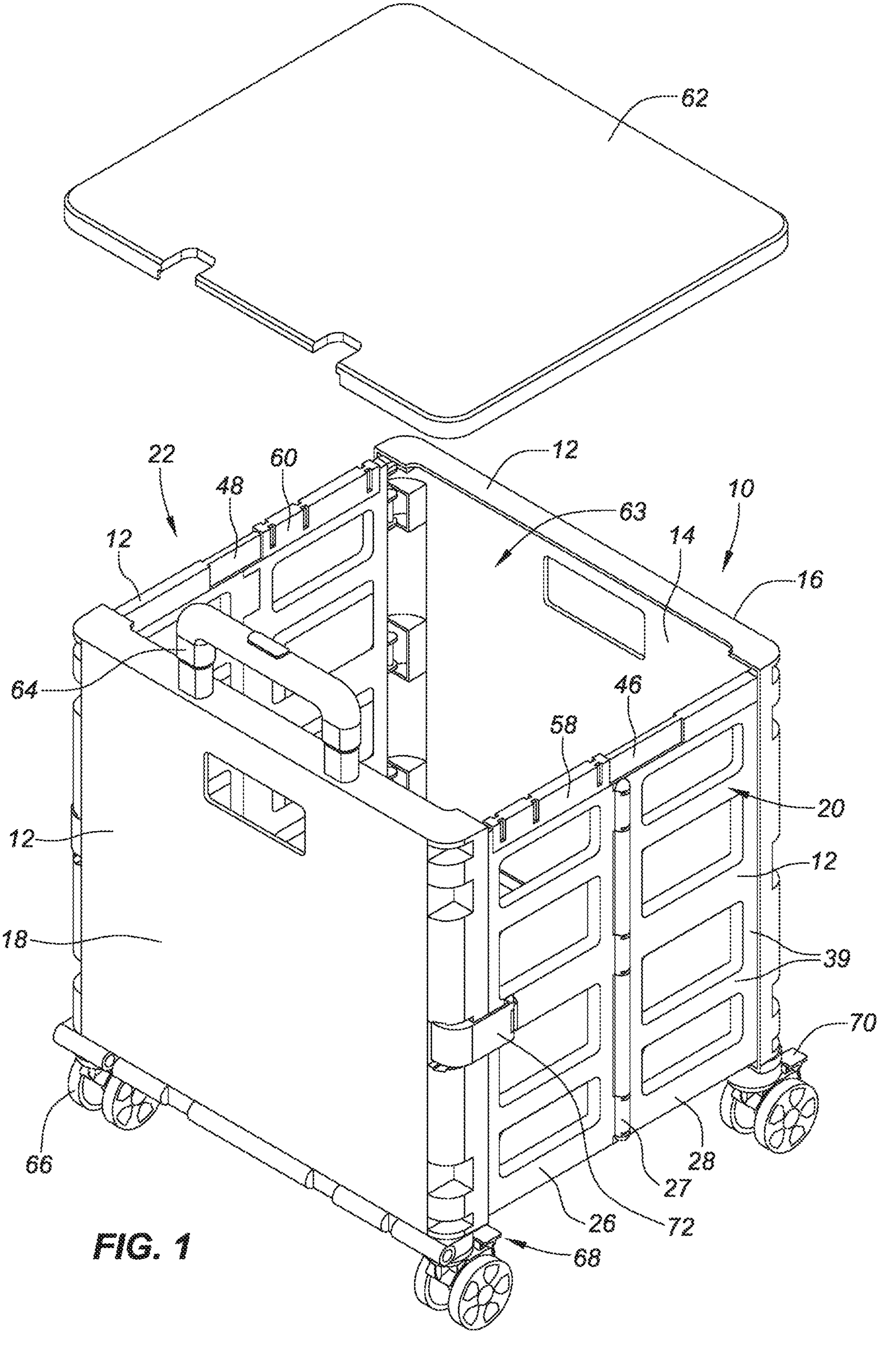
FIG. 1 is a perspective view of a collapsible cart illustrated in an open condition, according to an embodiment.
Figure 2:
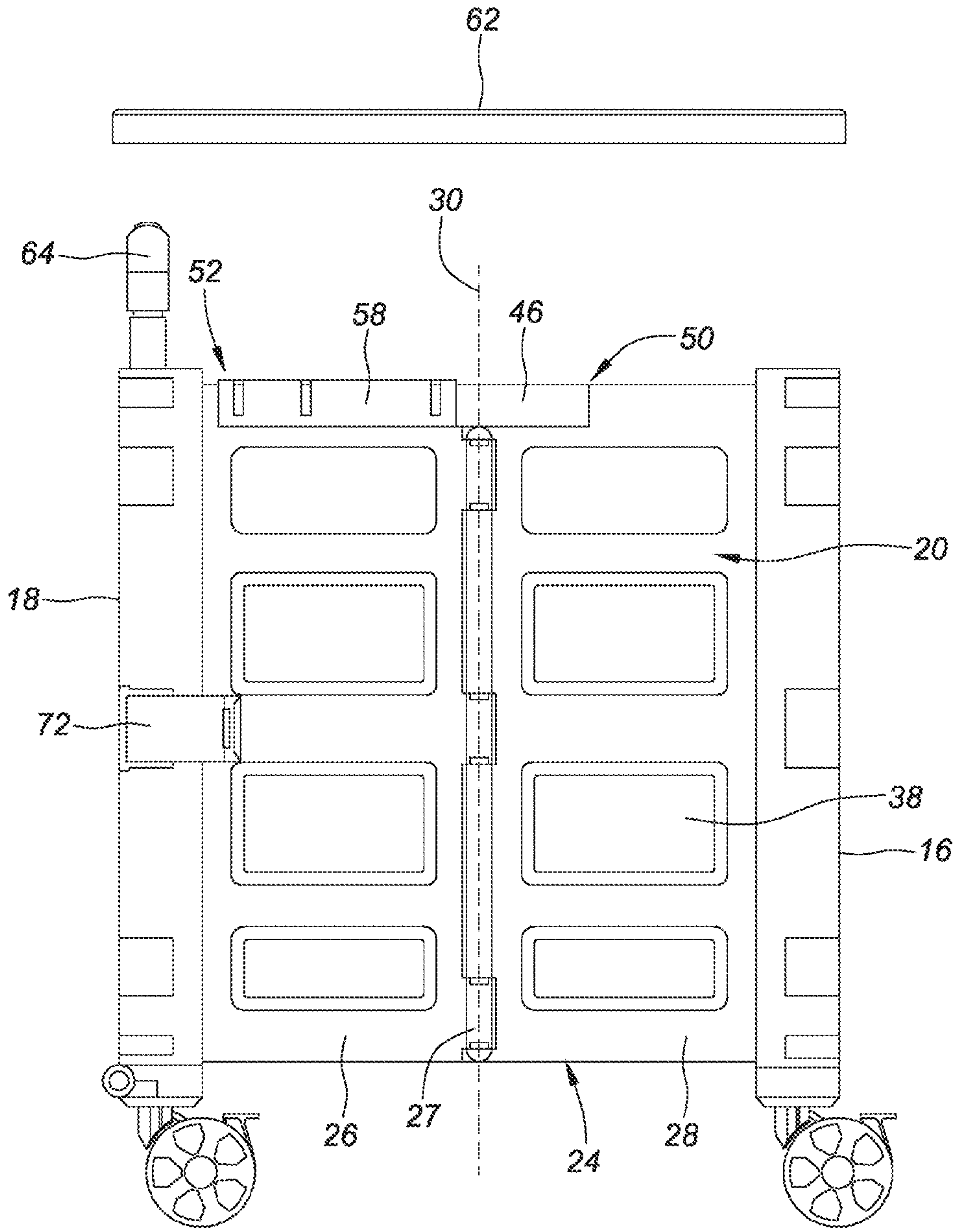
FIG. 2 is a right-side view of the collapsible cart of FIG. 1, according to an embodiment.
Figure 3:
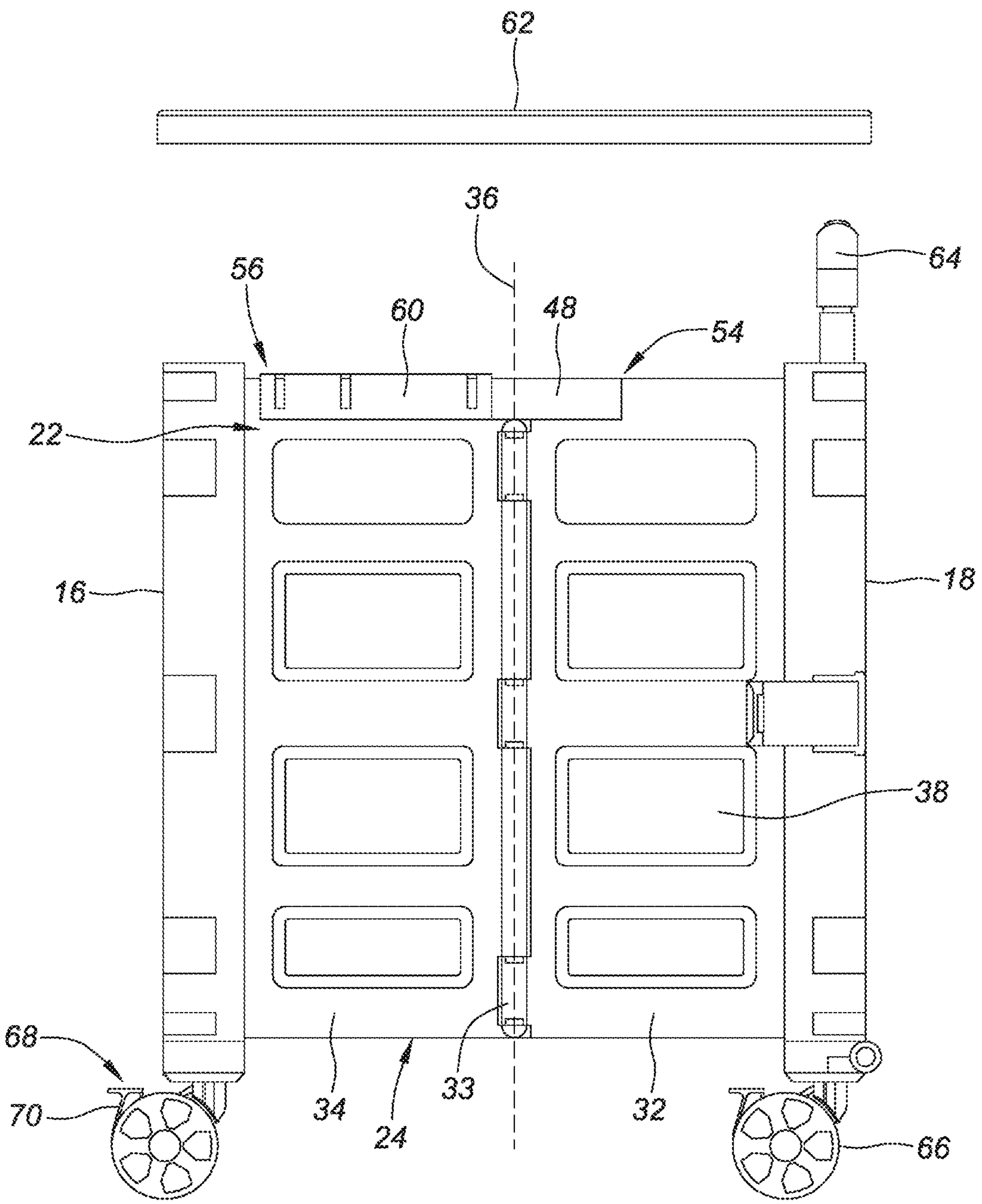
FIG. 3 is a left-side view of the collapsible cart of FIG. 1, according to an embodiment.
Figure 4:
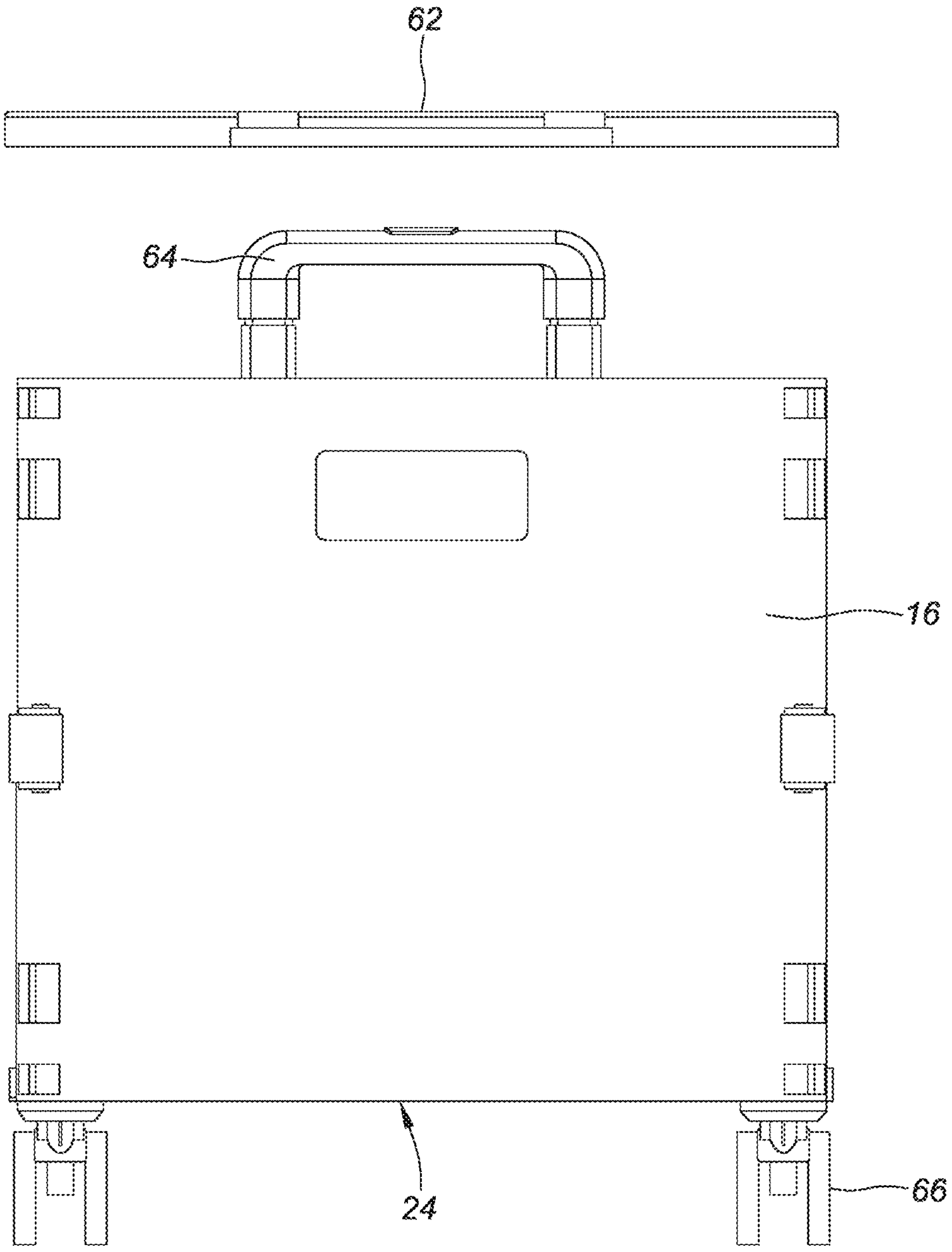
FIG. 4 is a front plan view of the collapsible cart of FIG. 1, according to an embodiment.
Figure 5:
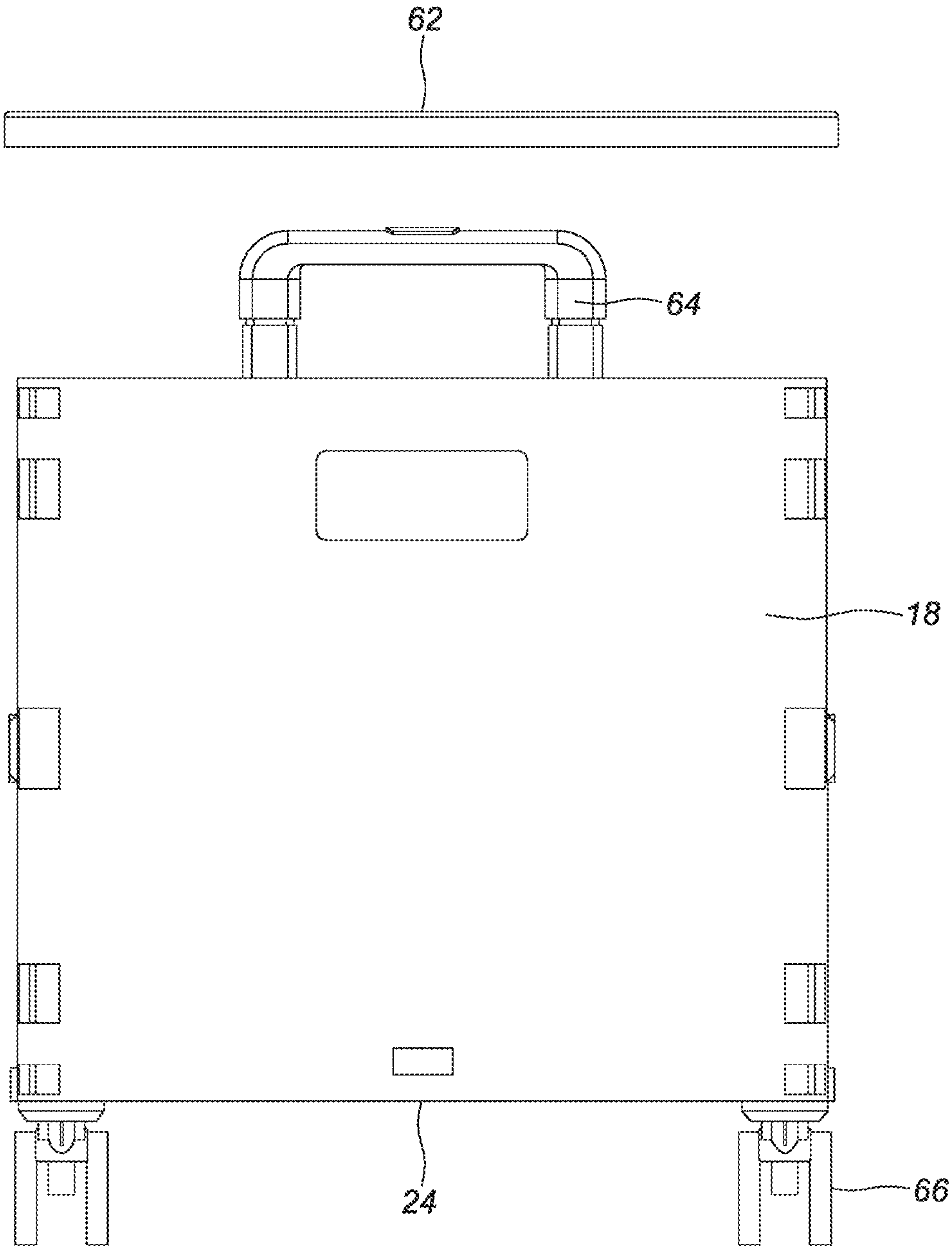
FIG. 5 is a rear plan view of the collapsible cart of FIG. 1, according to an embodiment.
Figure 6:
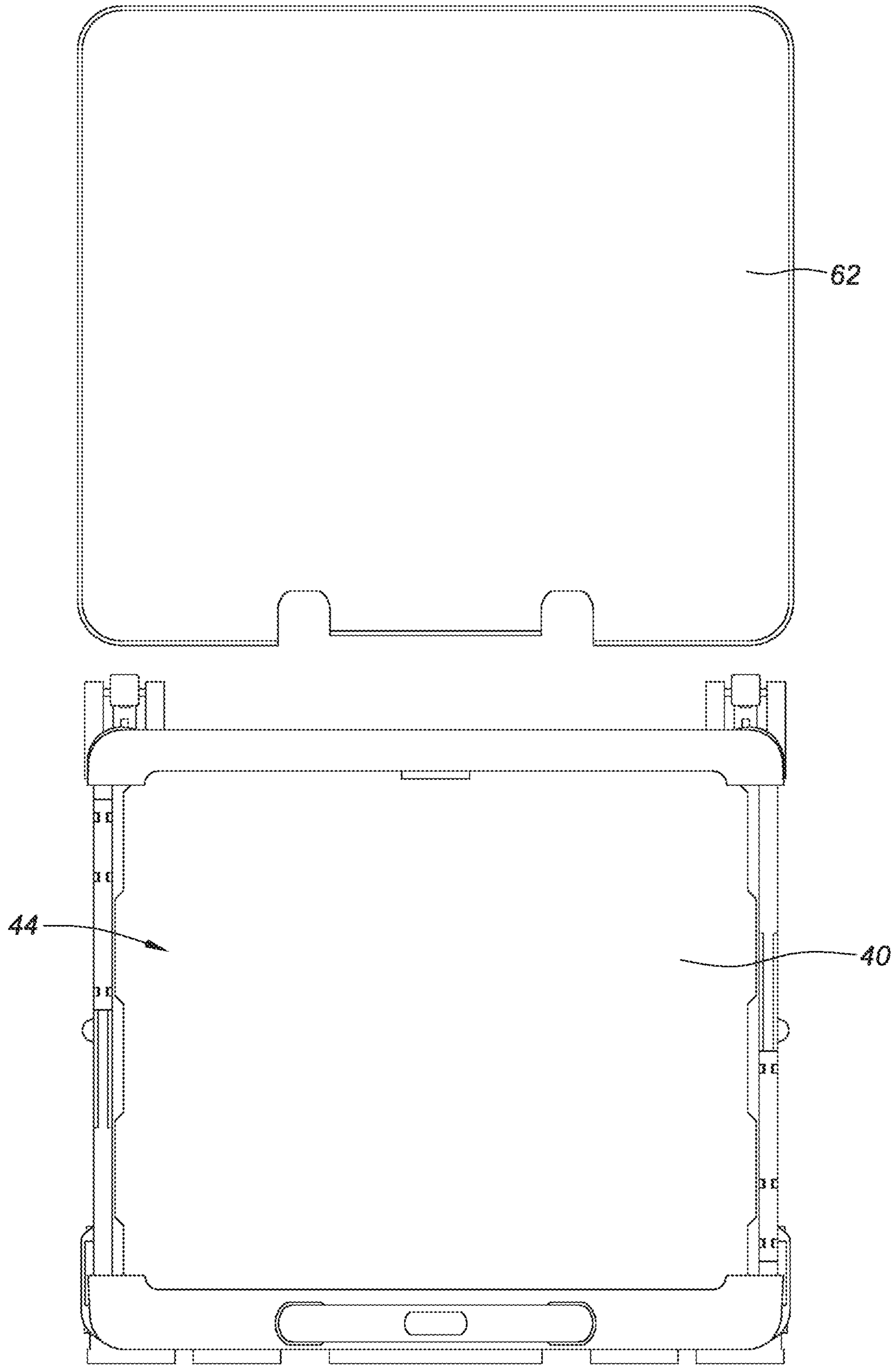
FIG. 6 is a top view of the collapsible cart of FIG. 1, according to an embodiment.
Figure 7:
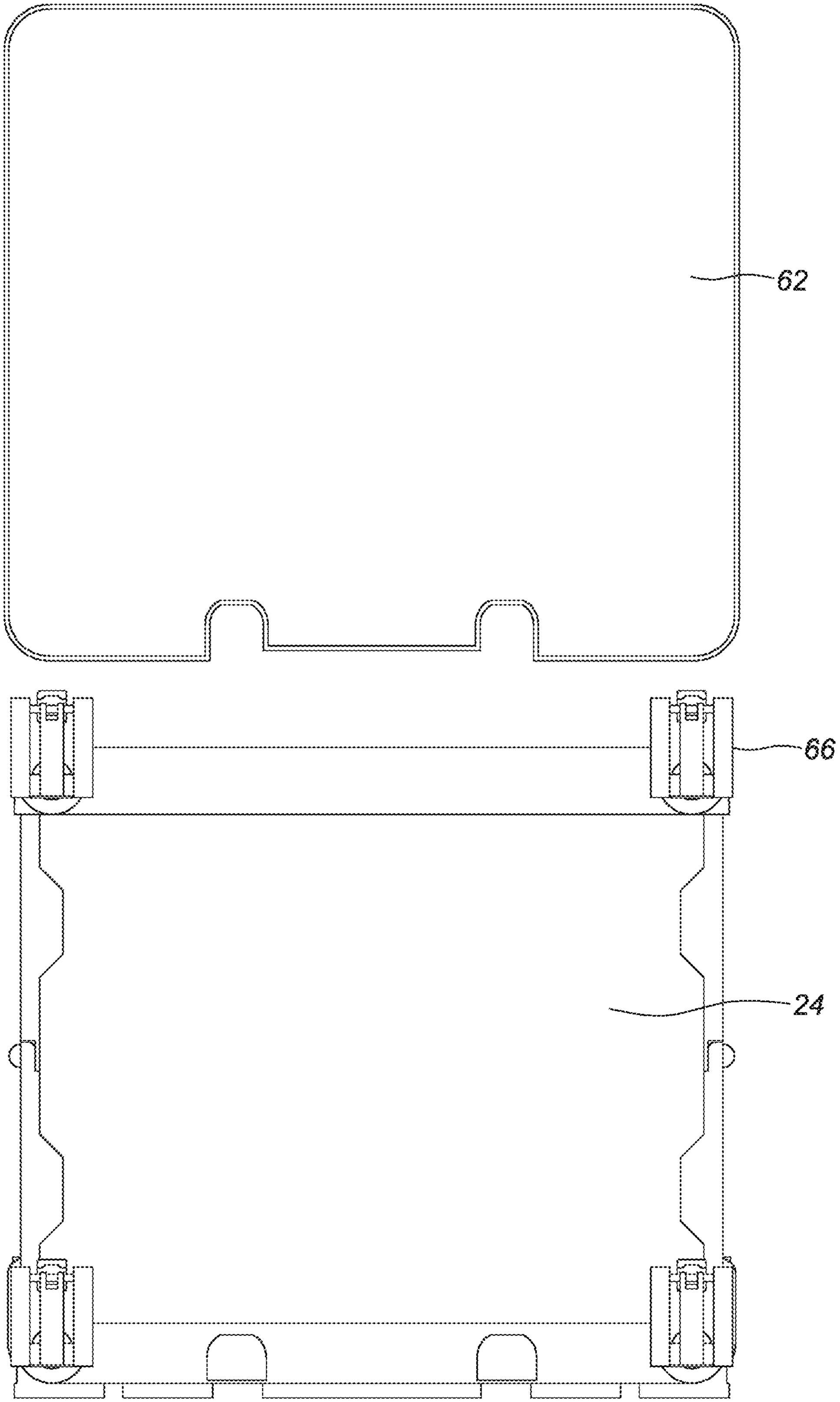
FIG. 7 is a bottom view of the collapsible cart of FIG. 1, according to an embodiment.
Figure 8:
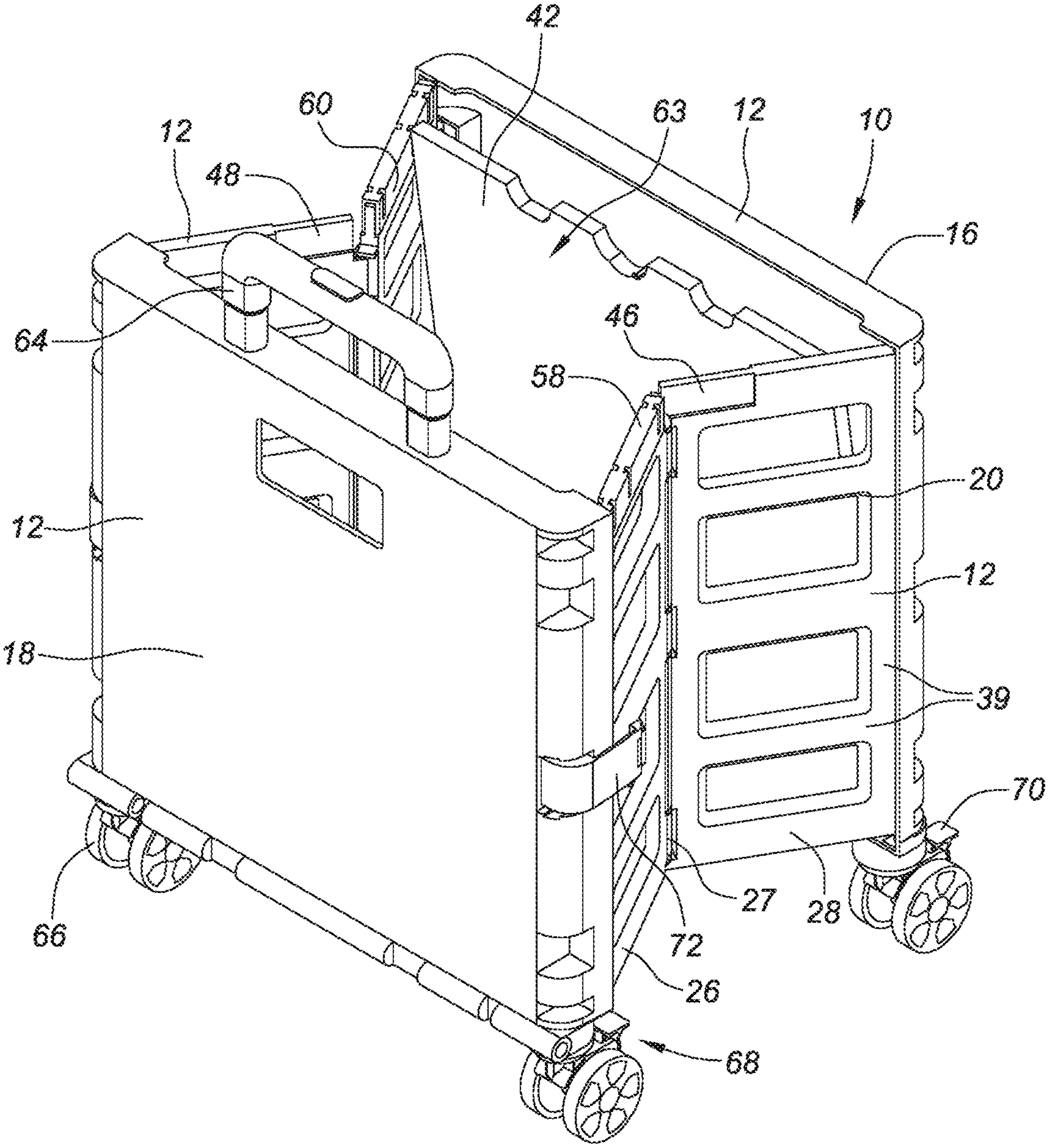
FIG. 8 is a perspective view of the collapsible cart of FIG. 1 illustrated with the sidewalls folded inwardly, according to an embodiment.
Figure 9:
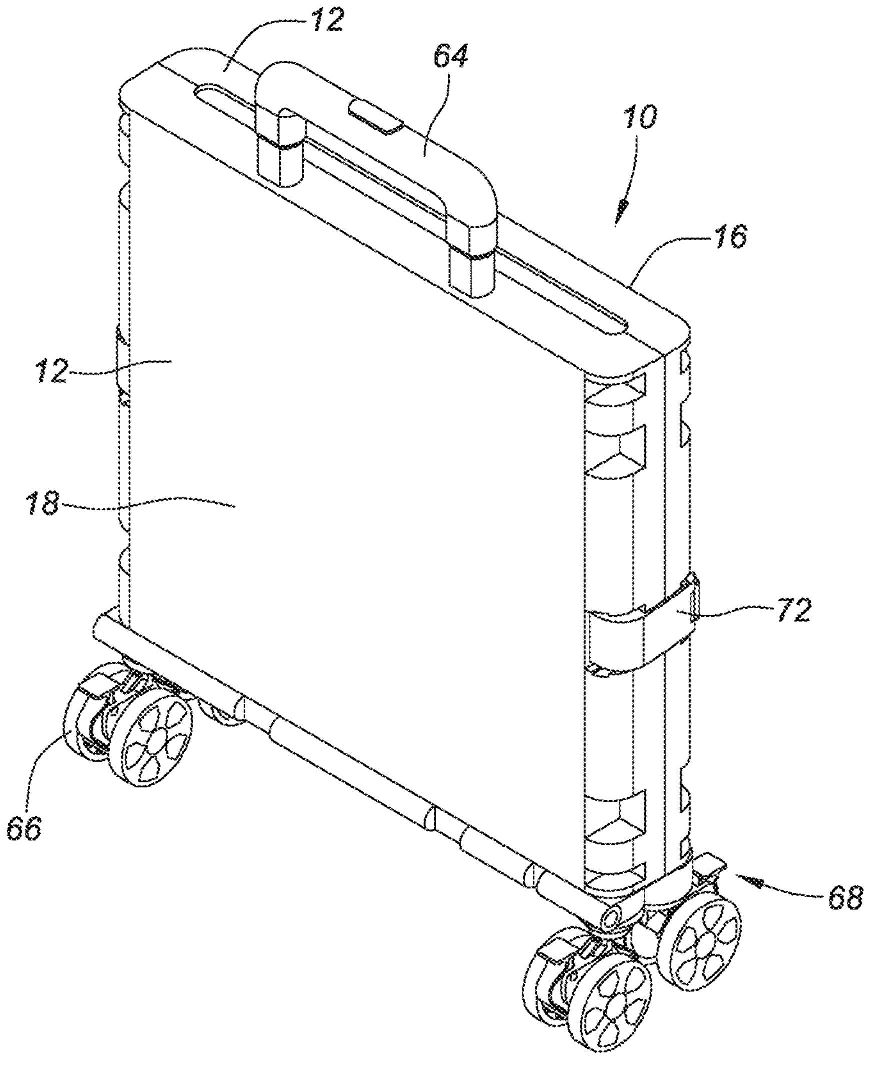
FIG. 9 is a perspective view of the collapsible cart of FIG. 1 illustrated in a closed condition, according to an embodiment.
Figure 10:
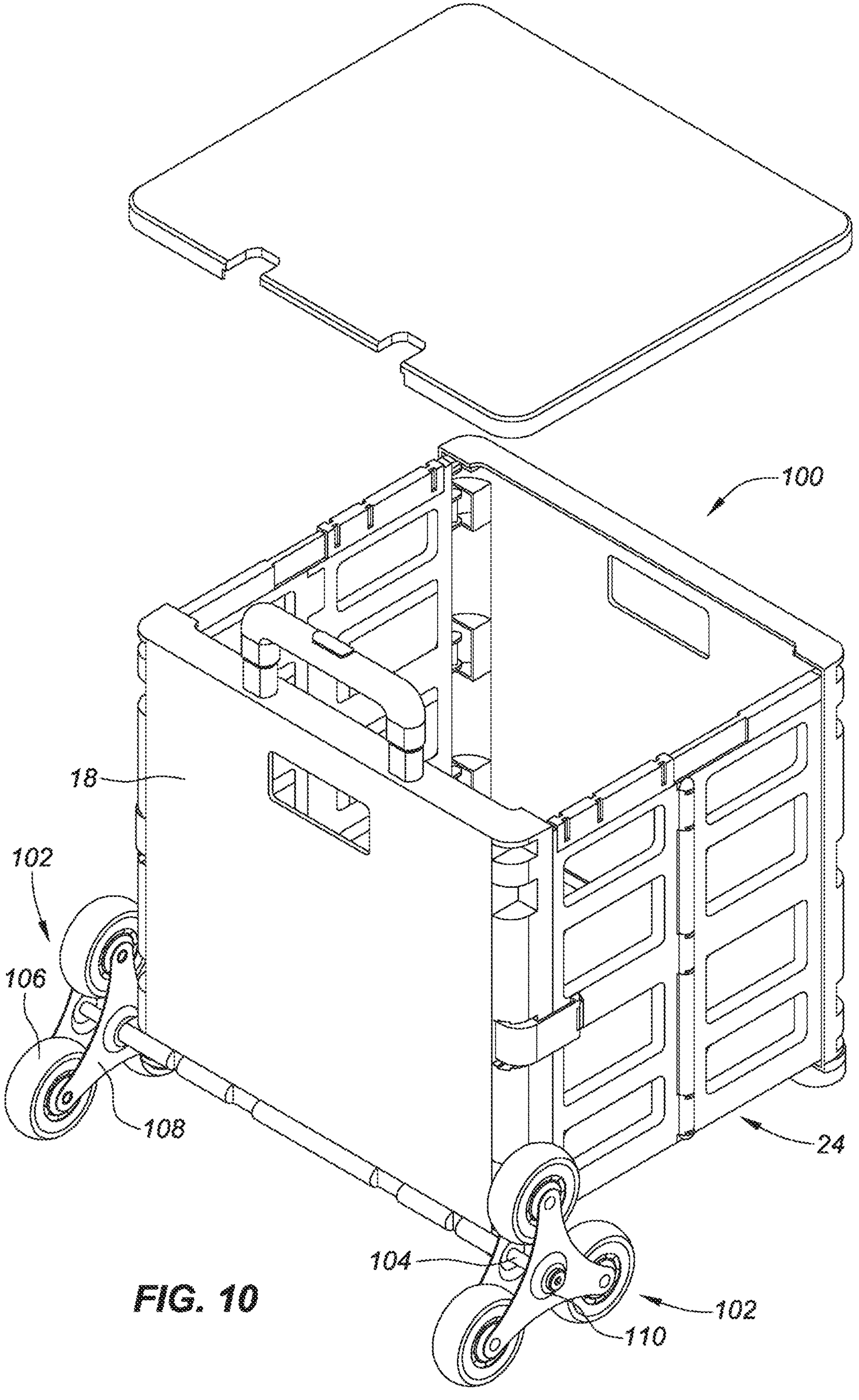
FIG. 10 is a perspective view of a collapsible cart illustrated in an open condition, according to an embodiment.
Figure 11:
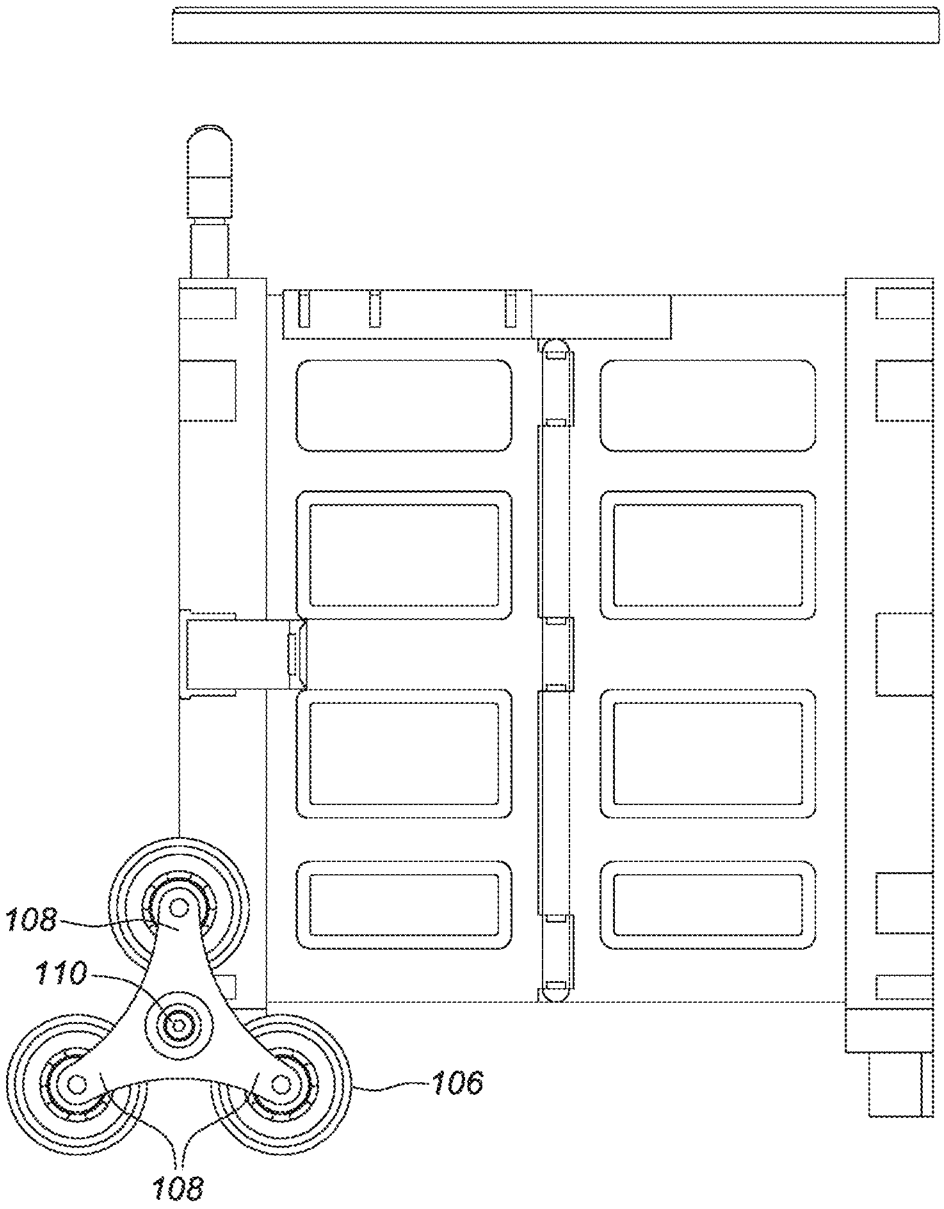
FIG. 11 is a right-side view of the collapsible cart of FIG. 10, according to an embodiment.
Figure 12:
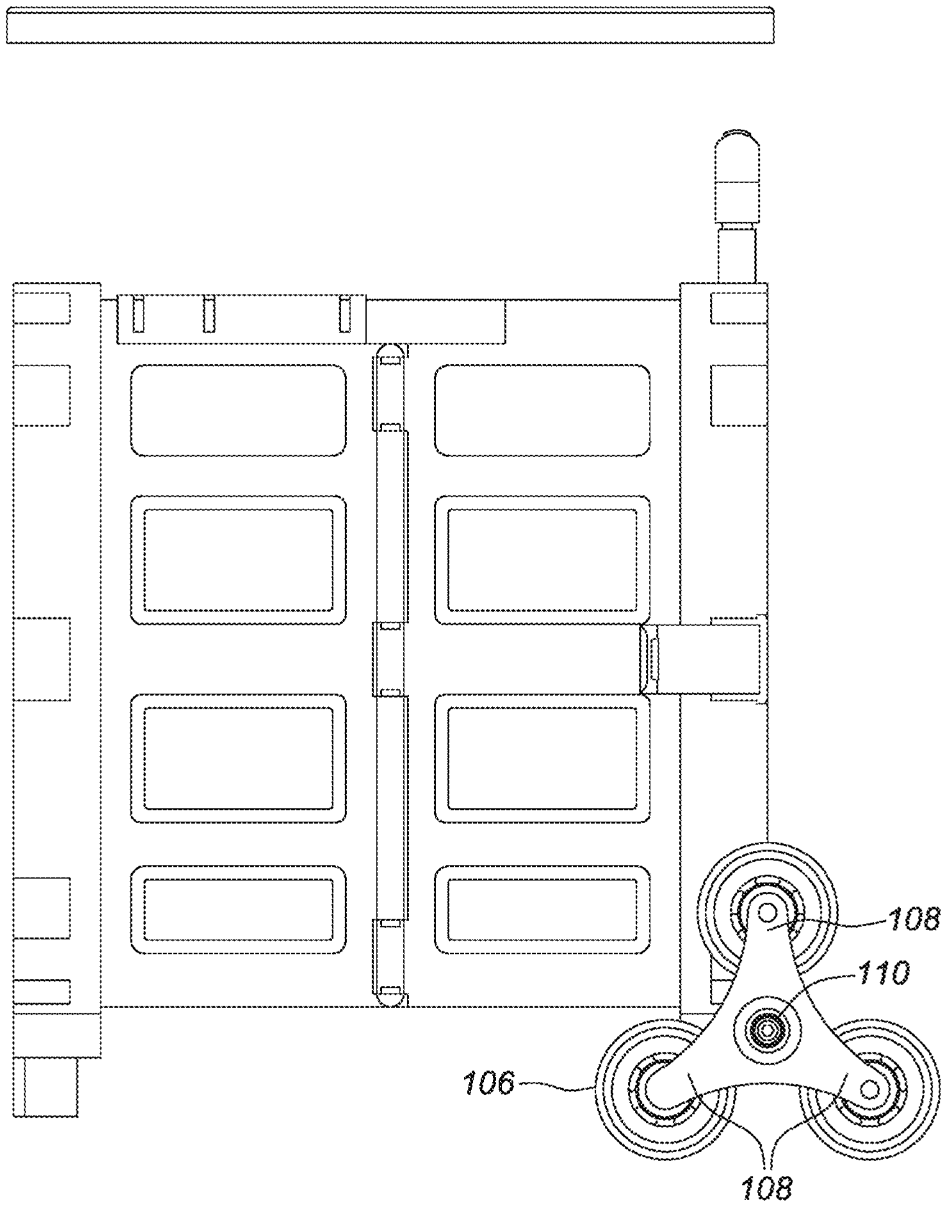
FIG. 12 is a left-side view of the collapsible cart of FIG. 10, according to an embodiment.
Figure 13:
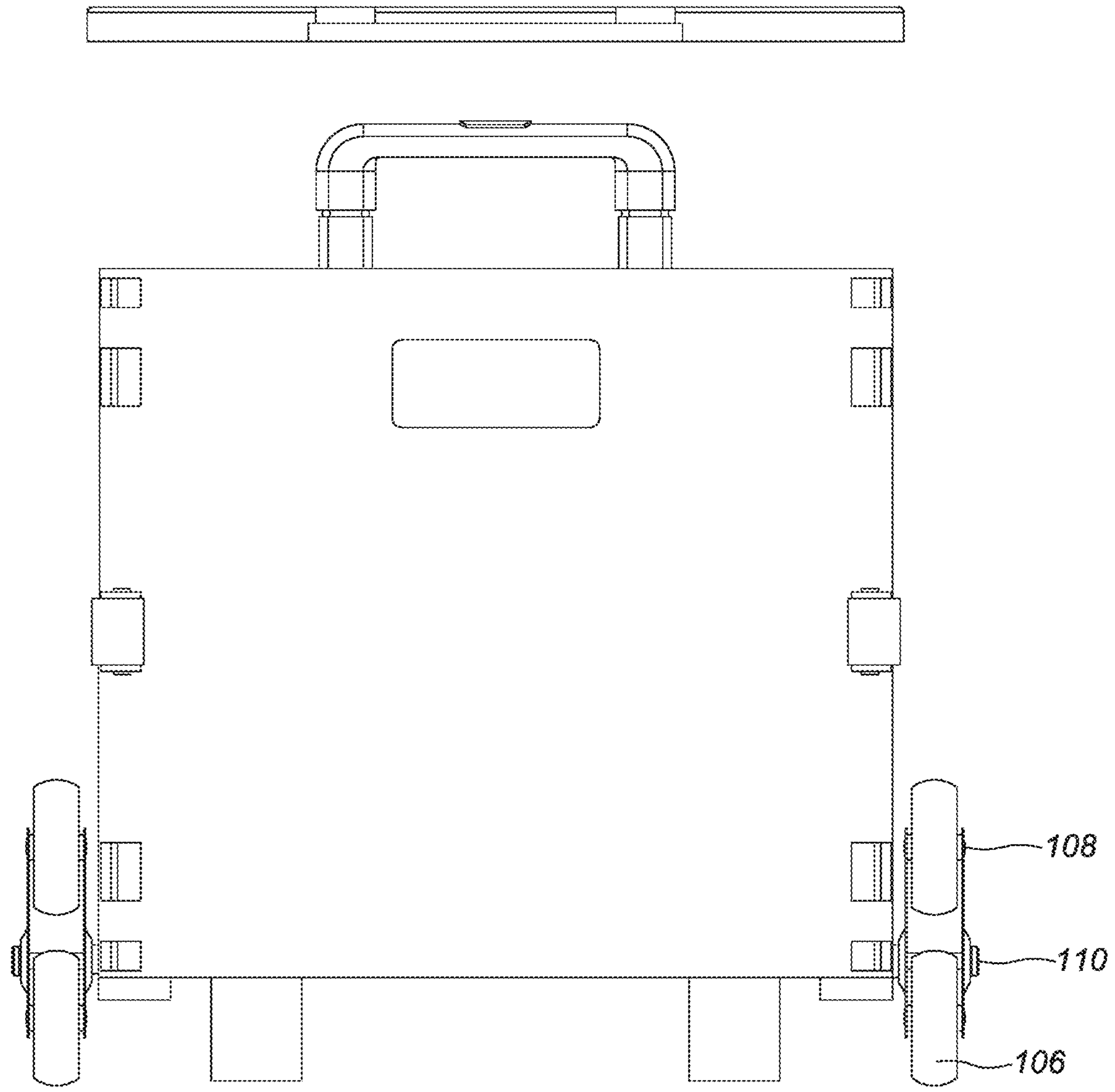
FIG. 13 is a front plan view of the collapsible cart of FIG. 10, according to an embodiment.
Figure 14:
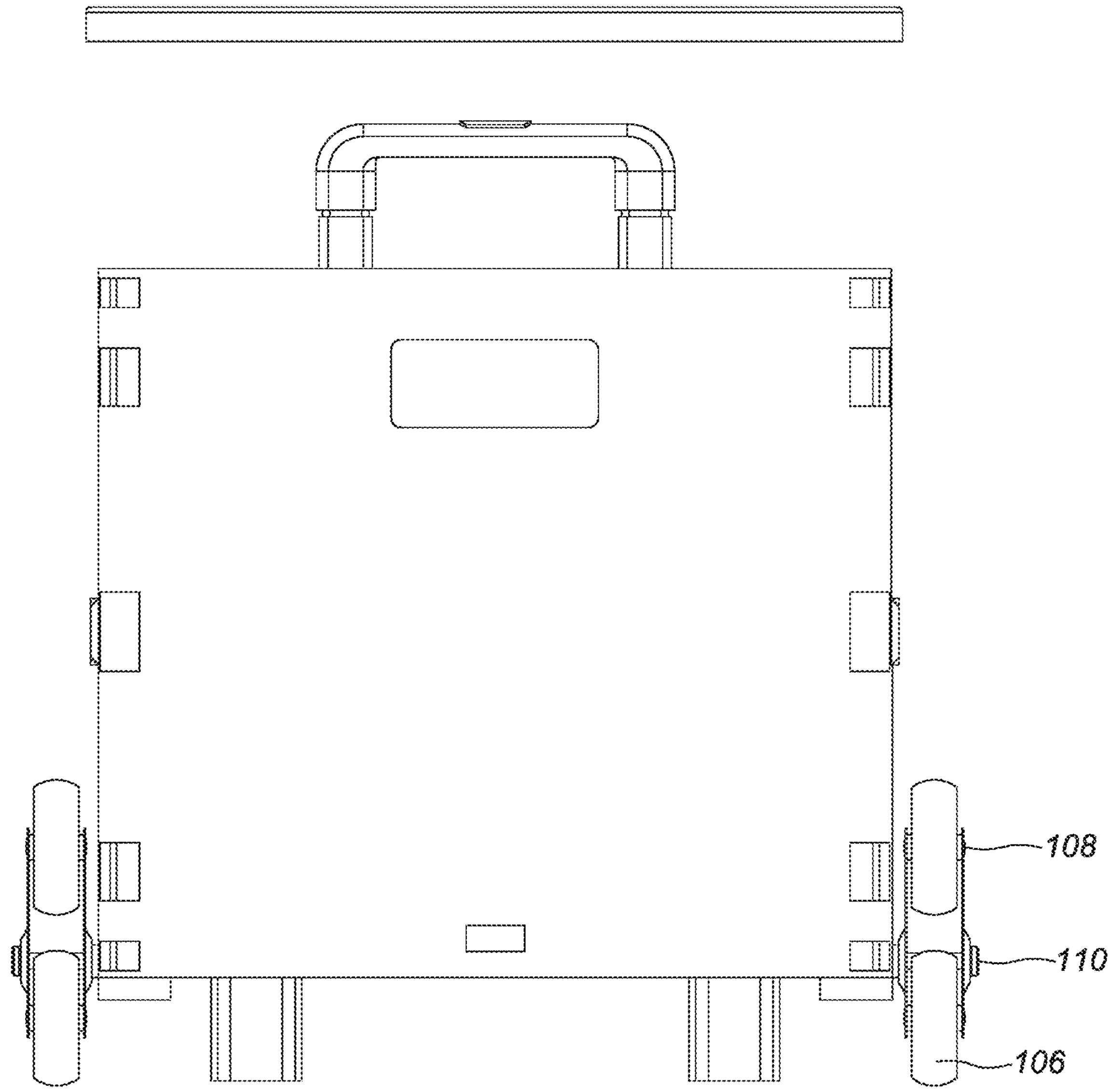
FIG. 14 is a rear plan view of the collapsible cart of FIG. 10, according to an embodiment.
Figure 15:
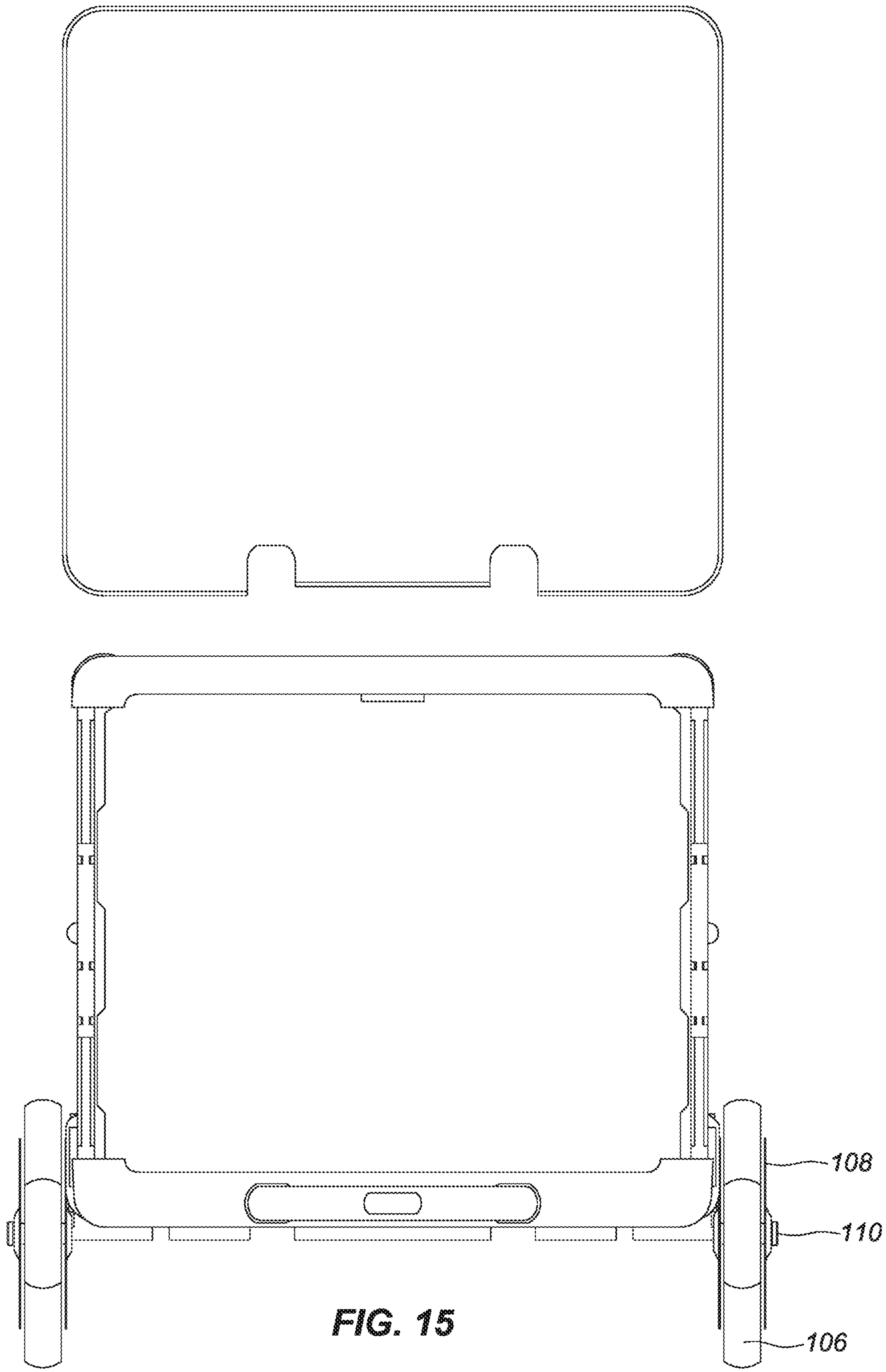
FIG. 15 is a top view of the collapsible cart of FIG. 10, according to an embodiment.
Figure 16:
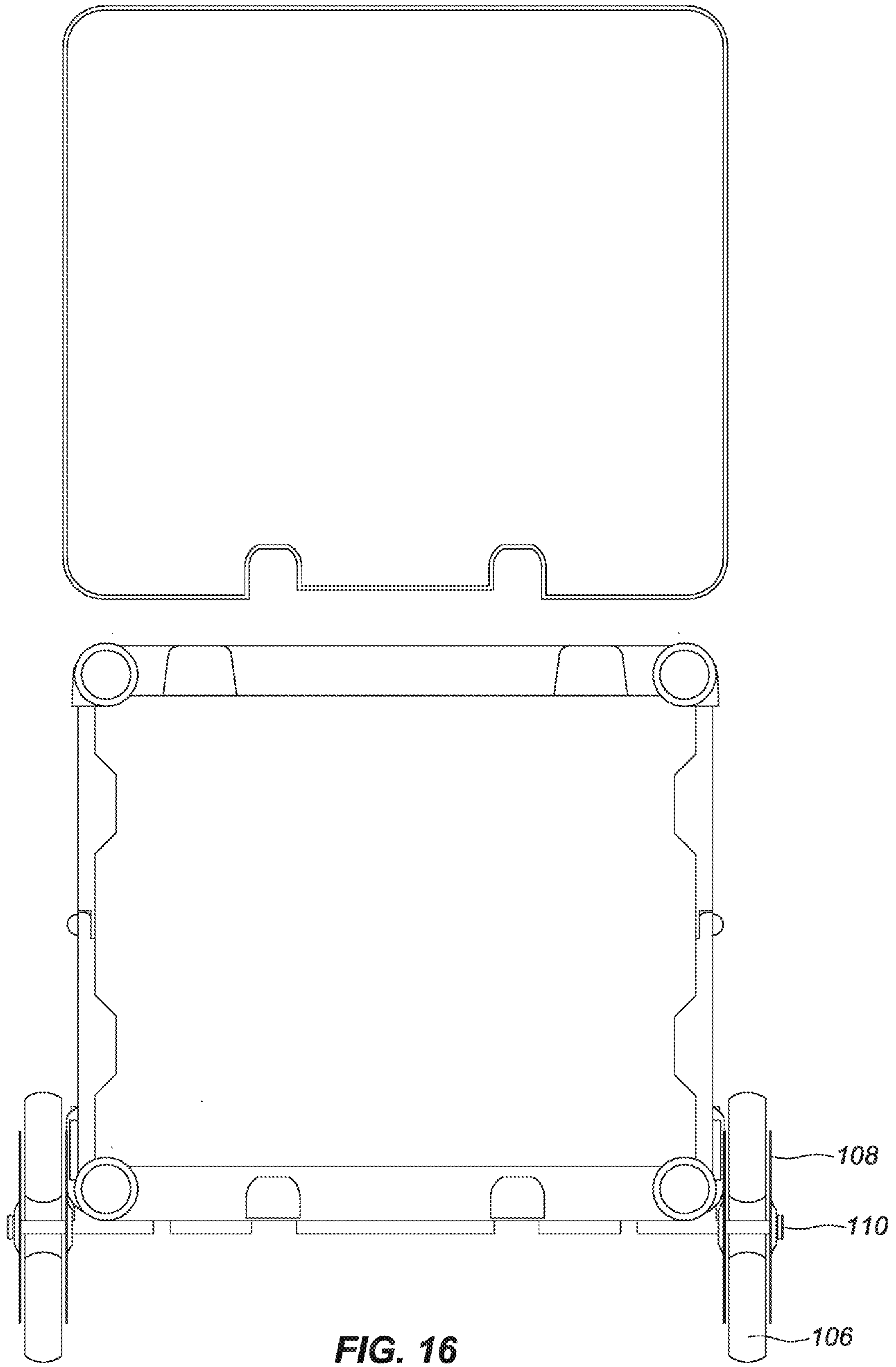
FIG. 16 is a bottom view of the collapsible cart of FIG. 10, according to an embodiment.
Figure 17:
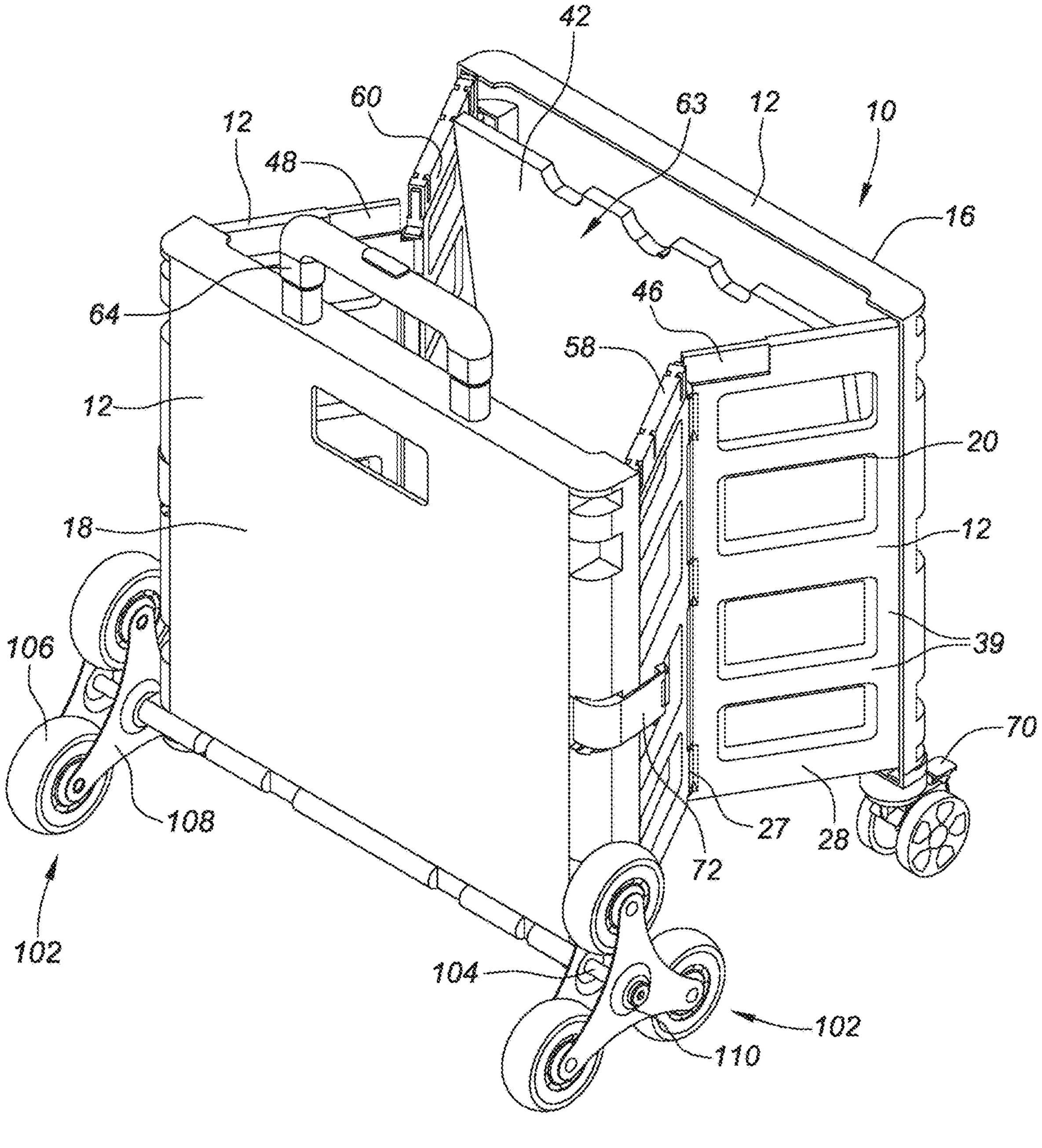
FIG. 17 is a perspective view of the collapsible cart of FIG. 10 illustrated with the sidewalls folded inwardly, according to an embodiment.
Figure 18:
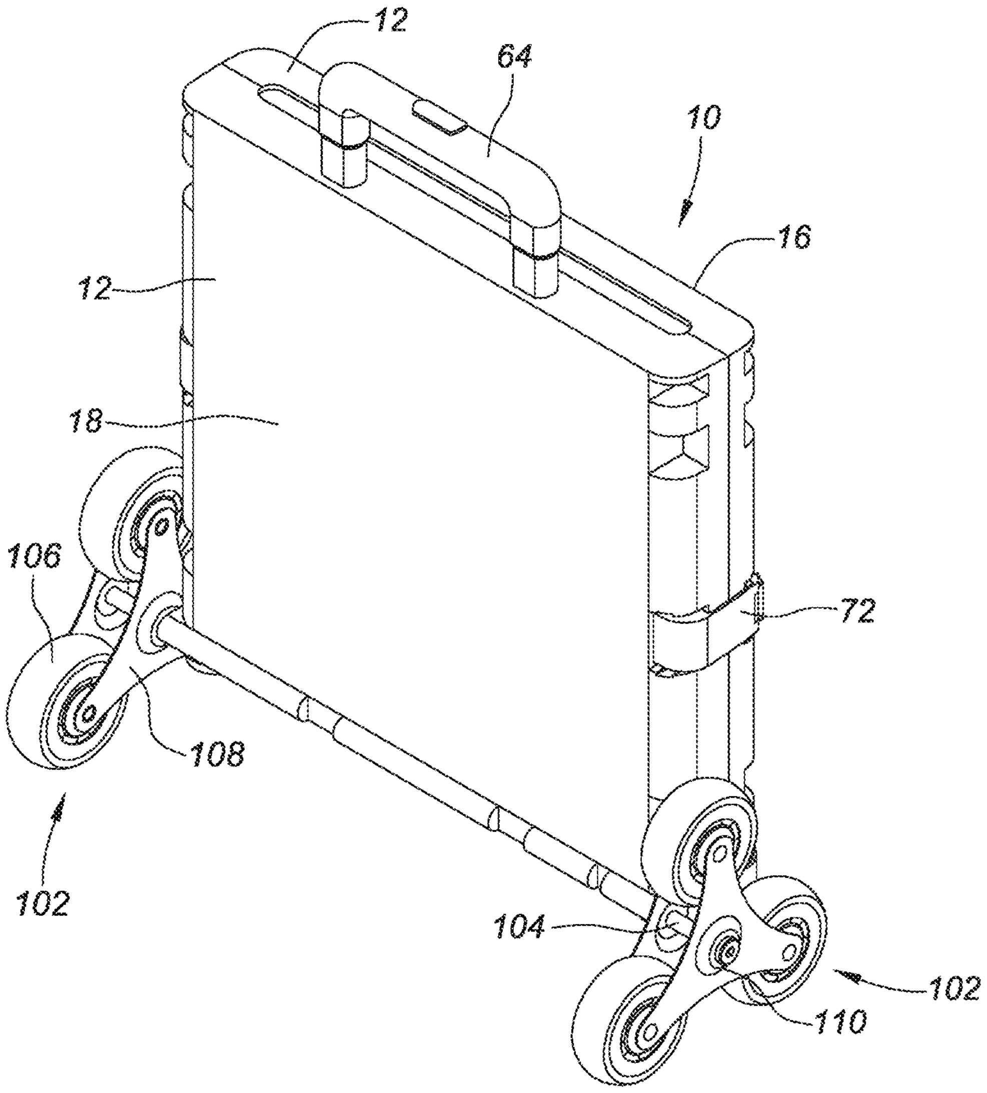
FIG. 18 is a perspective view of the collapsible cart of FIG. 10 illustrated in a closed condition, according to an embodiment.
Figure 19:
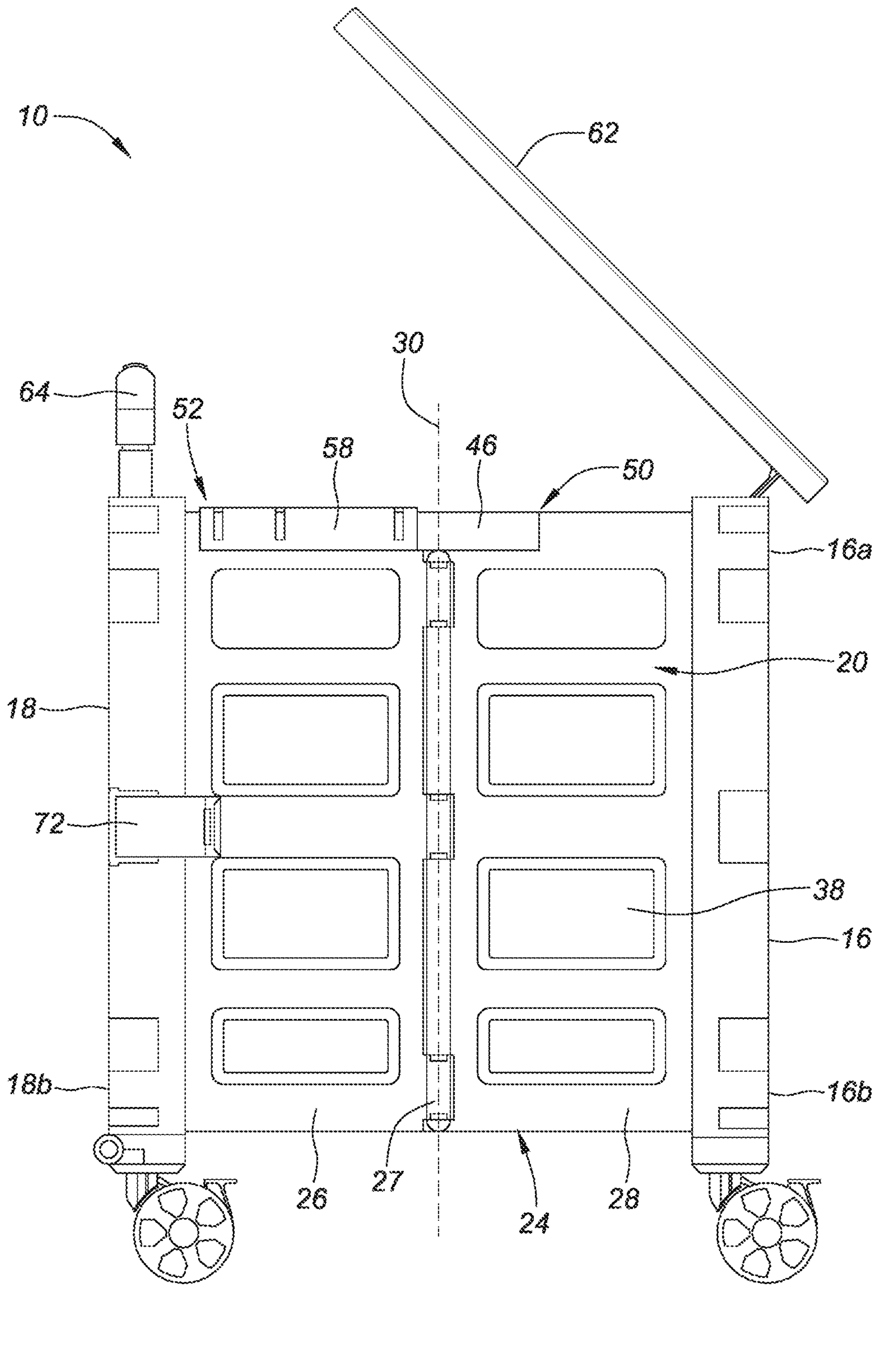
FIG. 19 is a right-side view of the collapsible cart similar to FIG. 1 illustrating another embodiment having the rigid cover panel pivoting in a first axis by a hinge mechanism that connects the cover panel to the front wall.
Figure 20:
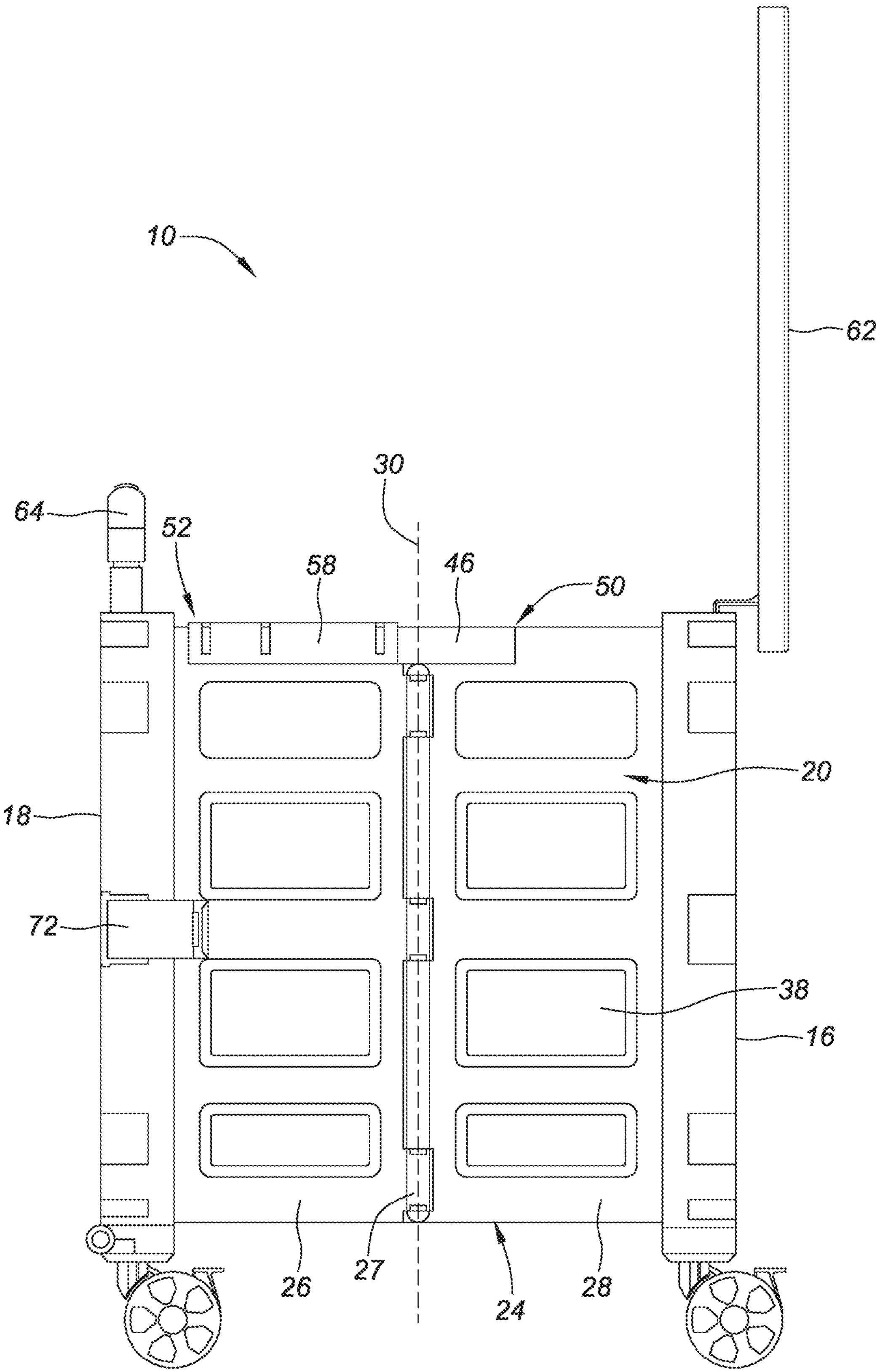
FIG. 20 is a view similar to FIG. 19 now showing the rigid cover panel in a vertical orientation.
Figure 21:
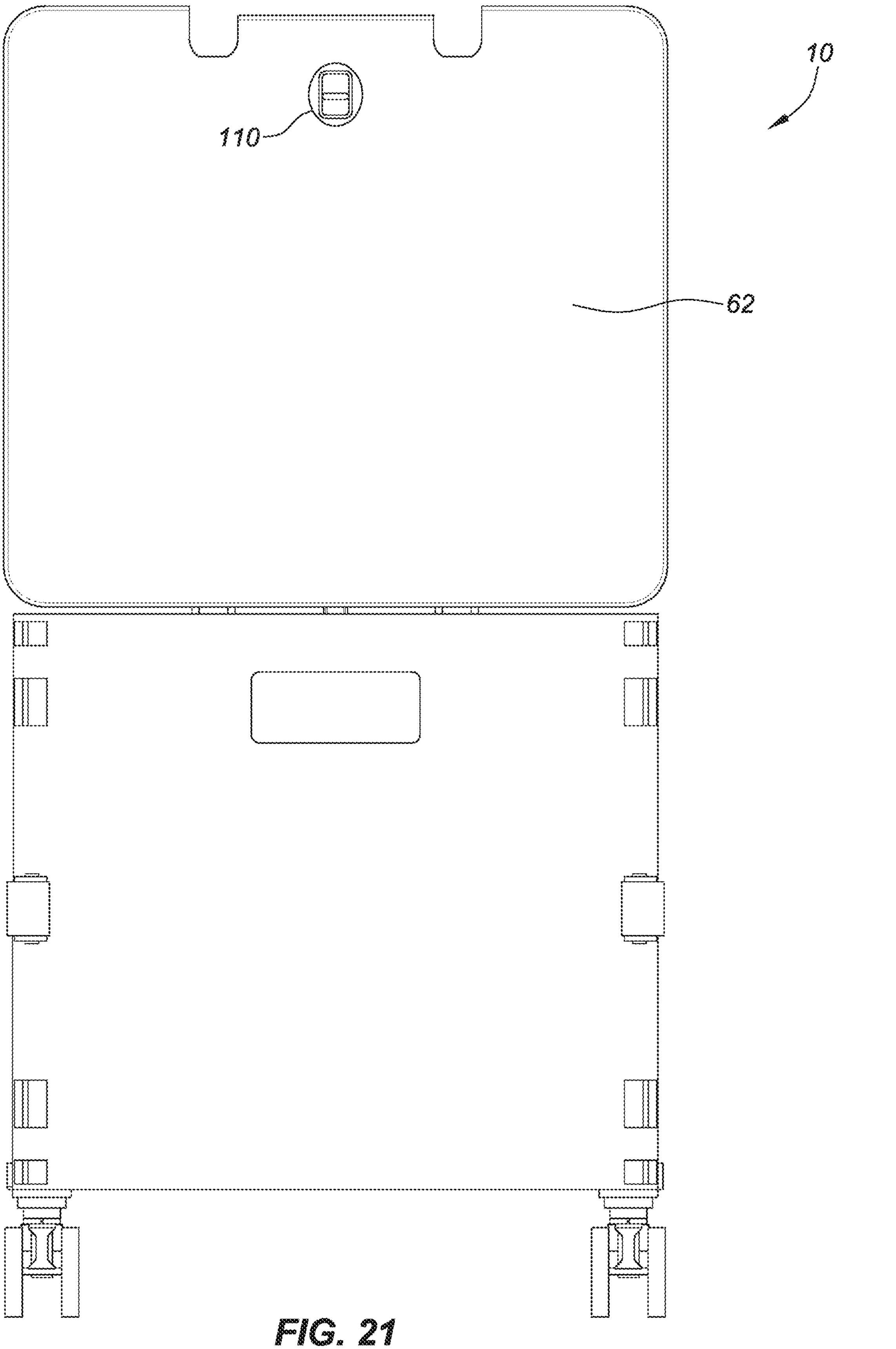
FIG. 21 is a front plan view of the structure of FIG. 19.
Figure 22:
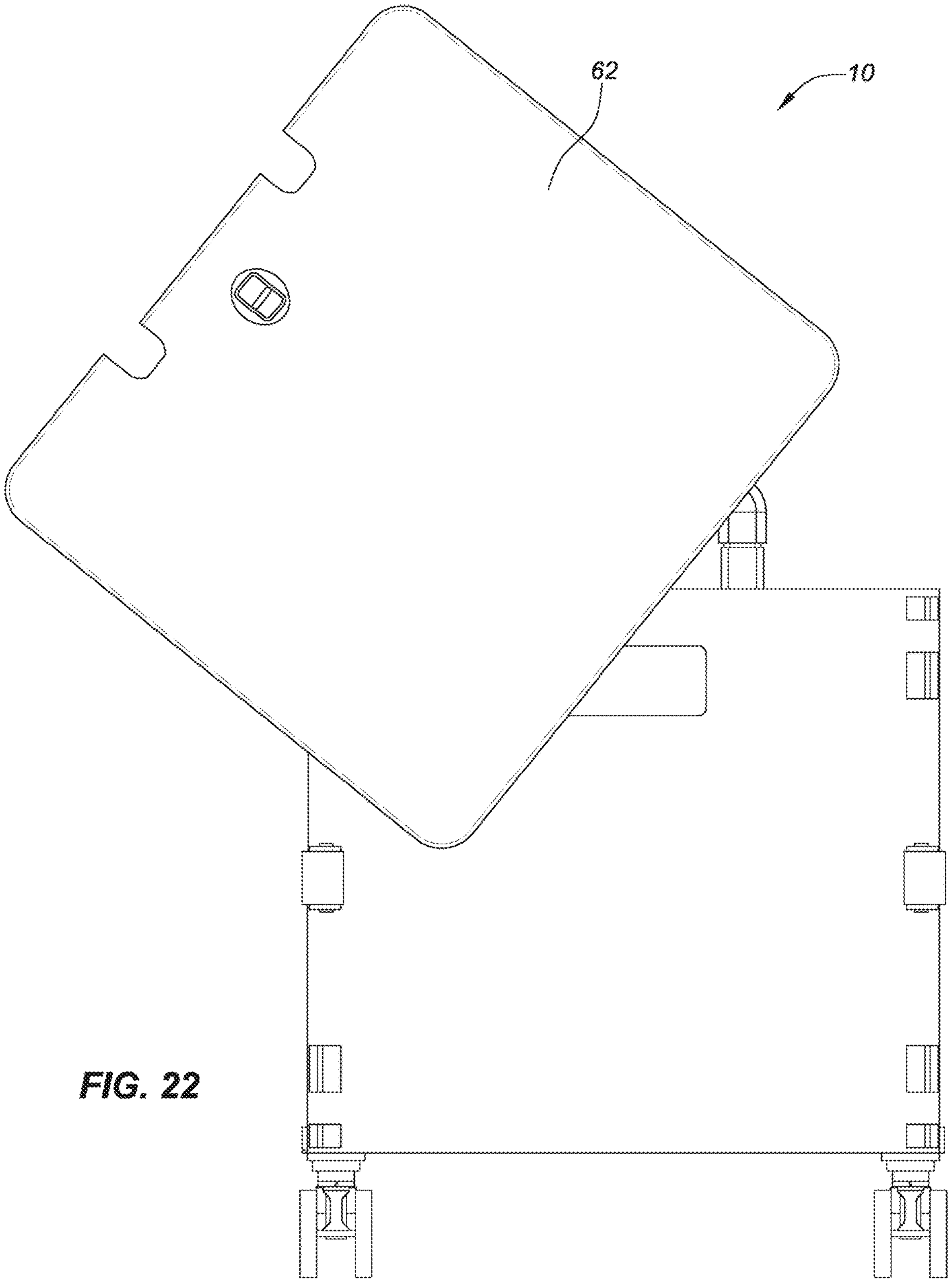
FIG. 22 is a view similar to FIG. 21 now showing the rigid cover panel rotating in a second axis.
Figure 23:
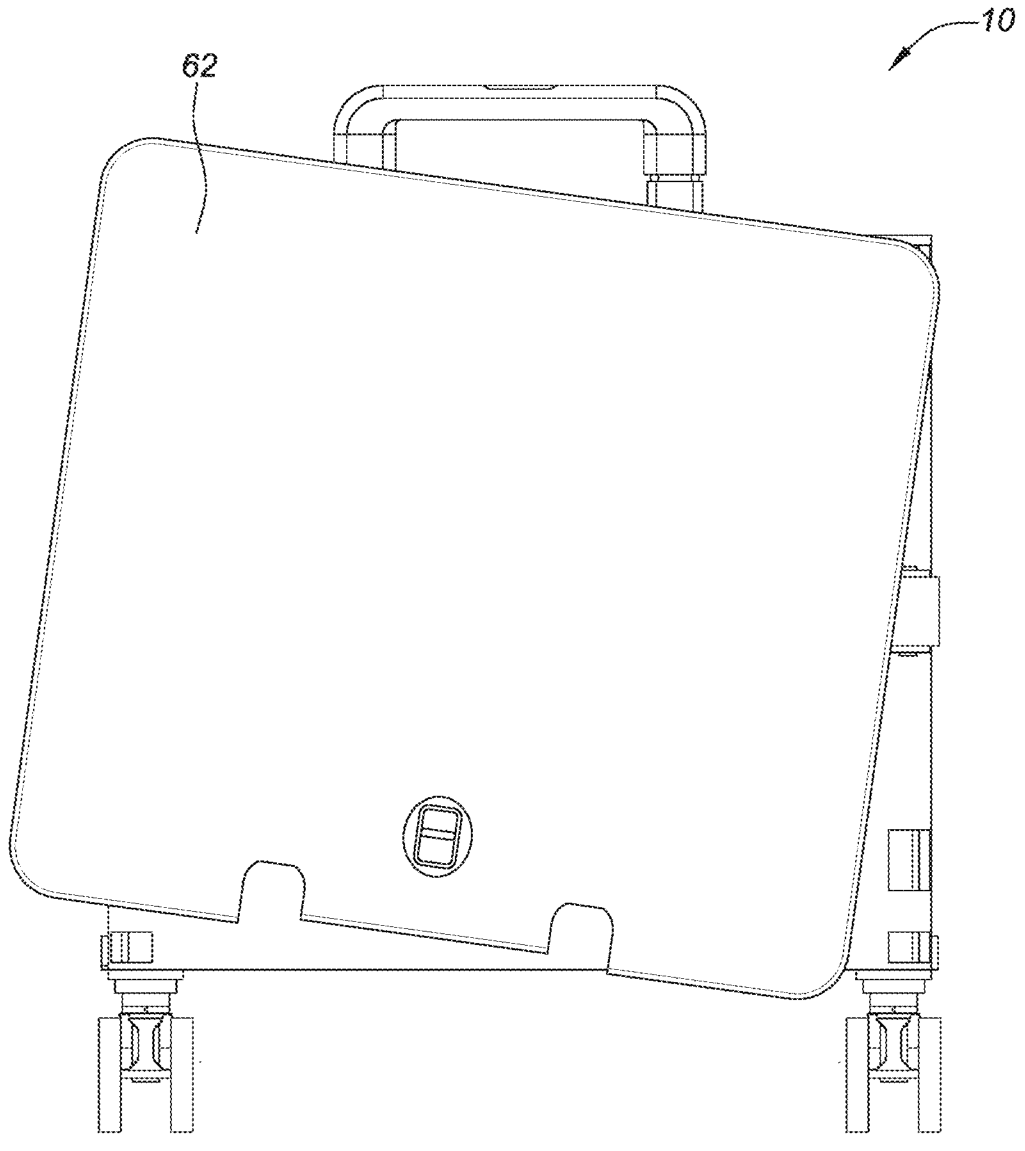
FIG. 23 is a view similar to FIG. 21 and FIG. 22 now showing the rigid cover panel further rotating in a second axis.
Figure 24:
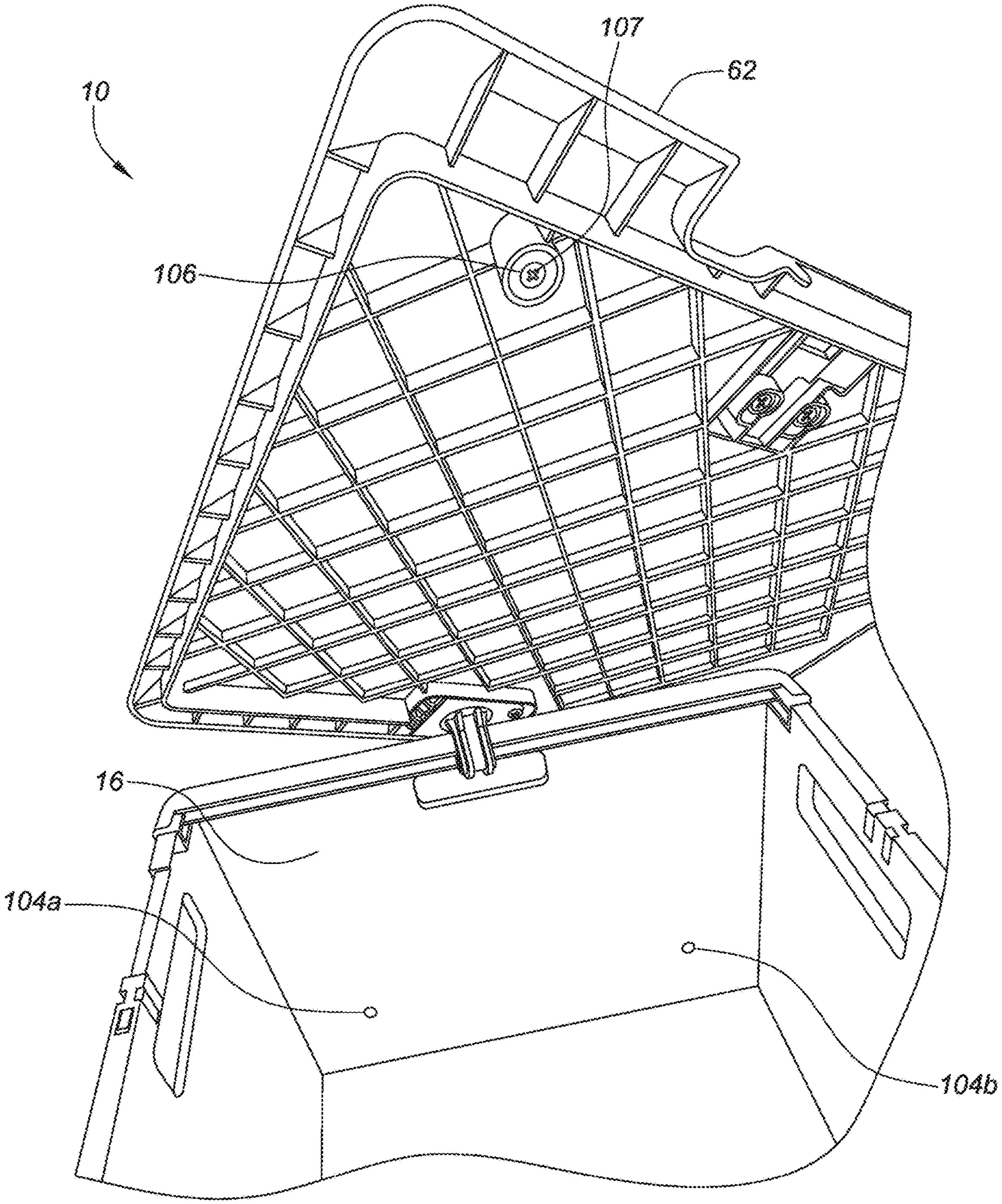
FIG. 24 is a perspective view showing the magnets and washers disposed inside the collapsible cart.
Figure 25:
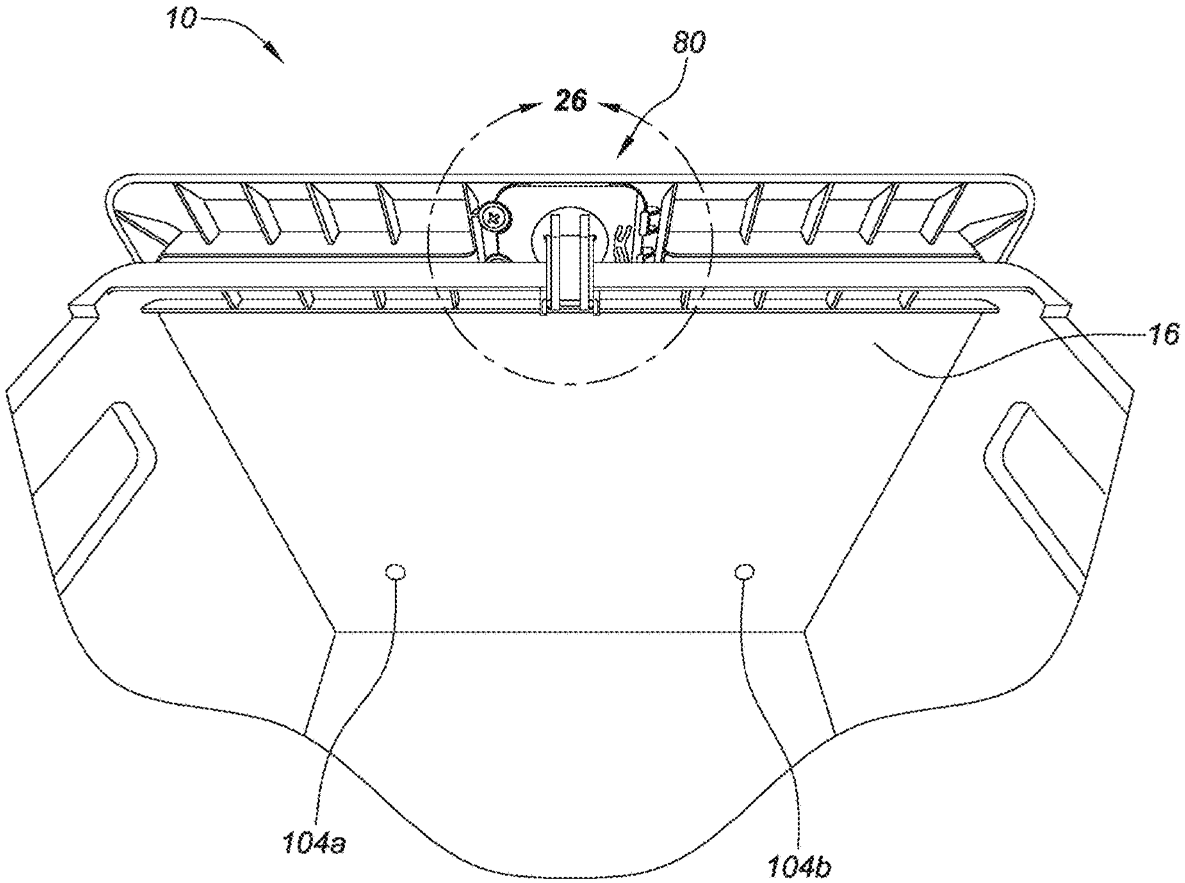
FIG. 25 is a perspective view showing the hinge mechanism of FIGS. 20-24.
Figure 26:
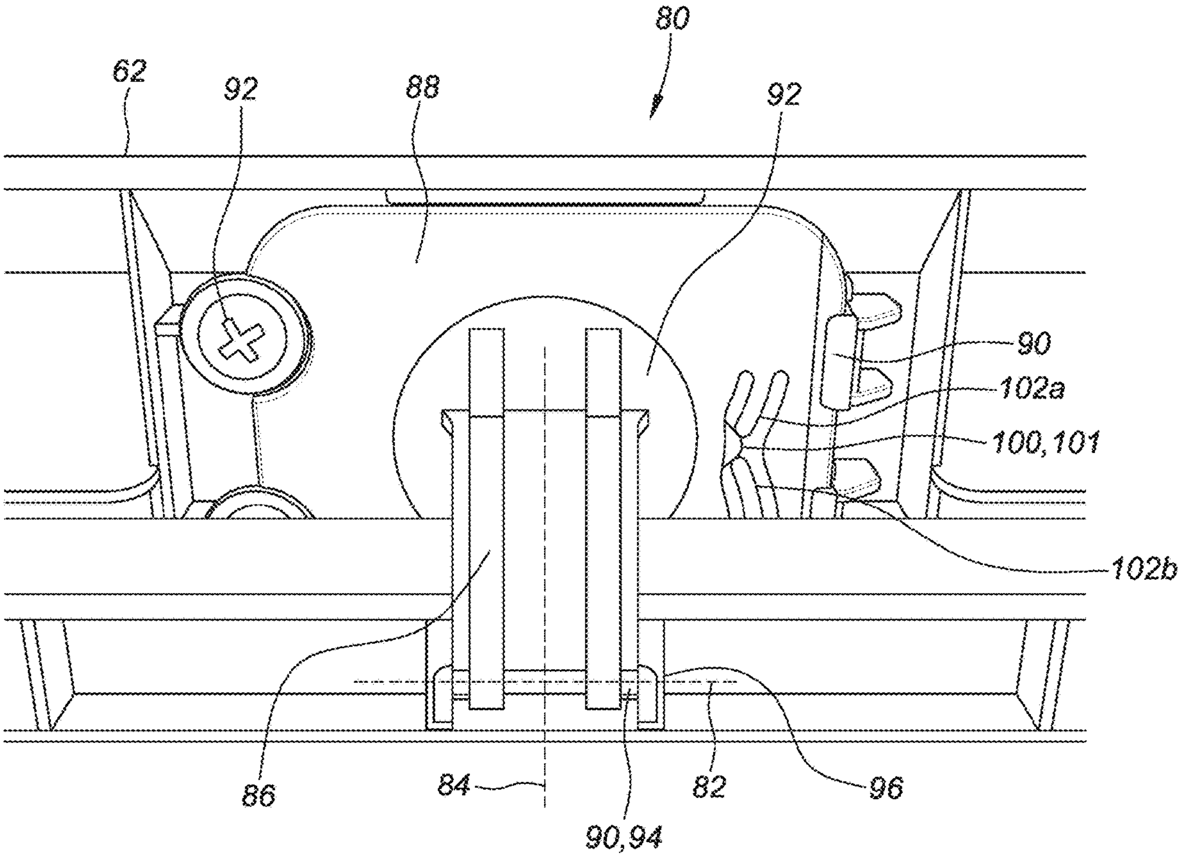
FIG. 26 is an enlarged view taken along line 26 of FIG. 25.

Unique and inventive collapsible carts are disclosed herein. Although embodiments of collapsible carts are disclosed herein, it is to be expressly understood that the present invention is not restricted solely to such embodiments. Rather, the present disclosure is directed to each of the inventive features described below, both individually as well as collectively, in various embodiments. Further, as will become apparent to those skilled in the art, one or more aspects of the present disclosure may be incorporated in other devices.

FIGS. 1-9 illustrate an embodiment of a collapsible cart 10 with swivel wheels, according to an embodiment. The collapsible cart 10 may include a rigid frame 12 forming a compartment 14. The rigid frame 12 may a front wall 16, a rear wall 18, a right sidewall 20, a left sidewall 22, and a bottom wall 24. The right sidewall 20 may include a first right panel 26 and a second right panel 28. The first right panel 26 may be coupled with a first hinge 27 to the second right panel 28 along a first vertical axis 30. The left sidewall 22 may include a first left panel 32 and a second left panel 34. The first left panel 32 may be coupled with a second hinge 33 to the second left panel 34 along a second vertical axis 36.

As can be appreciated, the first right panel 26, the second right panel 28, the first left panel 32 and the second left panel 34 may be formed of molded rigid plastic. In one embodiment, the first right panel 26, the second right panel 28, the first left panel 32 and the second left panel 34 may each be a solid panel member. In another embodiment, the first right panel 26, the second right panel 28, the first left panel 32 and the second left panel 34 may each be configured in a frame structure with a plurality of apertures 38 positioned between vertical and horizontal rigid members 39. Artisans would appreciate that this configuration allows for light-weight construction of the sidewalls 20 and 22.

In one embodiment, the collapsible cart 10 may include a rotatable base panel 40 (shown in FIGS. 6 and 8) rotatably coupled to the bottom wall 24 within the compartment 14. The rotatable base panel 40 may include a lower surface 42 (shown FIG. 8) and an upper surface 44 (shown FIG. 6). As can be appreciated, when in use, the rotatable base panel 40 may be rotated so that its lower surface rests against an interior surface of the bottom wall 24.

In another embodiment, the collapsible cart 10 may include a first track 46 and a second track 48. The first track 46 may extend across the first vertical axis 30 from a first position 50 on the first right panel 26 to a second position 52 on the second right panel 28. The second track 48 may extend across the second vertical axis 36 from a first position 54 on the first left panel 32 to a second position 56 on the second left panel 34.

The collapsible cart 10 may also include a first slidable member 58 and a second slidable member 60. The first slidable member 58 may cooperatively engage the first track 46 and may be movable between an open position to a closed position to selectively secure or lock the first right panel 26 to the second right panel 28 (shown in FIG. 2). As can be appreciated, the first slidable member 58 is in the open position when adjacent the first position 50 of the first track 46 and is in the closed position when adjacent the second position 52 of the first track 46. Similarly, the second slidable member 60 may be cooperatively engage the second track 48 and may be movable between an open position to a closed position to selectively secure or lock the first left panel 32 to the second left panel 34. As can be appreciated, the second slidable member 60 is in the open position when adjacent the first position 54 of the second track 48 and is in the closed position when adjacent the second position 56 of the second track 48. In another embodiment, the collapsible cart 10 may include only one slidable member on either one of the sidewalls 20 or 22. Alternatively, the collapsible cart 10 may include a plurality of slidable members for each sidewall 20 and 22.

In one embodiment, the collapsible cart 10 may include a rigid cover panel 62 and a retractable handle mechanism 64. The rigid cover panel 62 may be formed of a molded plastic with a ribbed pattern for increased rigidity. The rigid cover panel 62 may be configured to conform in shape and fit snugly to a top opening 63 of the compartment 14. The rigid cover panel 62 may securely fit in a first position over the top opening 63 to serve as a cover or seat on top of the collapsible cart 10. The rigid cover panel 62 may include one or more protrusions on a bottom surface to removably secure to the front wall 16 of the collapsible cart 10. Meanwhile, the retractable handle 64 may be positioned adjacent the back wall 12.

As shown in FIGS. 1-9, the collapsible cart 10 may include a plurality of rotatable swivel wheels 66 coupled to the bottom wall 24 of the collapsible cart 10. The rotatable swivel wheels 66 may include at least one wheel-locking assembly 68 having a first condition for locking at least one of the rotatable swivel wheels to prevent rolling movement, and a second condition for unlocking the at least one of the rotatable swivel wheels. As can be appreciated, the at least one wheel-locking assembly 68 may include a brake actuator pedal 70.

FIGS. 10-18 illustrate an embodiment of a collapsible cart 100 with a pair of three-wheel assemblies 102, according to an embodiment. The collapsible cart 100 may include a spindle 104 rotatably coupled to the bottom wall 24 and adjacent an intersection of the bottom wall 24 and the rear wall 18. Each three-wheel assembly 102 may include three wheels 106, three spokes 108 and a central rotational point 110. As can be appreciated, each wheel 106 may be rotatably coupled to one of the three spokes 108, and each spoke 108 may be connected to the central rotational point 110 coupled to the spindle 104.

As can be appreciated, the collapsible cart 10 may be fabricated with a light-weight material, such as plastic. In one embodiment, one or more of the walls 16, 18, 20, 22 and 24 may be formed of a molded plastic with a ribbed pattern for increased rigidity.

In operation, the collapsible cart 10 or 100 is transitioned from a closed condition where it is folded up to an open position where it is expanded for use. In the closed condition (shown in FIGS. 9 and 18), a user may unlock clips 72 on the right side and left side to extend the right and left opposing sidewalls 20 and 22. In one embodiment, the user may need to insert his or hands in the compartment 14 to push out the sidewalls 20 and 22. As the sidewalls 20 and 22 are pushed outwards, the rotatable base panel 40 drops down such that its lower surface rests upon the interior surface of the bottom wall 24, and stabilizes the cart by fitting tightly between the lower region of the two opposing sidewalls 20 and 22. The first slidable member 58 and the second slidable member 60 may then be moved along their respective tracks 46 and 48 and from their respective open position to their respective closed position to selectively secure the sidewall panels. As can be appreciated, the slidable members 58 and 60 may be used to hold the extended sidewalls 20 and 22 in place. The rigid cover panel 62, which may be secured to the front wall 16 for storage, may be unlatched and securely fit over the top opening 63 of the compartment 14 to serve as a cover or seat. The collapsible cart 10 or 100 may be used to transport heavy loads in this open condition or may be collapsed in reverse fashion to place in a closed condition for storage.

Figure 27:
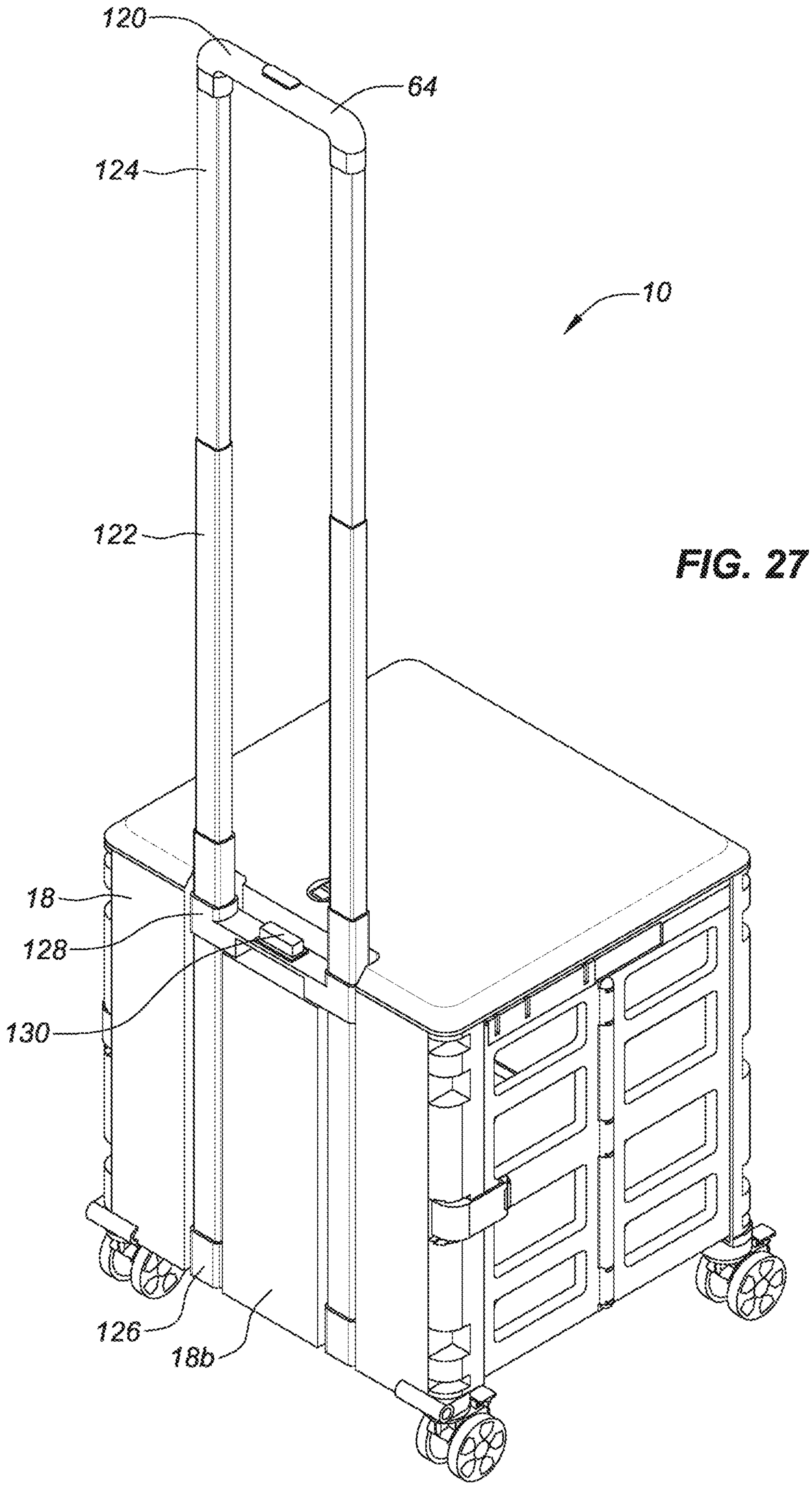
FIG. 27 is a perspective view of another embodiment of the collapsible cart now having a pivoting telescoping handle.
Figure 28:
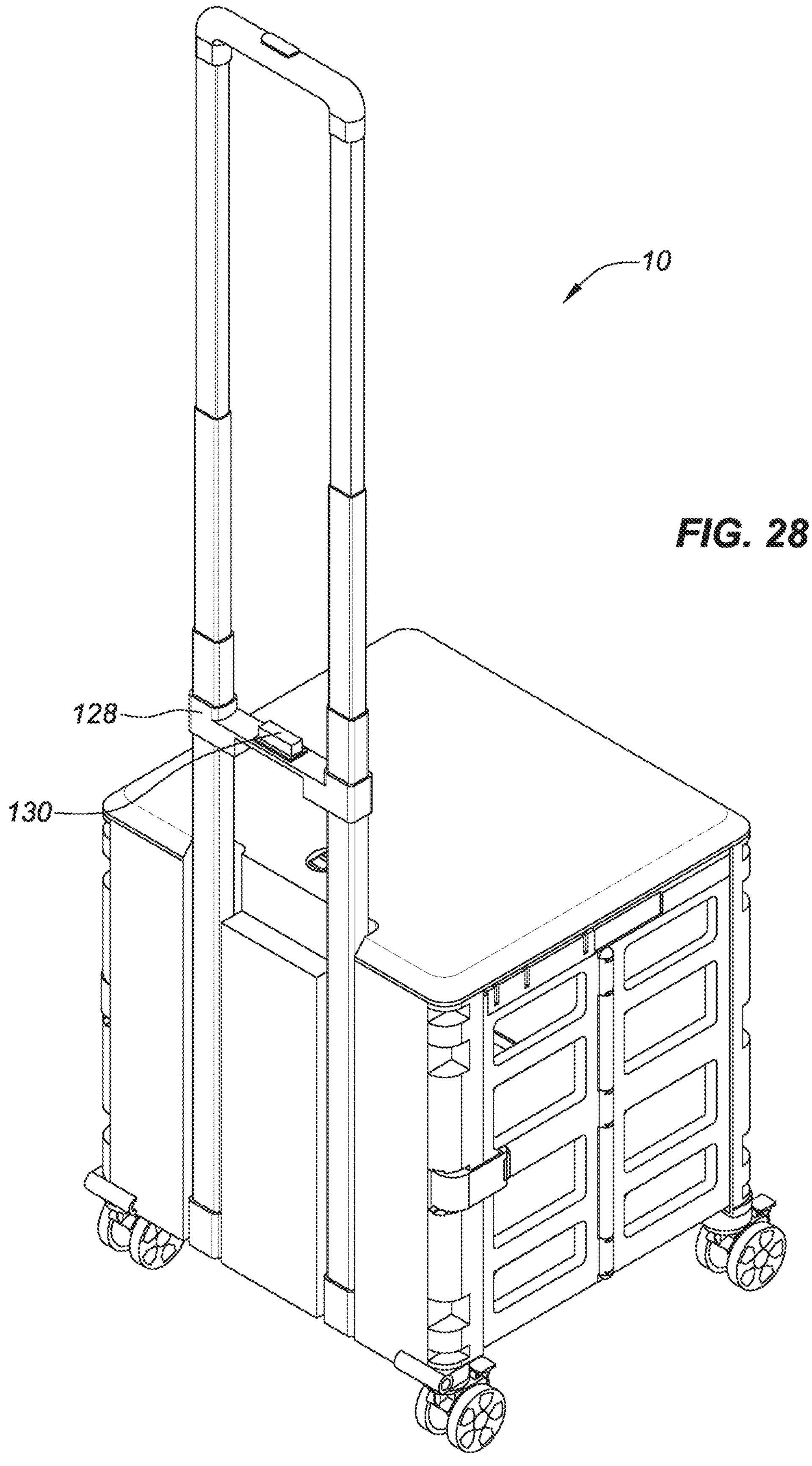
FIG. 28 is a view similar to FIG. 27 now showing a locking slide being moved upwards to unlock the telescoping handle relative to the rear wall of the cart.
Figure 29:
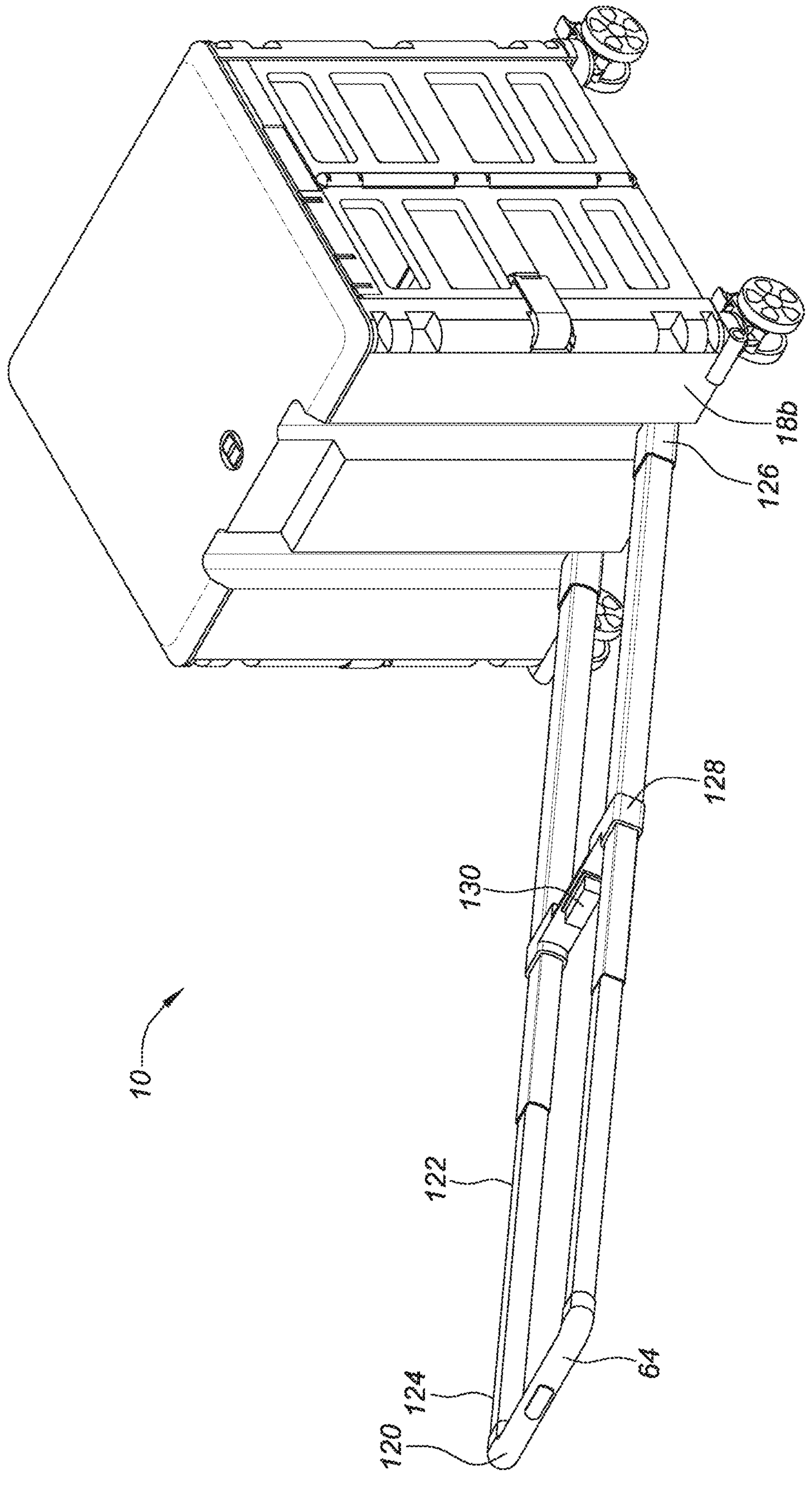
FIG. 29 is a perspective view of the structure of FIGS. 27-28 now showing how the telescoping handle can pivot at its proximal end for rolling the cart while allowing all four wheels to remain in contact with the ground.

FIGS. 19-29 illustrate another embodiment of the present invention. The collapsible cart 10 is very similar to the previous embodiments already disclosed, such that common reference numbers are used herein. Similarly, the rigid frame 12 forms the compartment 14. The rigid frame 12 includes the front wall 16, the rear wall 18, the right sidewall 20, the left sidewall 22, and the base panel 40. The retractable handle mechanism 64 is disposed at, within or adjacent the back wall 18 as best shown in FIG. 27. The retractable handle mechanism 64 comprises a hand grip 120 attached to a telescoping assembly 122. The hand grip is attached at a distal end 124 of the telescoping assembly. The telescoping assembly 122 is pivotably attached at a proximal end 126 to the bottom **18*b* of the rear wall 18 as best seen in FIG. 28**. As can be appreciated, there are a multitude of mechanisms and methods that may be used by those skilled in the art to create the pivot joint at the proximal end of the telescoping assembly, as this teaching is not to be limited to any one specific structure.

A locking slide 128 is translatable along at least a portion of the telescoping assembly 122. The locking slide 128 is a rigid structure that captures both of the telescoping tubes and helps secure them in parallel relationship. It is understood by those skilled in the art that just one telescoping tube could be used and as such the locking slide 128 would translate along this one telescoping tube.

In FIG. 27 the locking slide 128 is locking the telescoping assembly 122 to the rear wall 18 at a distance apart from the proximal end which is pivotable. Then, in FIG. 28, the locking slide 128 has moved upwards and no longer locks the telescoping assembly 122 to the rear wall 18.

The locking slide 128 may be configured to lock to the rear wall 18 securing the telescoping assembly 122 parallel to the rear wall 18. The locking slide 128 may also be configured to unlock from the rear wall 18 allowing the telescoping assembly 122 to pivot at an angle away from the rear wall 18, as shown in FIG. 28. A release button 130 may be used to lock and unlock the locking slide 128 from the rear wall 18. As shown in FIG. 28, the collapsible cart 10 can now be rolled with all four wheels remaining on the ground while still retaining the functionality of the cart as described in the previous embodiments.

It is also understood by those skilled in the art that the locking slide 128 could be replaced with a locking mechanism that either secures the telescoping assembly 122 to the rear wall 18 or allows the telescoping assembly 122 to pivot about the proximal end. In other words, in other embodiments, the locking slide 128 need not translate along the telescoping assembly 122 while still being able to lock and unlock the telescoping assembly 122 in relation to the rear wall 18.

FIGS. 30-46 illustrate a collapsible cart 200, according to an embodiment. The collapsible cart 200 is convertible between an expanded position and a collapsed position. The collapsible cart 200 may include a rigid frame 212, and when the collapsible cart 200 is in the expanded position it may form a combined compartment 214 (as illustrated in FIG. 41), which in some embodiments may be selectively divided into partitioned compartments 213 and 215 (as illustrated in FIGS. 37-39 and 43). The rigid frame 212 may include a front wall 216, a bottom wall, a rear wall 218, a right sidewall 220, a left sidewall 222, and bottom panels 223 and 224.

The right sidewall 220 may include a front right collapsible portion 220*a* comprising a first right panel 226*a* and a second right panel 228*a* rotatably connected to each other at a first right panel joint 227*a*, and a rear right collapsible portion 220*b* comprising a third right panel 226*b* and a fourth right panel 228*b* connected to each other at a second right panel joint 227*b*. The front right collapsible portion 220*a* may be rotatably connected to the front wall 216 at a front right corner joint 225, and the rear right collapsible portion 220*b* may be rotatably connected to the rear wall 218 at a rear right corner joint 229. (Alternatively, each sidewall may (not shown) have three or more panel portions and two or more interstitial members, instead of each sidewall consisting of just front and rear (i.e., two) collapsible portions).

Similarly, the left sidewall 222 may include a front left collapsible portion 222*a* comprising a first left panel 232*a* and a second left panel 234*a* rotatably connected to each other at a first left panel joint 233*a*, and a rear left collapsible portion 222*b* comprising a third left panel 232*b* and a fourth left panel 234*b* connected to each other at a second left panel joint 233*b*. The front left collapsible portion 222*a* may be rotatably connected to the front wall 216 at a front left corner joint 239, and the rear left collapsible portion 222*b* may be rotatably connected to the rear wall 218 at a rear left corner joint 238.

In a collapsible cart 200 according to some embodiments, as the one depicted in FIGS. 30-46, the bottom of the collapsible cart 200 may be provided with a plurality of wheel assemblies 266, which, as in the depicted embodiment, may be adapted to swivel. One or more of the wheel assemblies 266 may in some embodiments include a locking assembly, which may in some embodiments in turn include a brake actuator pedal 270.

In a collapsible cart 200 according to some embodiments, as the one depicted in FIGS. 30-46, the left sidewall 222 of the frame 212 may be fitted with means for securing the collapsible cart 200 in expanded position. Such means may, for example, comprise a pair of slidable members 258 each slidable on a corresponding pair of tracks 246, between open positions 250 and locked positions 252, and likewise the right sidewall of the frame may be fitted with a pair of slidable members 258 each slidable on a corresponding pair of tracks 246, between open positions 250 and locked positions 252. In the open position 250, a slidable member 258 only extends above a single panel, and the joint adjacent the edge of the slidable member permits the two panels that the joint connects to rotate inwardly or outwardly at the joint so that the ends of those panels distal from the joint can swing away from (expanding the collapsible cart 200) or toward each other (collapsing the collapsible cart 200). In contrast, in the locked position 252, a slidable member 258 straddles proximate portions along track 246 on the top edges of two panels and secures those two panels in a generally coplanar position with each other.

In a collapsible cart 200 according to some embodiments, as the one depicted in FIGS. 30-46, the exterior of the frame 212 may be provided with means for holding the collapsible cart 200 in a collapsed position, for example the four clips 272 disposed on the collapsible cart 200, which may operate similarly to clips 72 of the collapsible cart 10 described above.

In a collapsible cart 200 according to some embodiments, as the one depicted in FIGS. 30-46, the front right collapsible portion 220*a* may be connected to the rear right collapsible portion 220*b* by a right interstitial member 230 at a front right interstitial joint 221 and a rear right interstitial joint 231. Similarly, the front left collapsible portion 222*a* may be connected to the rear left collapsible portion 222*b* by a left interstitial member 236 at a front left interstitial joint 235 and a rear left interstitial joint 237. Alternatively (not shown), each interstitial member and its respective pair of rotatable joints could be omitted in favor of a single rotatable joint directly connecting together the collapsible portions of a side wall.

In a collapsible cart 200 according to some embodiments, as the one depicted in FIGS. 30-46, the frame 212 may include a plurality of bottom panels, such as a pair of bottom panels 223 and 224. In some embodiments so configured, as the one depicted in FIGS. 30-46, the bottom panels 223 and 224 each may be rotatably connected at one edge to a lower portion of another part of the rigid frame 212 (e.g., along a bottom edge of the front wall 216 or rear wall 218 and/or at a horizontal bottom crossbar connecting the left interstitial member 236 to the right interstitial member 230 between bottom edges of the right sidewall 220 and left sidewall 222). In embodiments so configured, when the collapsible cart 200 is in the expanded position, the opposite edge of each of the bottom panels 223 and 224 may be rotated downwardly towards the bottom of the collapsible cart 200 so that the opposite edge rests on and/or engages a corresponding aspect of the another part of the rigid frame at the bottom of the collapsible cart 200 (e.g., lips or catches protruding inwardly from one or more bottom edges of sidewalls, front or rear walls, and/or a horizontal bottom crossbar connecting the left interstitial member 236 to the right interstitial member 230). When the bottom panels 223 and 224 are in this position, the frame 212 forms a bottom wall for the partitioned compartments 213 and 215 or the combined compartment 214.

Figure 41:
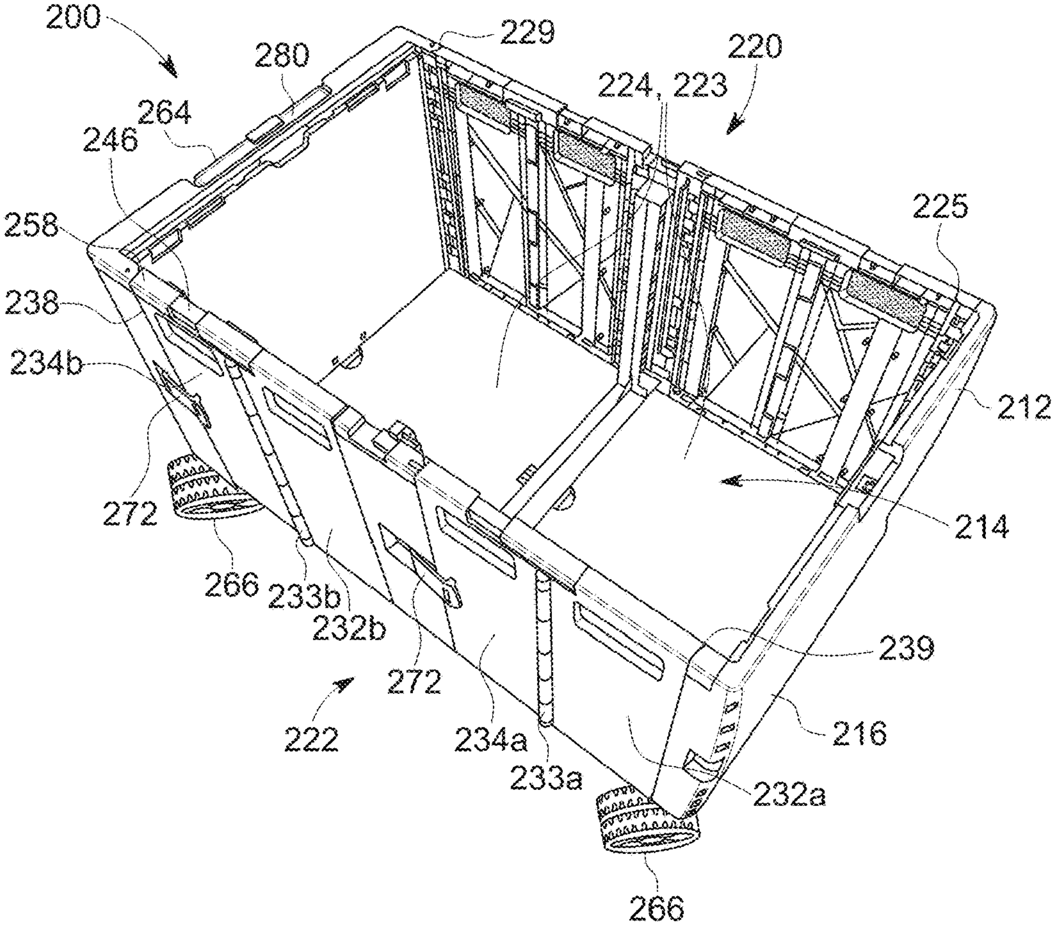
FIG. 41 is another perspective view of the collapsible cart of FIG. 30, illustrating the full combined compartment (uncovered) formed with no cover panel stored in the center.
Figure 42:
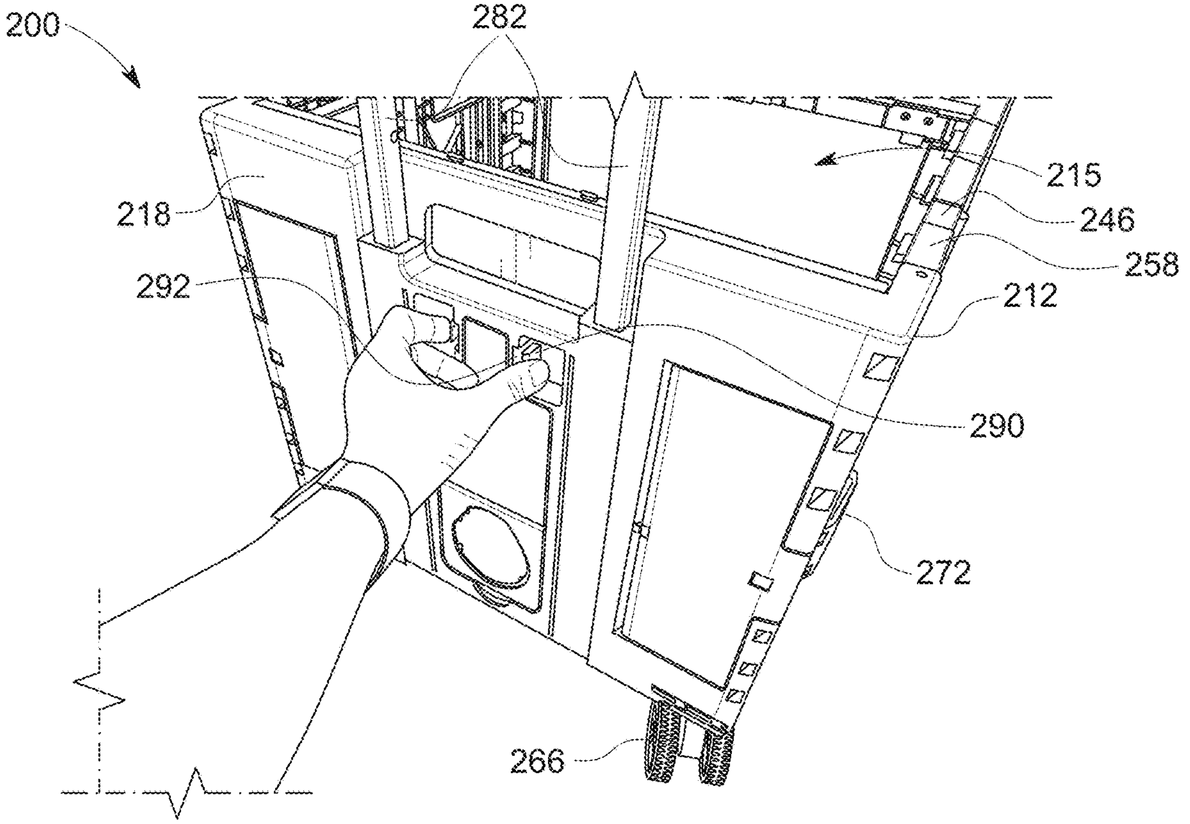
FIG. 42 is a partial perspective view of the collapsible cart of FIG. 30, illustrating a user disengaging handle releases from handle catches to free the handle to pivot away from the cart.
Figure 43:
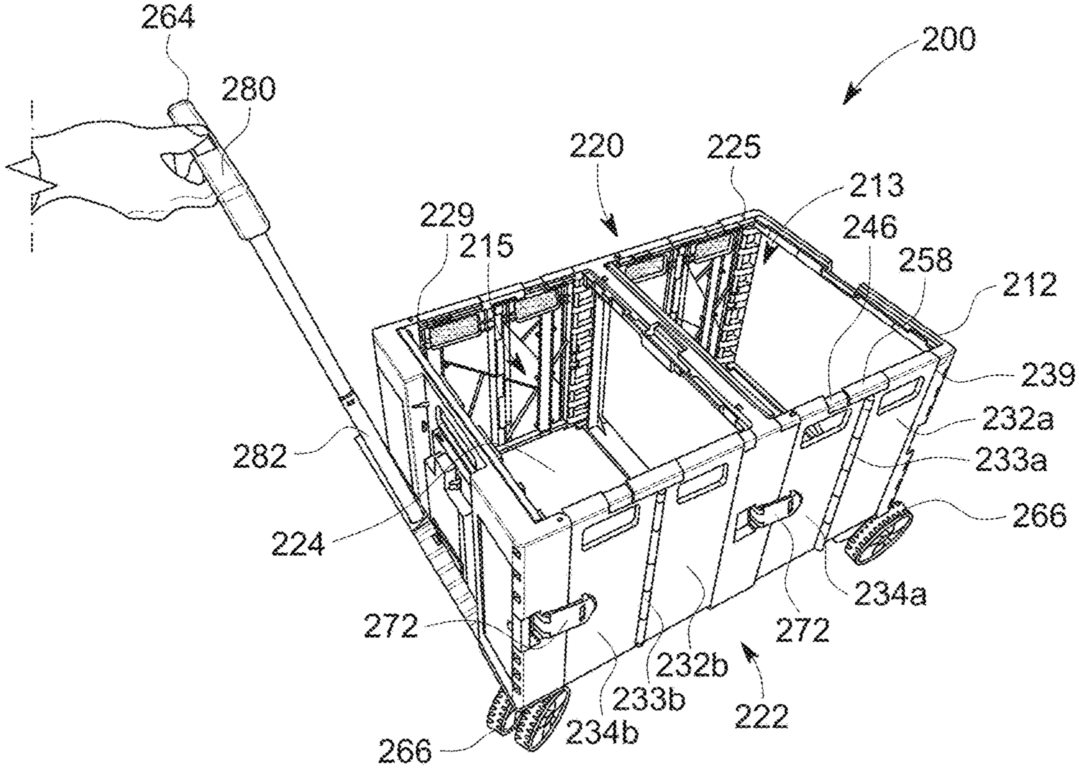
FIG. 43 is another perspective view of the collapsible cart of FIG. 30, illustrating the extended handle pivoted away from the cart.
Figure 44:
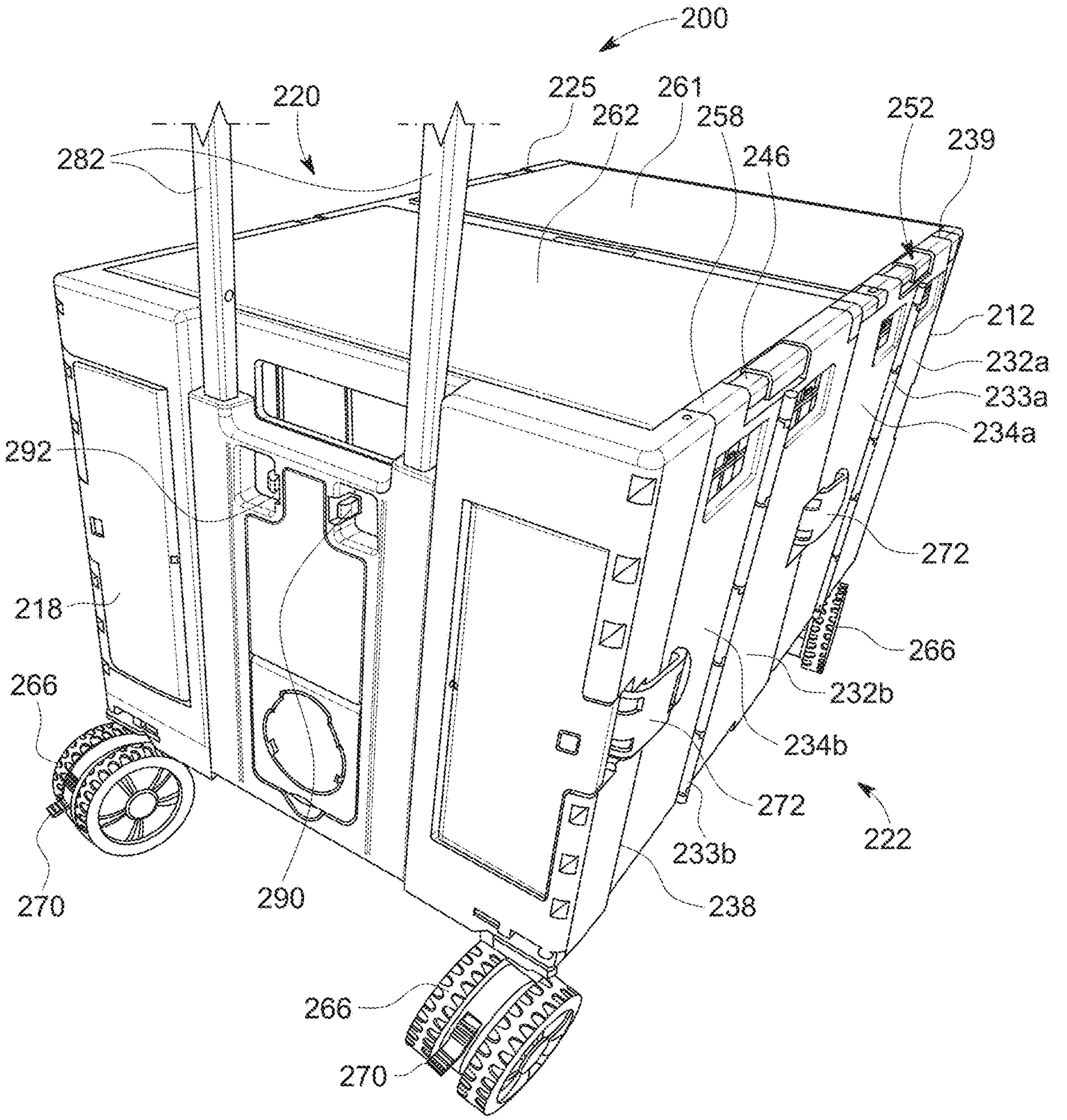
FIG. 44 is a partial perspective view of the collapsible cart of FIG. 30, illustrating features at the rear of the cart.

In a collapsible cart 200 according to some embodiments, as the one depicted in FIGS. 30-46, a handle 264 (as best illustrated in FIGS. 42-44) may be connected to the collapsible cart 200 (e.g., at the rear wall 218). In some such embodiments, the handle 264 may include a hand grip 280; and/or the handle 264 may be telescoping and include a telescoping assembly 282 and means for securing the handle 264 in a selected position of extension; and/or the handle 264 may be pivotally connected to the collapsible cart 200 and include means (such as release catches 290 and detents 292, as best illustrated in FIGS. 42 and 44, engaged, and in FIG. 43, disengaged) for securing the handle 264 or disengaging the handle 264 from the cart so that one end of the handle 264 to pivot outwardly away from the cart.

Figure 40:
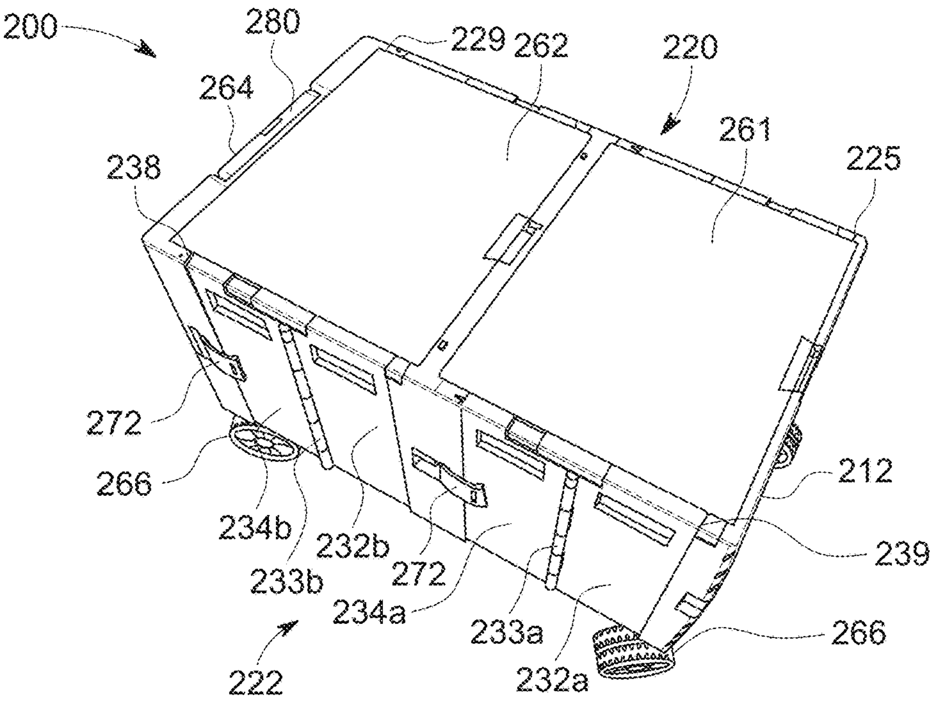
FIG. 40 is another perspective view of the collapsible cart of FIG. 30, illustrating cover panels removed from storage position and placed atop the cart.

In a collapsible cart 200 according to some embodiments, as the one depicted in FIGS. 30-46, detachable or pivotally-connected cover panels (e.g., two cover panels 261 and 262 as in the depicted embodiment) may also be provided, each of which can be positioned at the top of the cart (as illustrated in FIG. 40) so as to enclose one or more interior compartments formed by the cart when the cart is in the expanded position (e.g., the depicted expanded compartment 214 or partitioned compartments 213 and 215).

Figure 45:
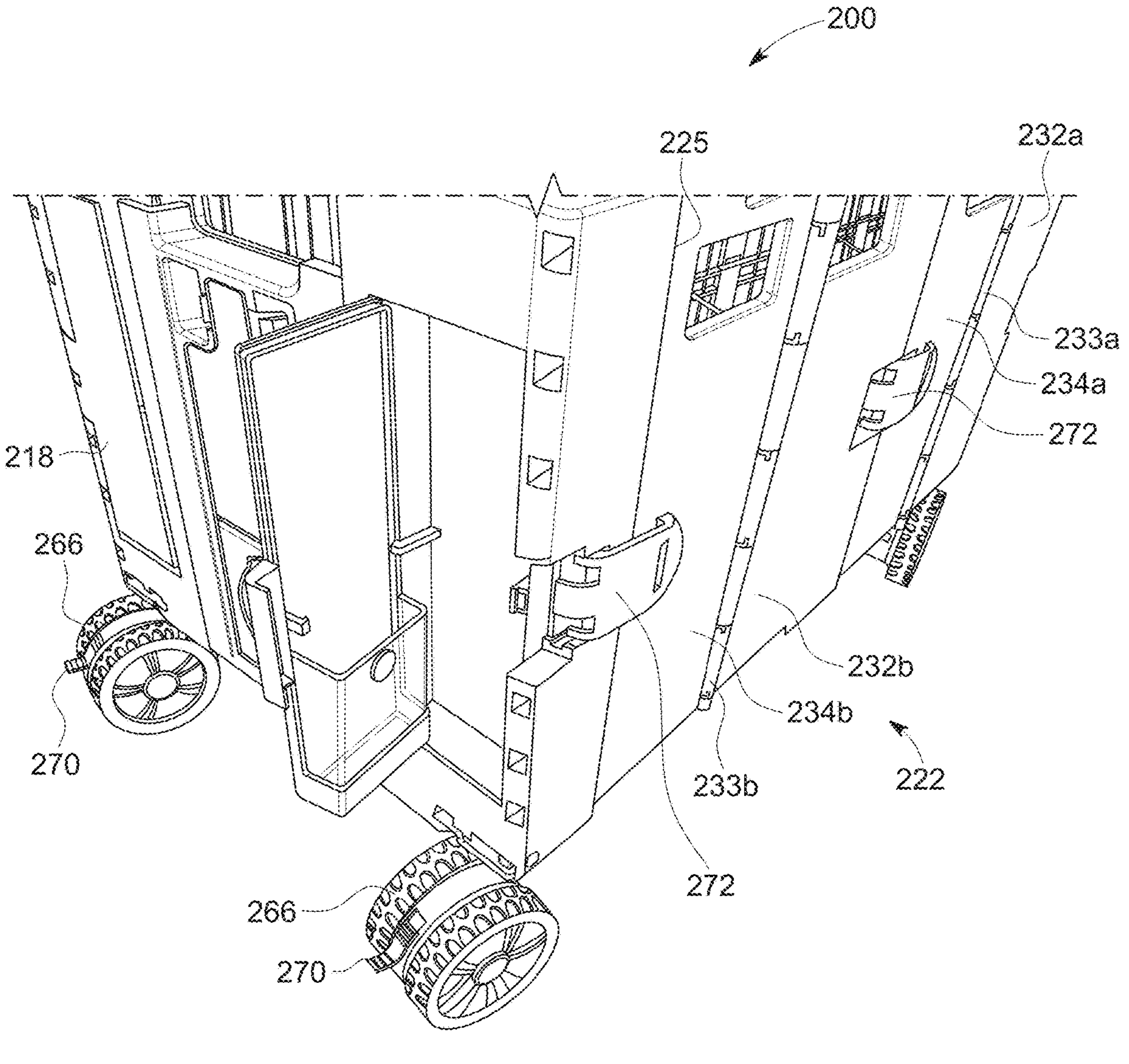
FIG. 45 is another partial perspective view of the collapsible cart of FIG. 30, illustrating a pocket rotated into open position.
Figure 46:
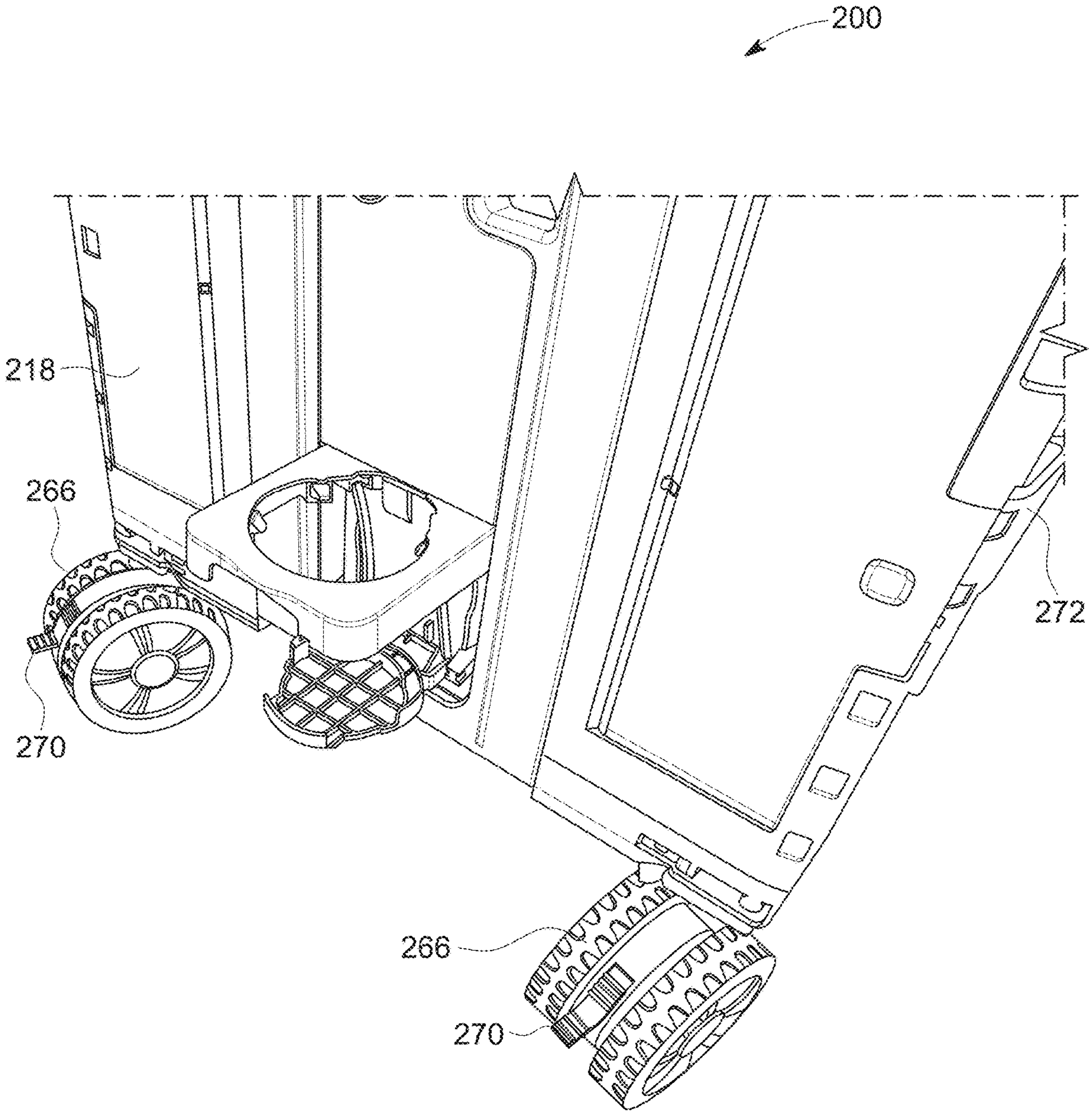
FIG. 46 is another partial perspective view of the collapsible cart of FIG. 30, illustrating a cupholder rotated into open position.
Figure 47:
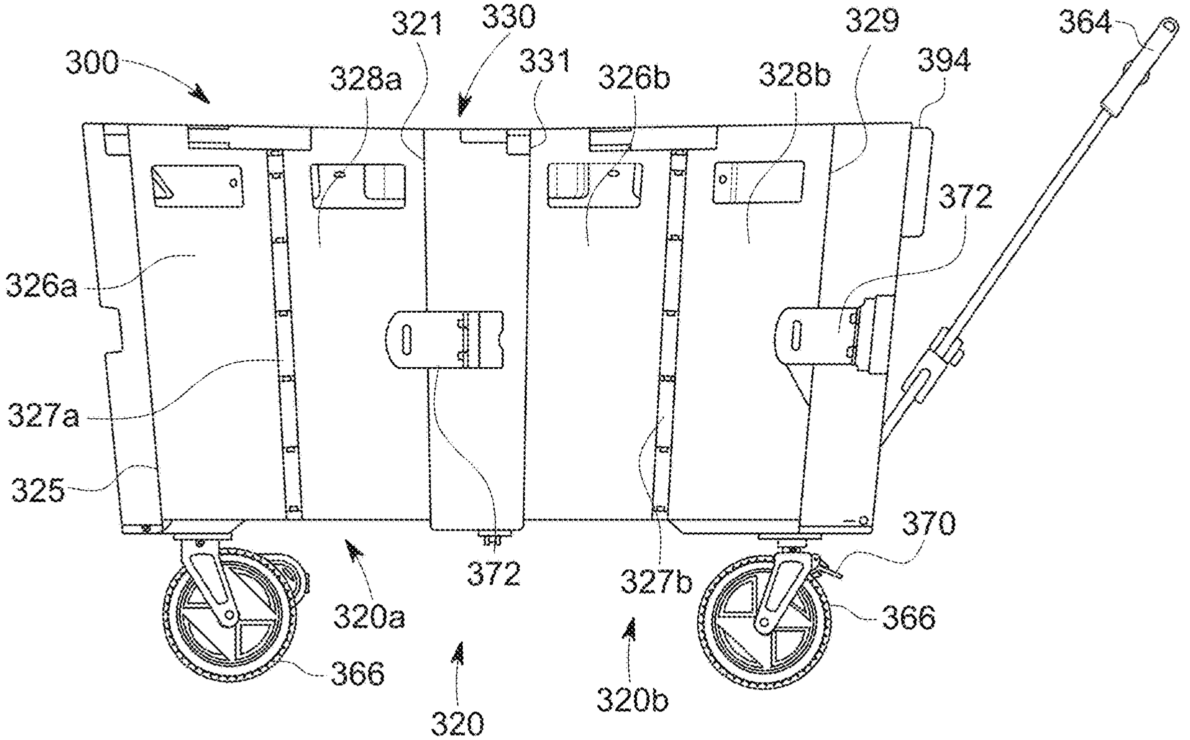
FIG. 47 is a side view of an embodiment of a motorized collapsible cart, according to an embodiment, illustrating the cart in an expanded position.
Figure 48:
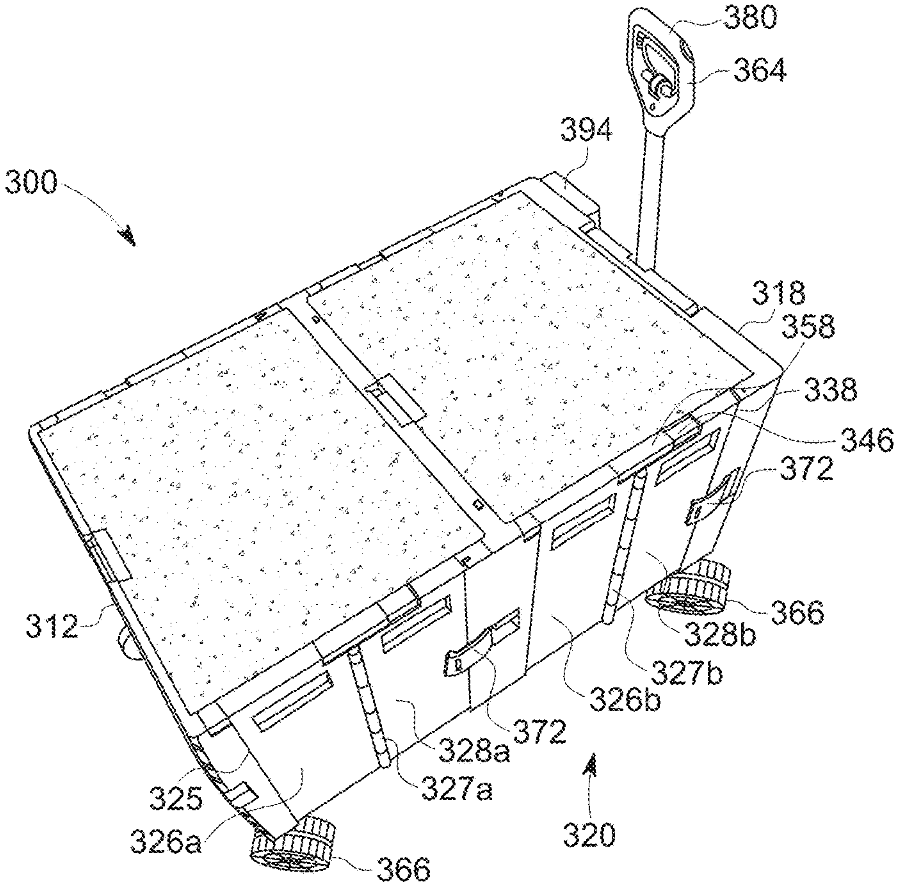
FIG. 48 is a perspective view of the motorized collapsible cart of FIG. 47, illustrating the expanded cart covered.
Figure 49:
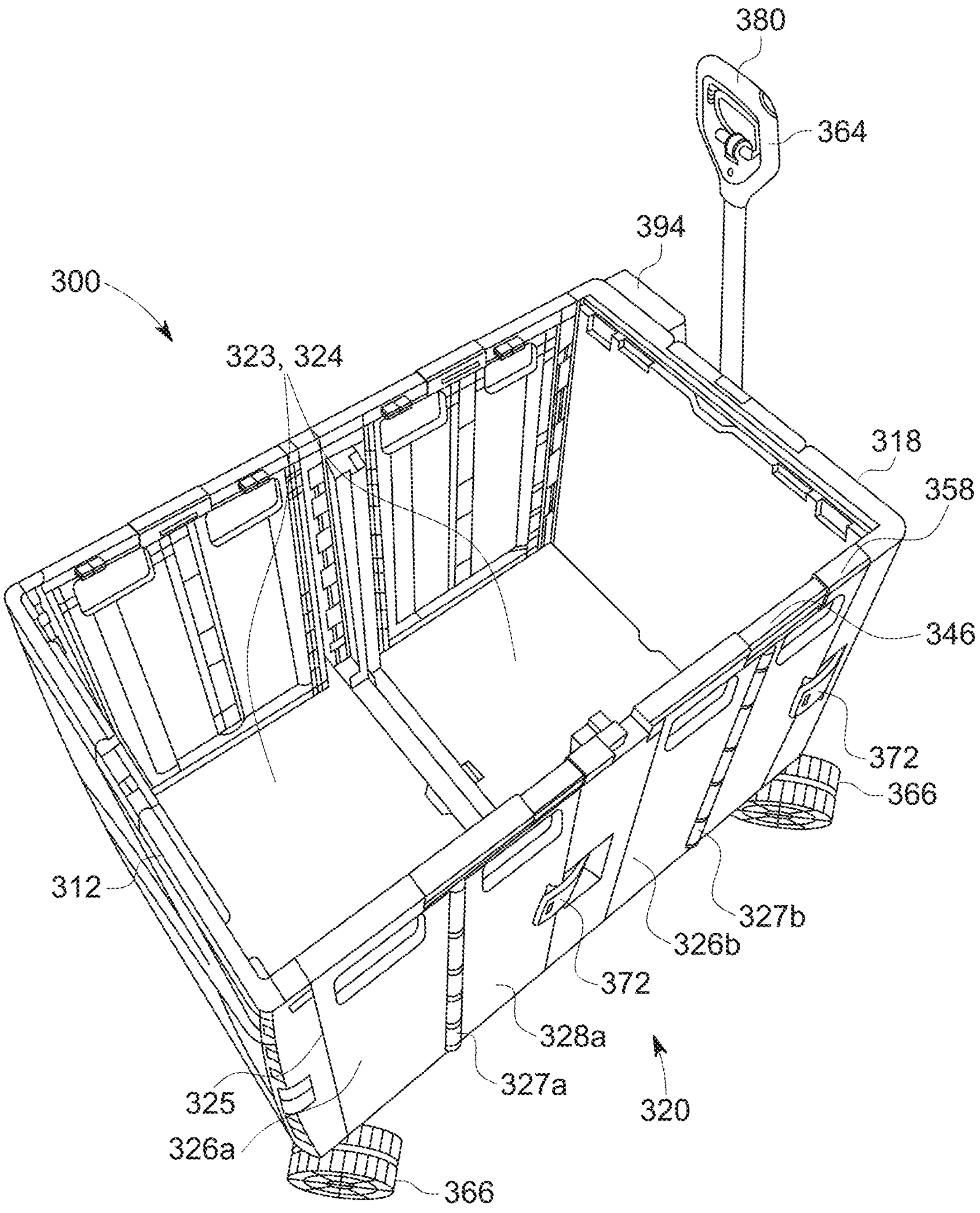
FIG. 49 is a perspective view of the motorized collapsible cart of FIG. 47, illustrating the expanded cart uncovered.
Figure 50:
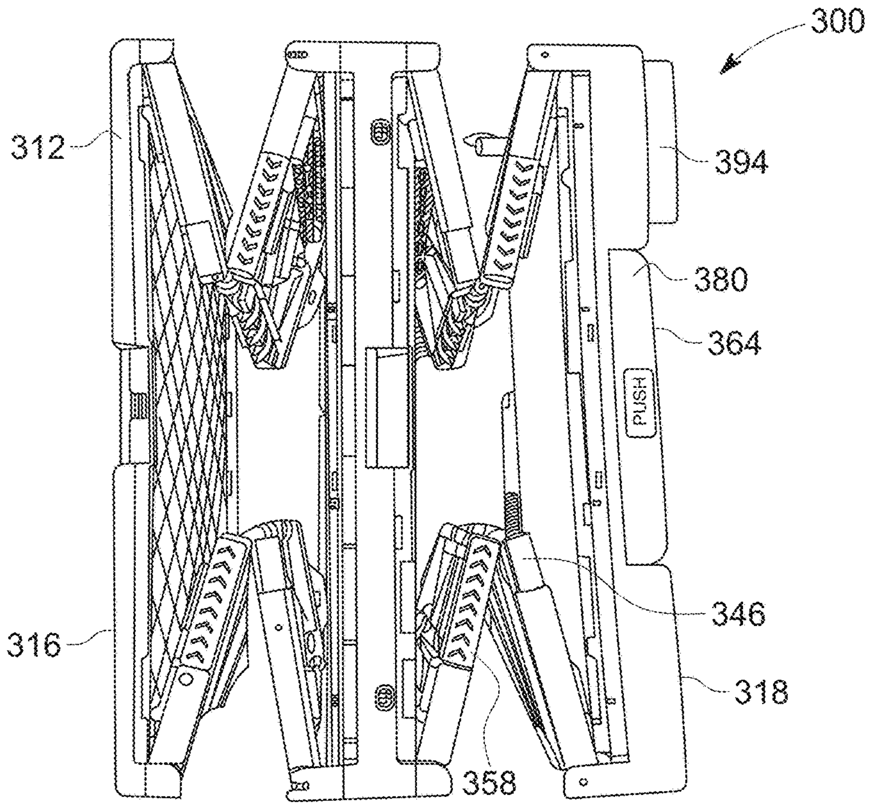
FIG. 50 is a top view of the motorized collapsible cart of FIG. 47, illustrating the cart partly expanded.
Figure 51:
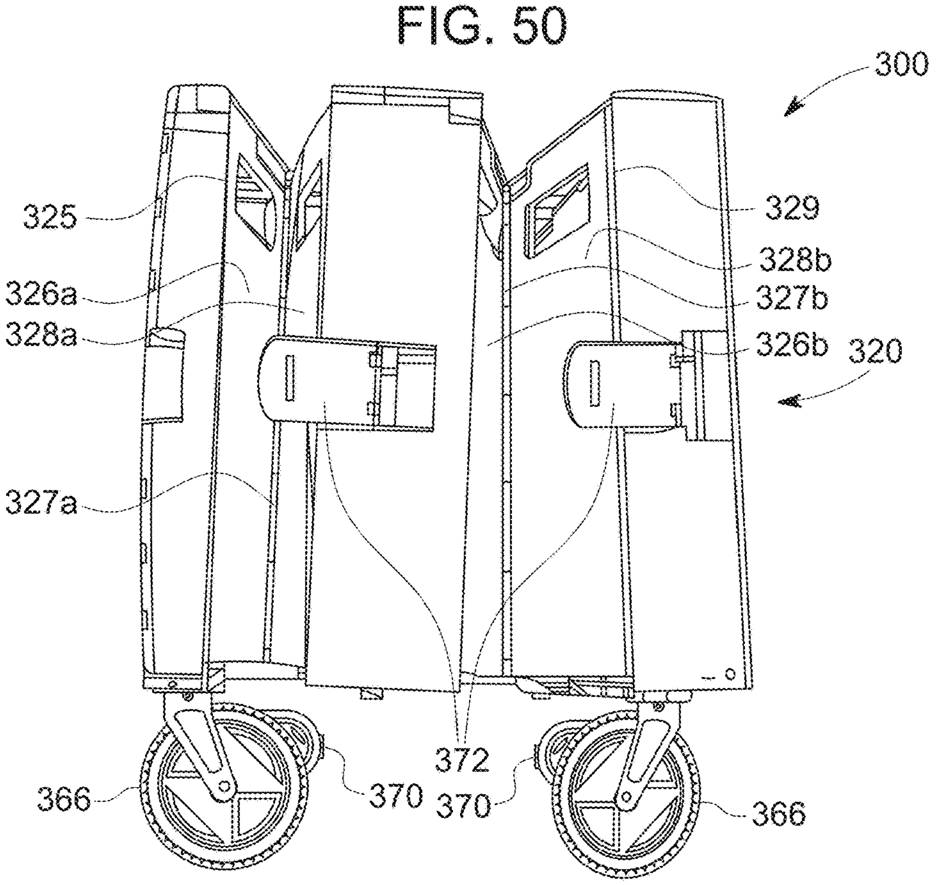
FIG. 51 is a side view of the motorized collapsible cart of FIG. 47, illustrating the cart partly expanded.
Figure 52:
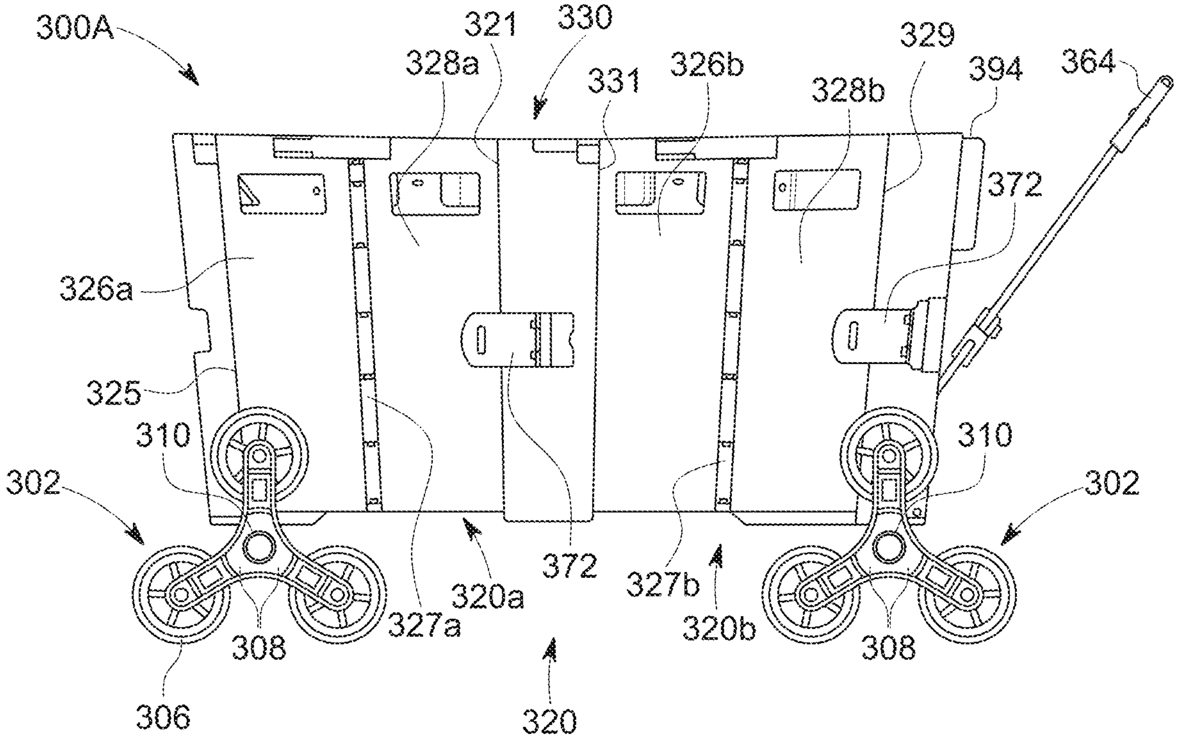
FIG. 52 is a side view of a motorized collapsible cart having three-wheel assemblies, according to an embodiment, illustrating the cart in an expanded position.
Figure 53:
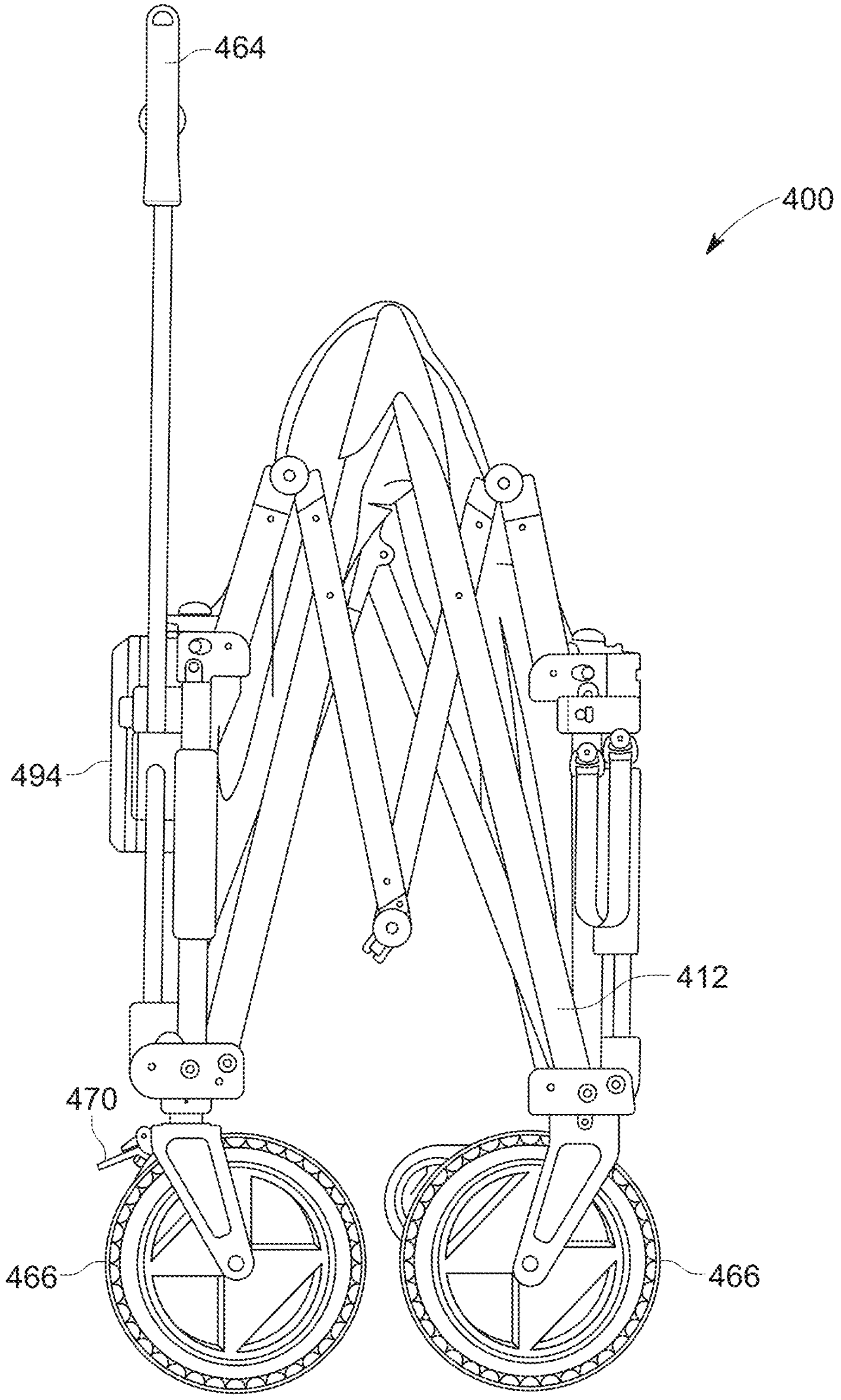
FIG. 53 is a side view of a motorized collapsible cart having soft sides, according to an embodiment, illustrating the cart in a collapsed position.
Figure 54:
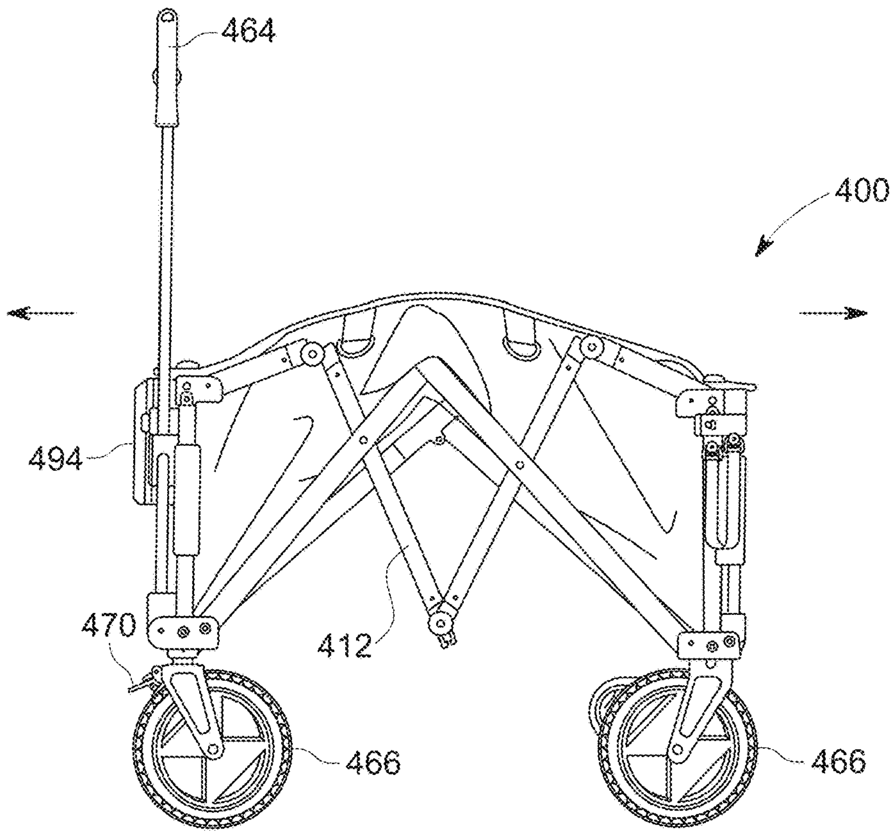
FIG. 54 is a side view of the motorized collapsible cart of FIG. 53, illustrating the cart in a partly expanded position.
Figure 55:
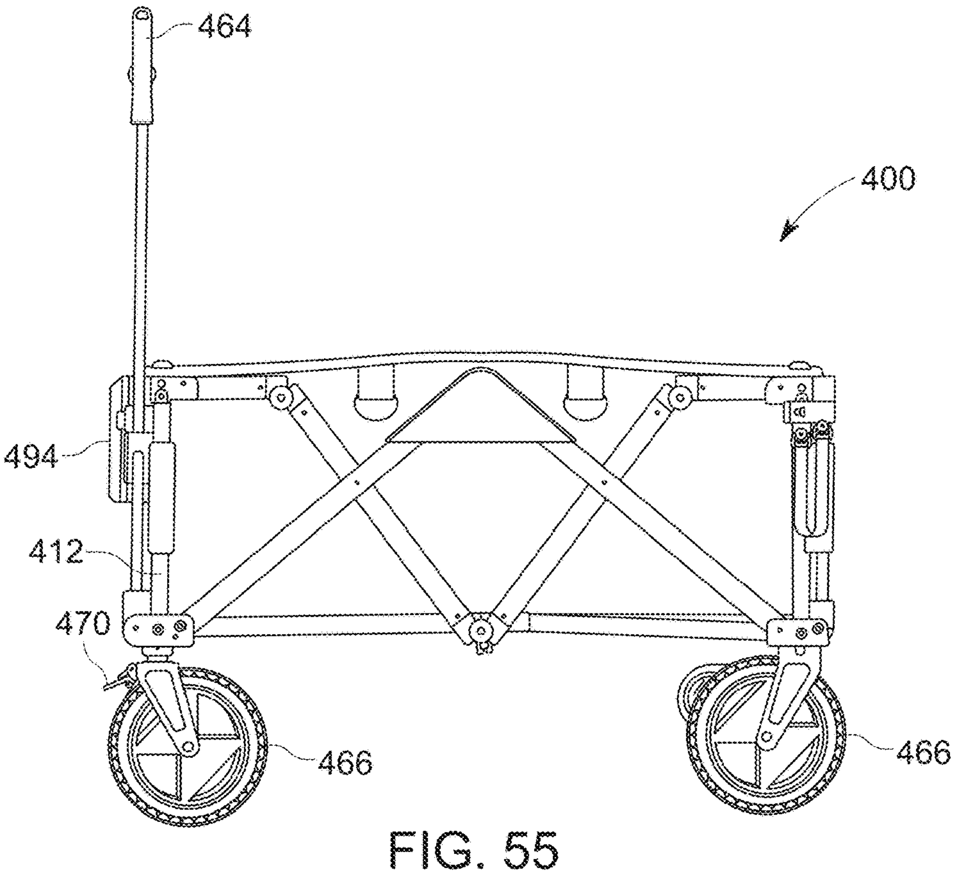
FIG. 55 is a side view of the motorized collapsible cart of FIG. 53, illustrating the cart in an expanded position.
Figure 56:
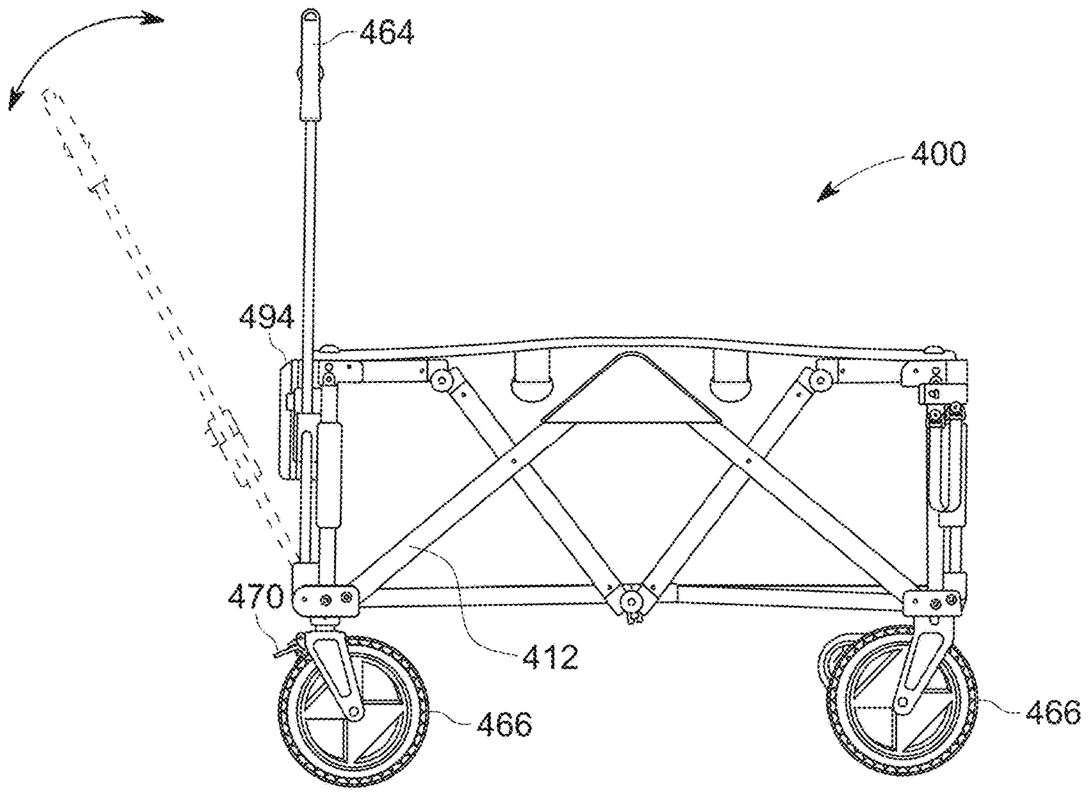
FIG. 56 is a side view of the motorized collapsible cart of FIG. 53, illustrating the cart's handle pivoting.

In a collapsible cart 200 according to some embodiments, as the one depicted in FIGS. 30-46, various additional features also may be added, such as one or more pivoting cupholders (as best illustrated in FIG. 44, closed, and FIG. 46, rotated open) and/or one or more pivoting pockets (as best illustrated in FIG. 44, with both pockets closed, and FIG. 45, with one pocket rotated open).

The panels, walls, and other suitable frame members of a collapsible cart 200 may be formed of molded rigid plastic, and such parts may include features to enhance their structural strength such as ribs 245. Various features described, and/or alternatives mentioned, above with respect to embodiments of collapsible carts 10 and 100 may be applied to variations of collapsible cart 200.

Figure 30:
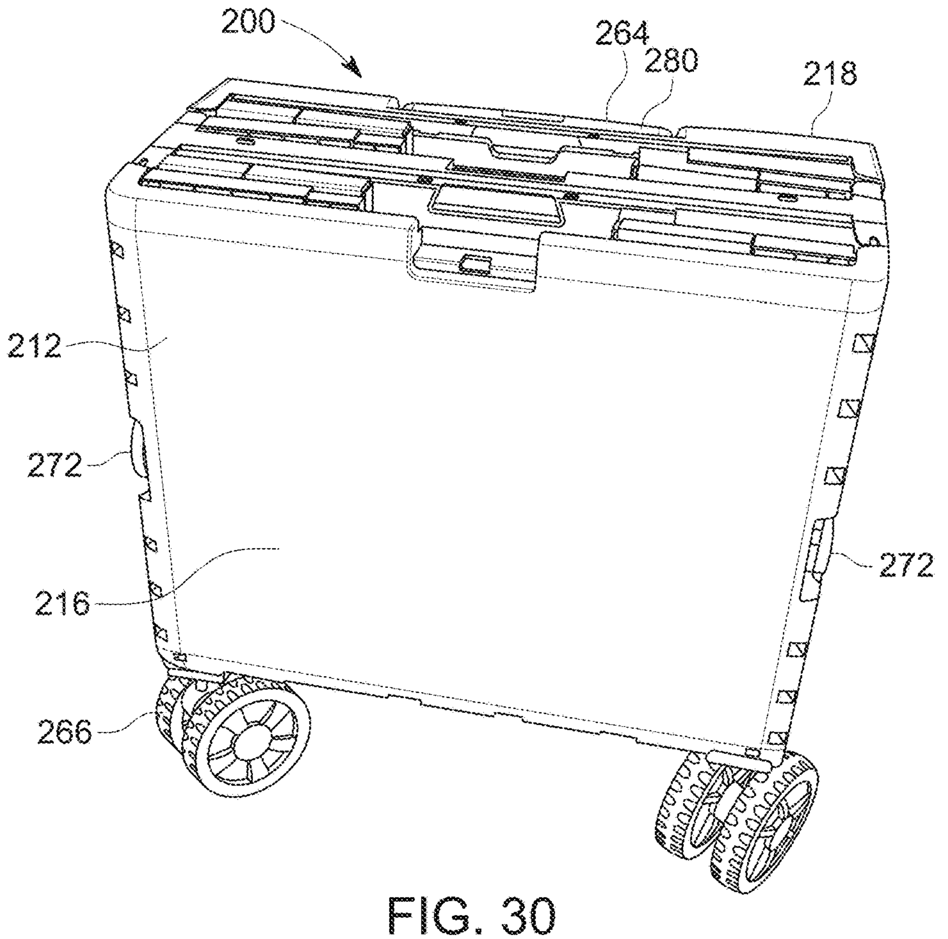
FIG. 30 is a perspective view of a collapsible cart, illustrated in a collapsed position, according to an embodiment.
Figure 31:
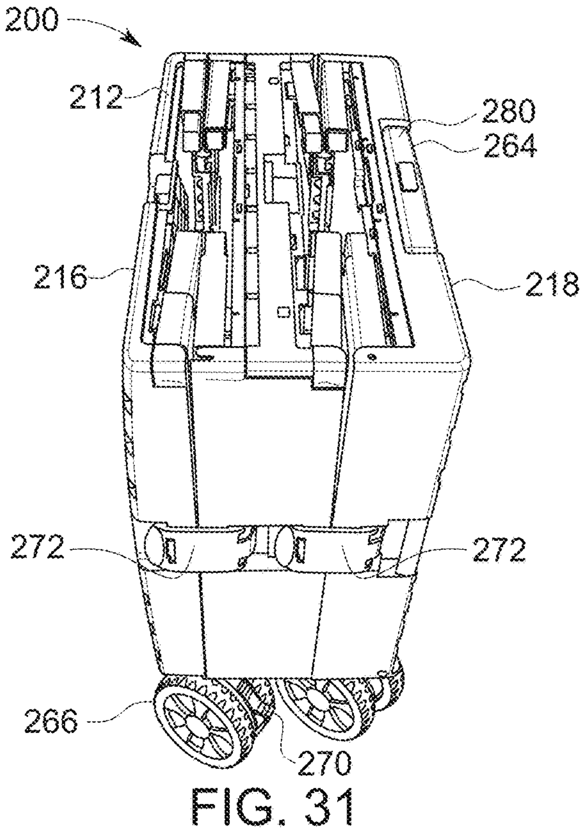
FIG. 31 is another perspective view of the collapsible cart of FIG. 30, illustrated in a collapsed position.
Figure 32:
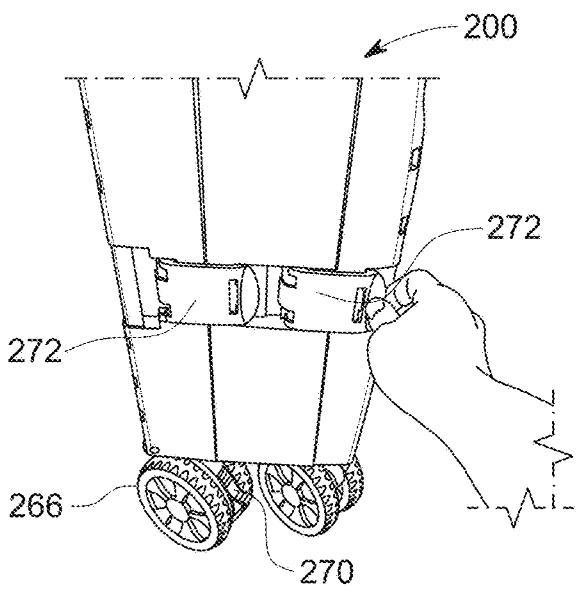
FIG. 32 is a partial perspective view of the collapsible cart of FIG. 30, illustrating the cart in a collapsed position and a user unlocking a clip.
Figure 33:
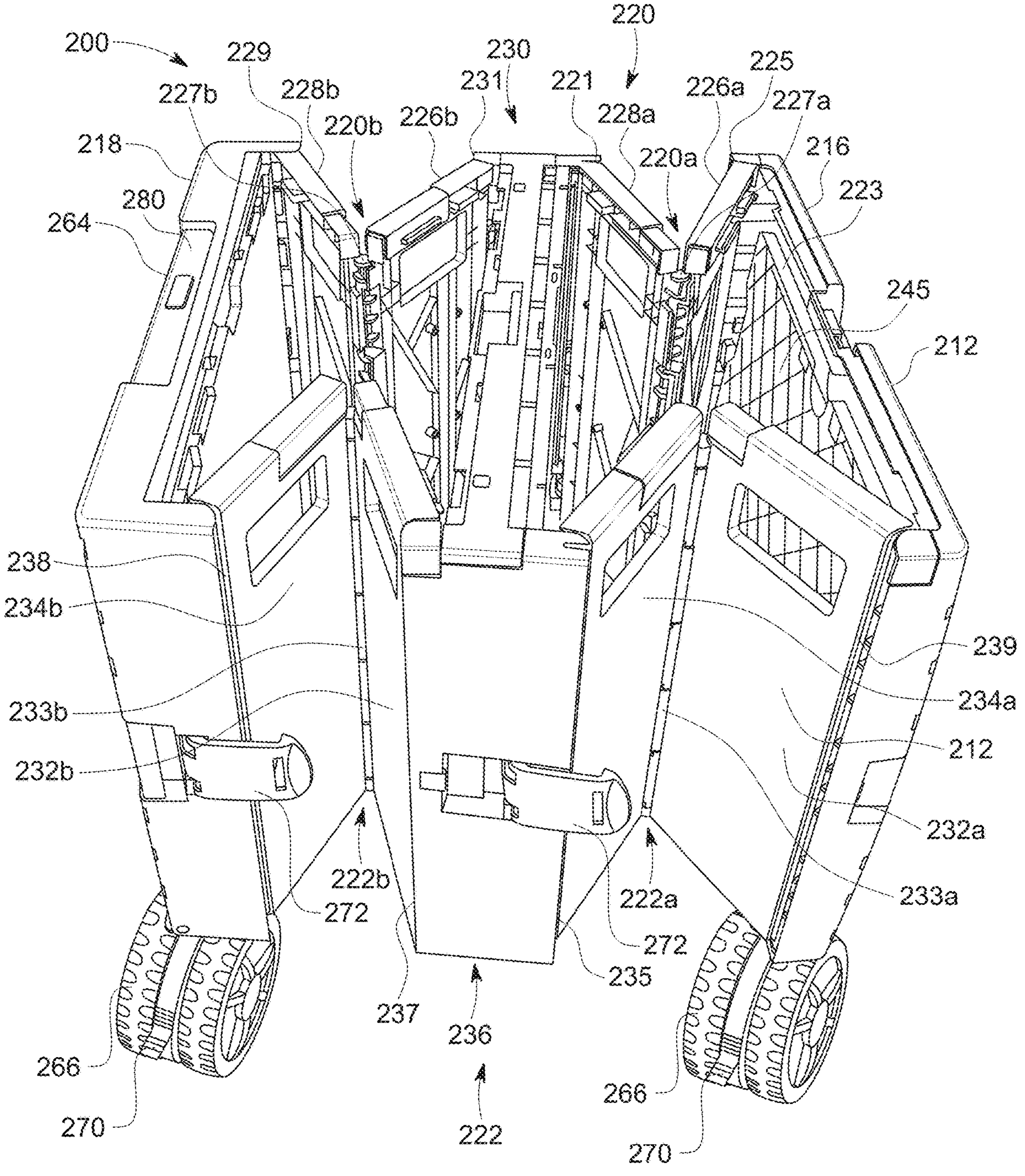
FIG. 33 is another perspective view of the collapsible cart of FIG. 30, illustrated with the clips unlocked and extended to a partially-expanded position.
Figure 34:
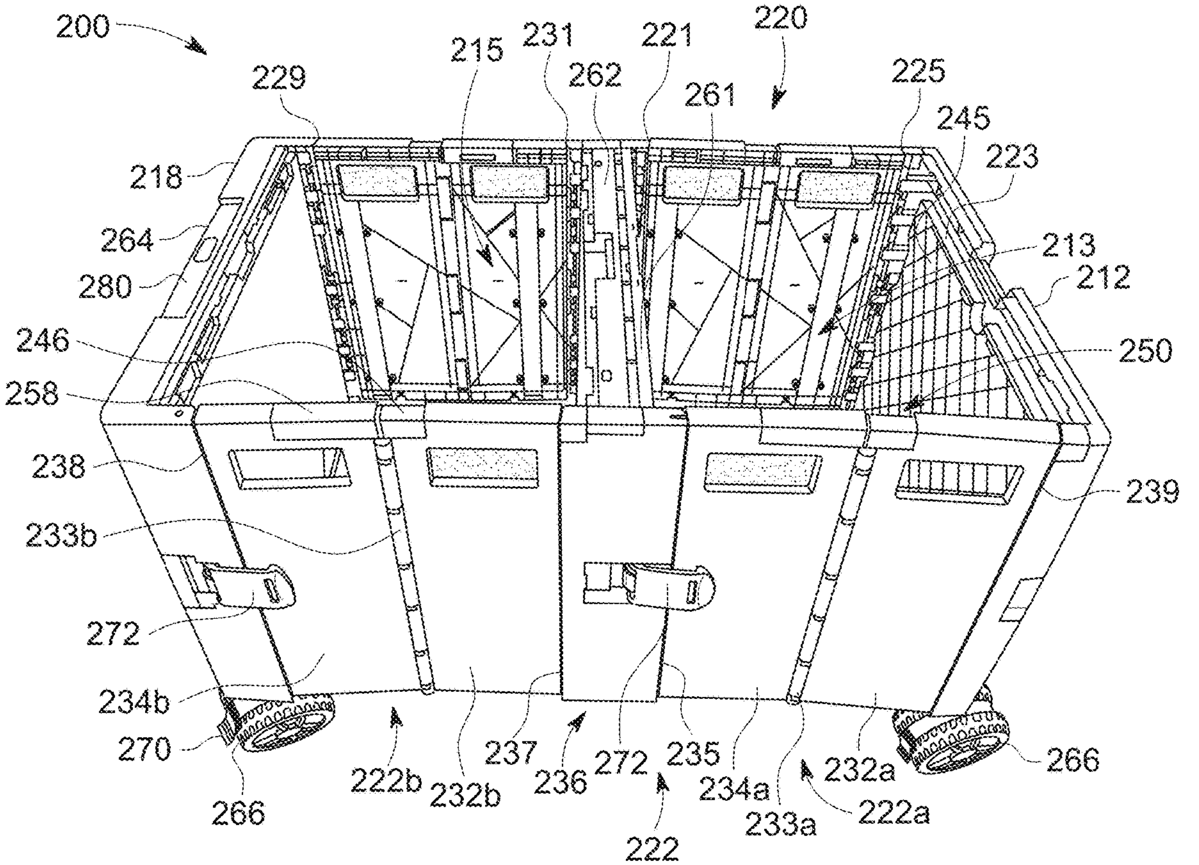
FIG. 34 is another perspective view of the collapsible cart of FIG. 30, illustrated in an expanded position.
Figure 35:
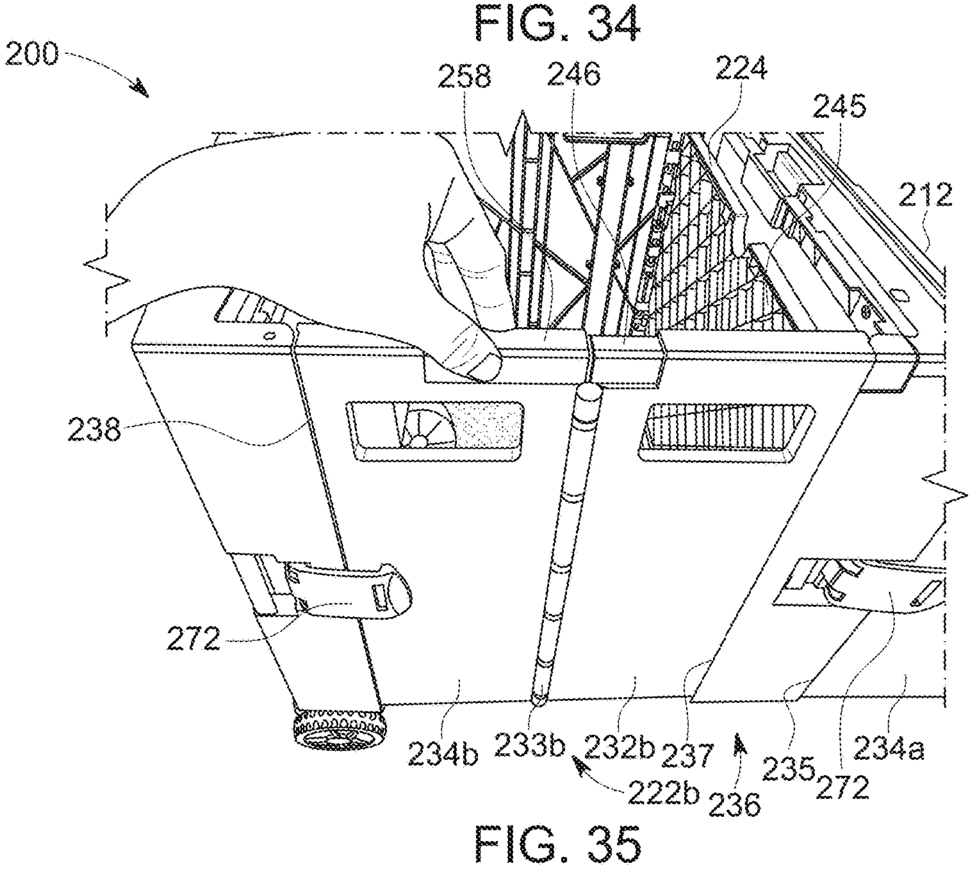
FIG. 35 is a partial perspective view of the collapsible cart of FIG. 30, illustrating a user beginning to slide a slidable member away from its open position.
Figure 36:
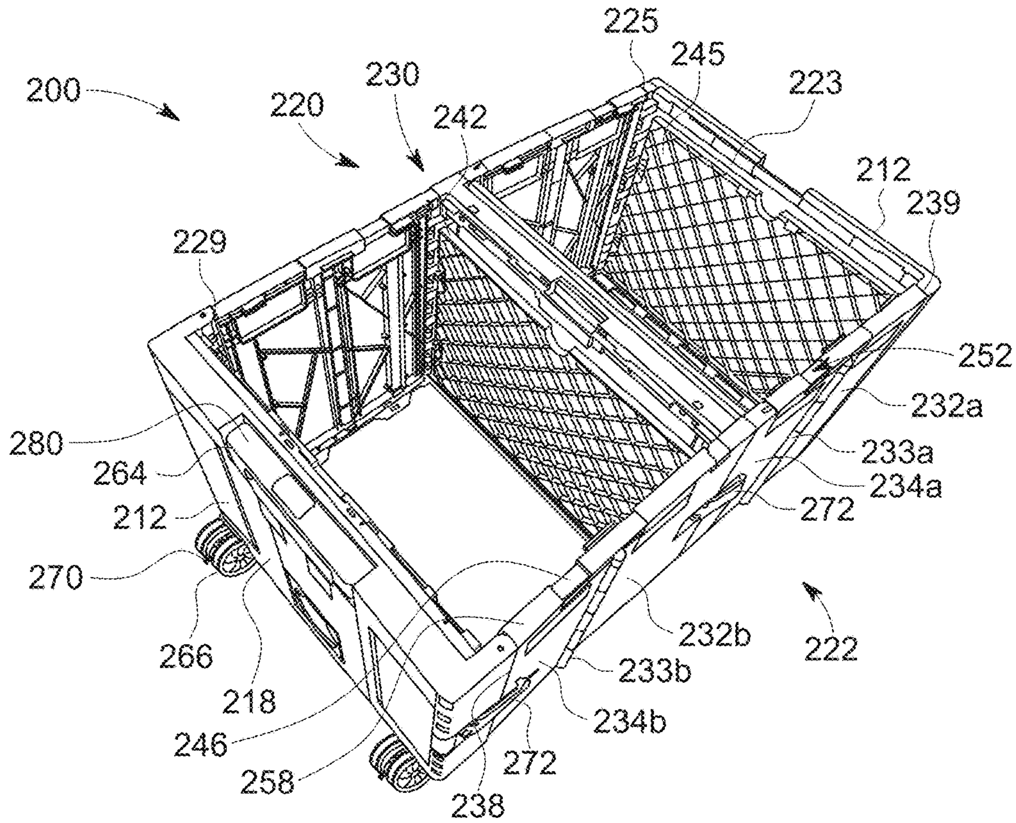
FIG. 36 is another perspective view of the collapsible cart of FIG. 30, illustrated in expanded position with four slidable members in locked position.
Figure 37:
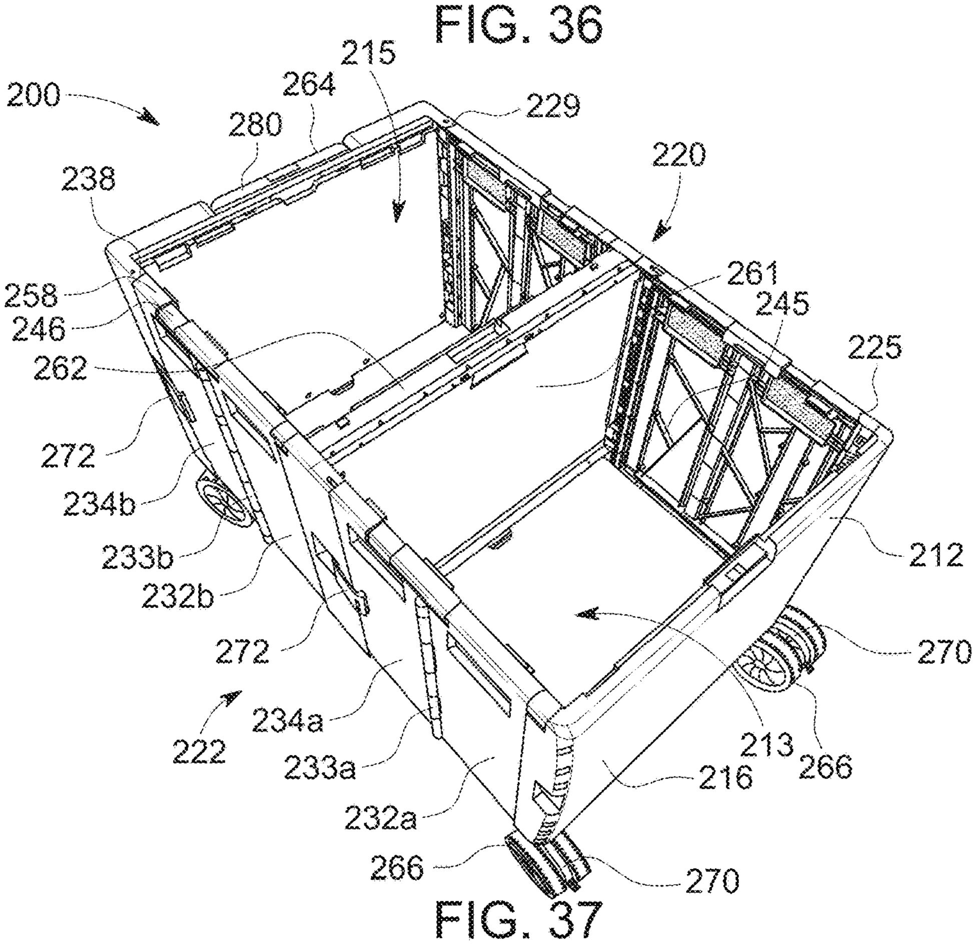
FIG. 37 is another perspective view of the collapsible cart of FIG. 30, illustrating the expanded cart with bottom wall panels rotated down into place at the bottom of the cart.
Figure 38:
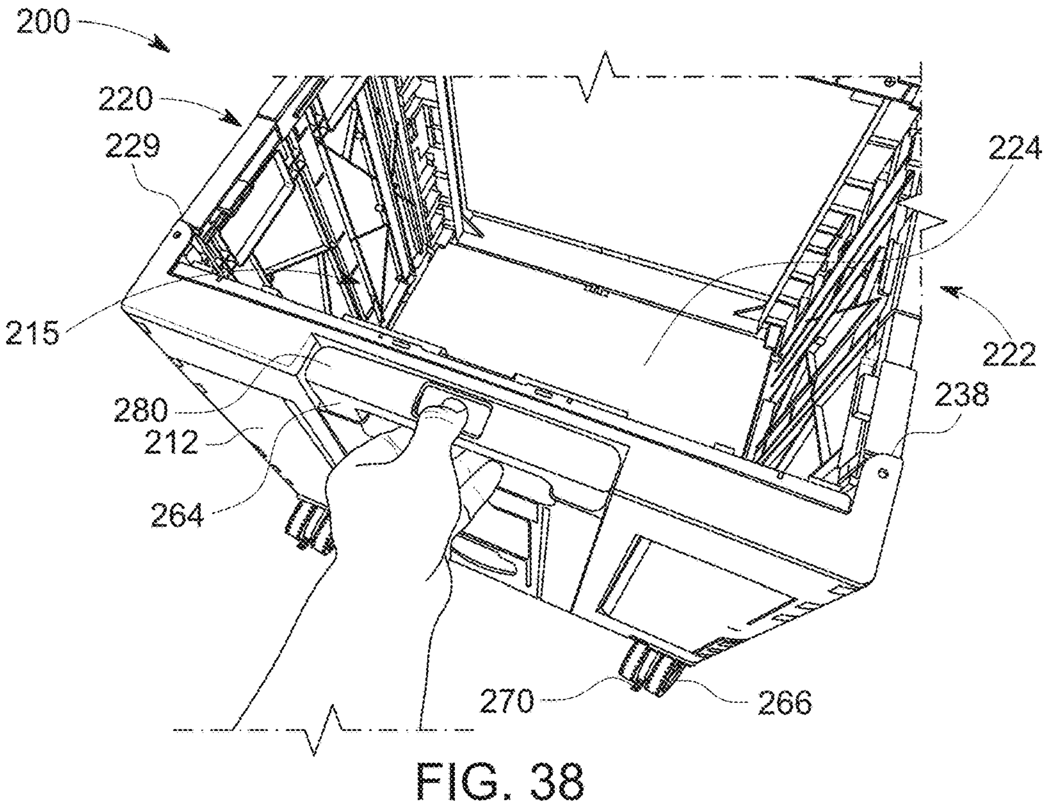
FIG. 38 is a partial perspective view of the collapsible cart of FIG. 30, illustrating a user pressing a button on a telescoping handle to allow the handle to extend.
Figure 39:
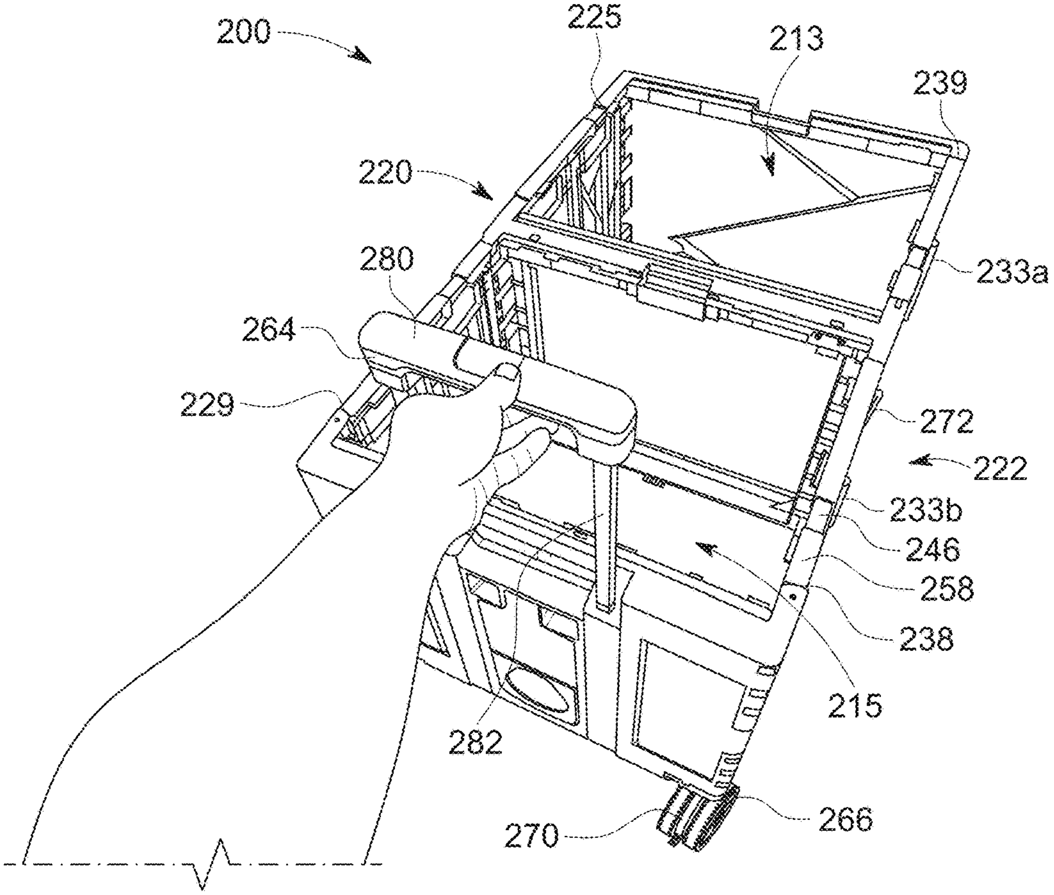
FIG. 39 is another perspective view of the collapsible cart of FIG. 30, illustrating the handle extended.

In operation, a collapsible cart 200 of the embodiment depicted in FIGS. 30-43 may be transitioned from a collapsed position to an expanded position forming partitioned interior compartments 213 and 215 (as illustrated in FIG. 37-39 and 43) or a combined interior compartment 214 (as illustrated in FIG. 41). In the collapsed position (as illustrated in FIGS. 30-32), a user may unlock all four clips 272 (as illustrated in FIG. 32) to allow expansion (as illustrated in FIG. 33) of the collapsible portions 220*a*, 220*b*, 222*a*, and 222*b* of the right sidewall 220 and left sidewall 222. (In some embodiments, tolerances may be such that it can be helpful or even necessary that a user push outwardly on the interior of sidewalls 220 and 222 to perform this expansion). As illustrated in the transition from FIG. 35 to FIG. 36, once the sidewalls 220 and 222 reach a fully-expanded position (FIG. 35), each of the slidable members 258 may then be moved along their respective tracks 246 from their respective open positions 250 to their respective locked positions 252 (FIG. 36), securing the sidewalls 220 and 222 of the collapsible cart 200 in their expanded position, with the right collapsible portions 220*a* and 220*b* secured generally coplanar with each other and the left collapsible portions 222*a* and 222*b* secured generally coplanar with each other. As illustrated in the transition from FIG. 36 to FIG. 37, also once the sidewalls 220 and 222 reach a fully-expanded position (as in any of FIGS. 34-36), the bottom panels 223 and 224 can be pushed downwardly (or drop down freely on their own) until they rest upon and/or engage corresponding features as mentioned above, whereupon the bottom panels 223 and 224 may act to stabilize and hinder the collapsible cart 200 from collapsing. Various embodiments of a collapsible cart 200 may be respectively configured such that this step of positioning the bottom panels 223 and 224 may (or must) be performed either before, in tandem with, or after the step of locking of slidable members 258 described above. Finally, one or both (as illustrated in FIG. 40) of the cover panels 261 and 262, which may be adapted to lay against or be secured to the front wall 216, rear wall 218, and/or between the interstitial members 230 and 236, may if desired be unlatched and placed atop the cart.

In some embodiments, the bottom wall panels and/or cover panels (if present) may further be adapted to reside in or on the collapsible cart while the cart is in the collapsed (or a partly-expanded) position; such adapted cover panels in some embodiments may further be adapted to selectively (at a user's discretion, as desired) be left or otherwise placed in the cart even while the cart is in the expanded position, so as to partition the space between the front and rear walls into multiple compartments (for example, two) instead of a single combined compartment. The collapsible cart, secured in the expanded position, may be used to roll about on its wheels and transport items with or without one or both of the cover panels placed over the interior compartments, as desired.

In a collapsible cart 300 or 400, the cart may be motorized and may have rigid or soft sides or a combination of rigid and soft sides. Further, in some embodiments, collapsible cart 300 or 400 may include a handle that is operably connected to one or more steerable wheel assemblies and/or incorporates manual controls governing steering and/or power.

In a motorized collapsible cart 300 according to some embodiments, as the ones depicted in FIGS. 47-52, the frame 312 may be constructed similarly to frame 12 of the collapsible carts 10 or 100 described above with respect to FIGS. 1-29, or (as the embodiment depicted in FIGS. 47-52, with reference numbers generally corresponding but starting with a 3 instead of a 2) similarly to frame 212 of the collapsible cart 200 described above with respect to FIGS. 30-46, may comprise a battery 394 connected to an electric motor that drives one or more wheel assemblies. Wheels may for example comprise two pairs of single wheels 366, or as in the motorized collapsible cart 300A illustrated in FIG. 52, two pairs of three-wheel assemblies 302 having wheels 306 on spokes 308 and axles 310 (or as another example, not shown, one pair of single wheels and a second pair of three-wheel assemblies).

Figure 57:
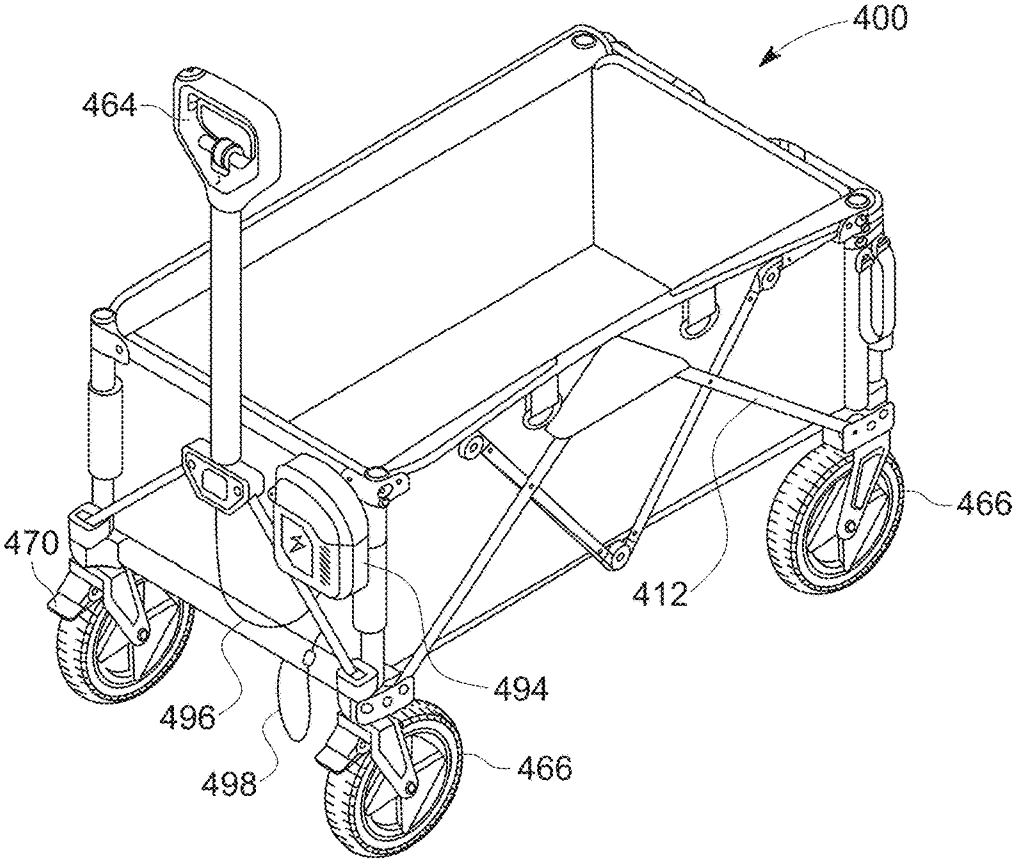
FIG. 57 is a perspective view of the motorized collapsible cart of FIG. 53, illustrating the cart in an expanded position and showing electrical power/control lines connecting a battery to a handle and motor.
Figure 58:
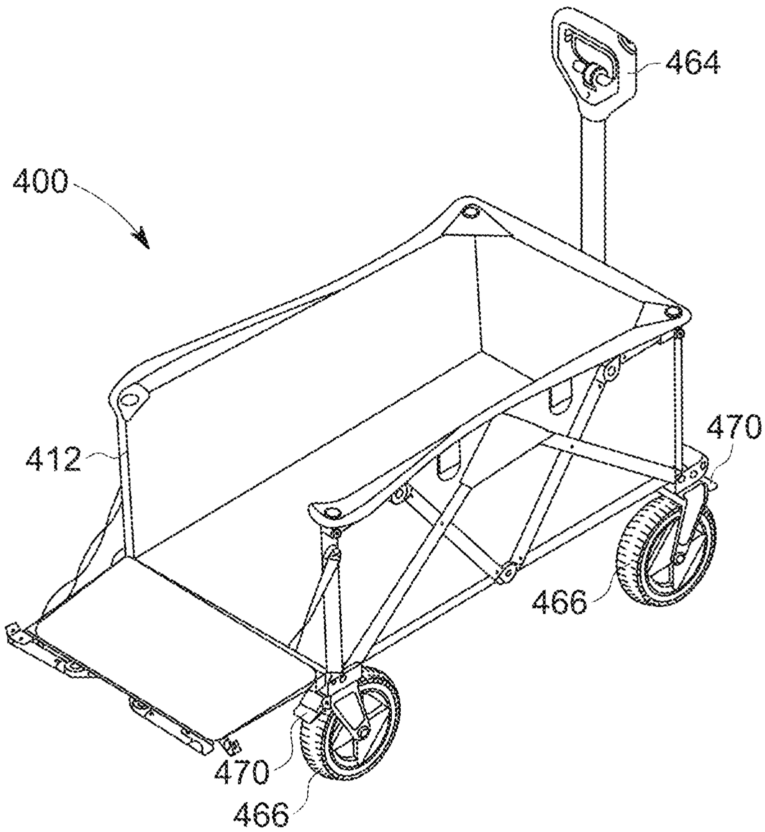
FIG. 58 is a perspective view of the motorized collapsible cart of FIG. 53, illustrating the front wall of the expanded cart folded out.
Figure 59:
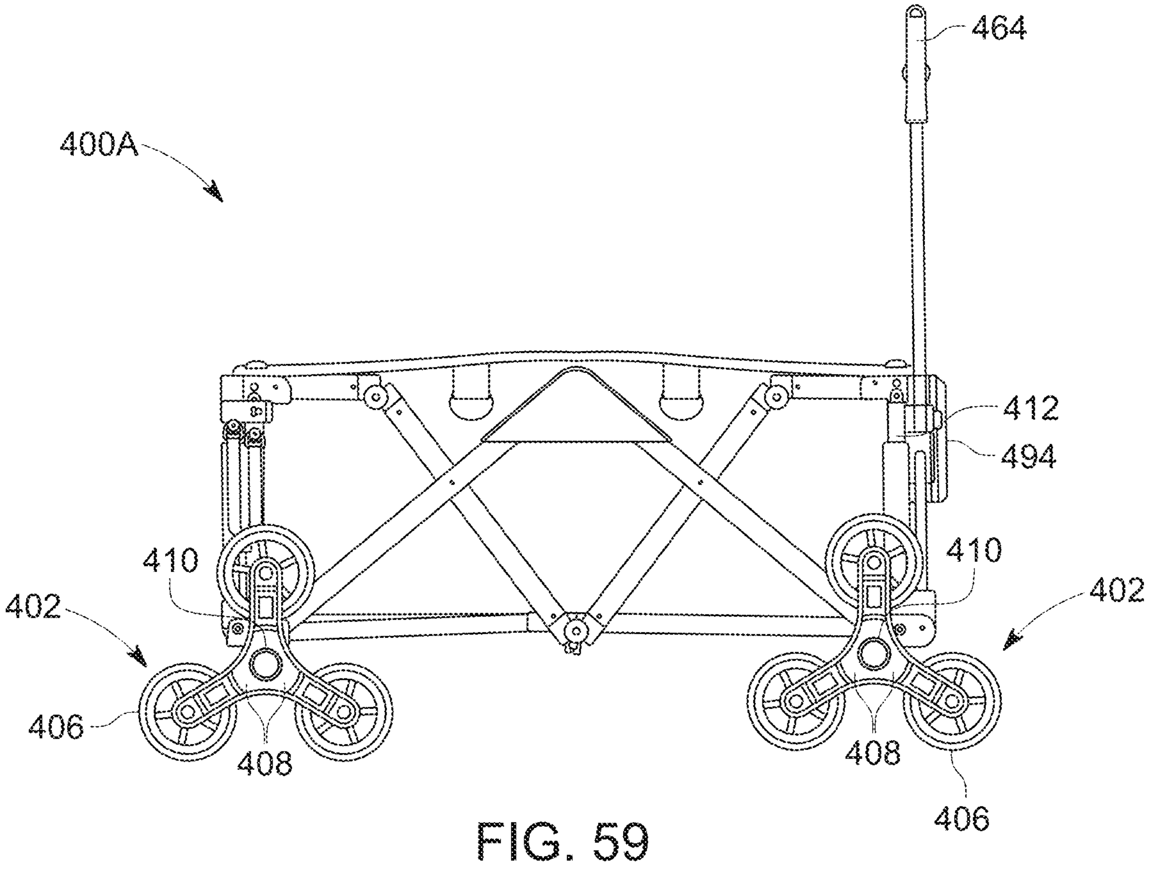
FIG. 59 is side view of an embodiment of motorized collapsible cart having three-wheel assemblies, according to an embodiment.
Figure 60:
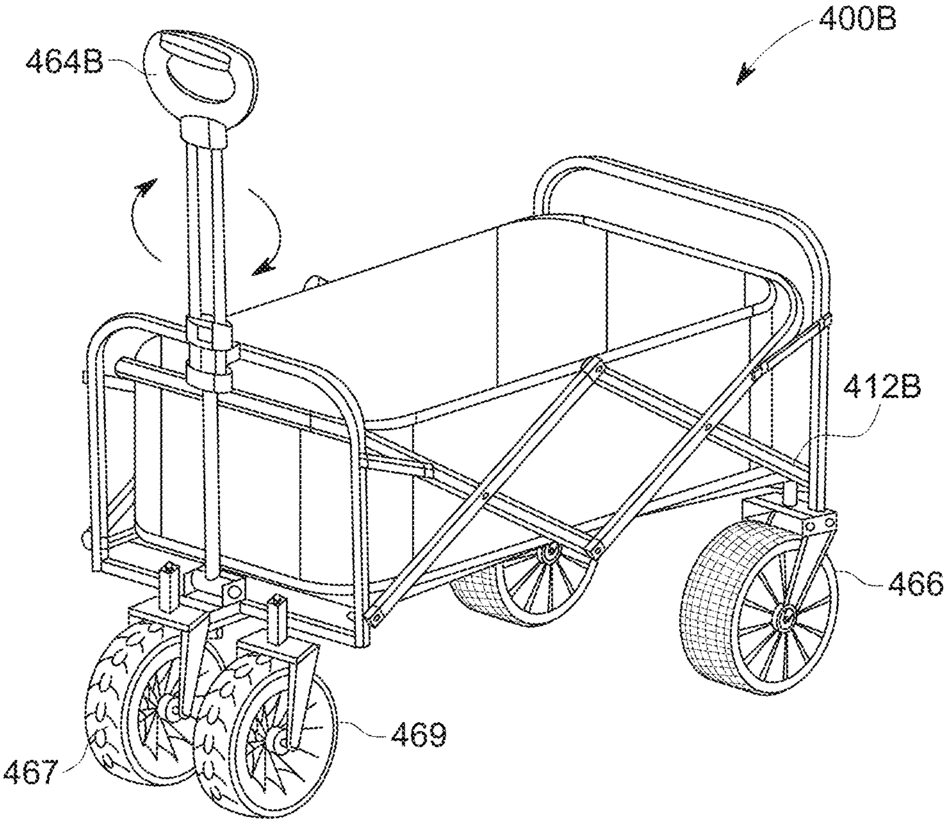
FIG. 60 is a perspective view of a steerable motorized collapsible cart, according to an embodiment, illustrating a central rear wheel connected to a handle assembly, and an offset rear wheel.

In a motorized collapsible cart according to some embodiments, such as the motorized collapsible cart 400 depicted in FIGS. 53-58, or the motorized collapsible carts 400A and 400B respectively depicted in FIGS. 59 and 60, a frame 412 (or 412B) may instead comprise a plurality of rigid scissoring lattice members fitted with soft side walls made, for example, of a suitable strong, durable, and weather-resistant fabric material. In some embodiments, the motorized collapsible cart may include a handle 464 (as illustrated in FIGS. 53-59) or a handle 464B (as illustrated in FIG. 60) that is operably connected to one or more steerable wheel assemblies and/or incorporates manual controls governing steering and/or power, with electrical power/control lines 496 and 498 (as illustrated in FIG. 57) connecting the wheels, handle, and a battery 494. Suitable wheel assemblies for such motorized collapsible carts include but are not limited to single wheels 466 (as illustrated in FIGS. 53-58) and three-wheel assemblies (for example, four sets, as illustrated in FIG. 59; or as another example, three-wheel assemblies at the rear and single wheels at the front), and/or may include a central steerable rear wheel 467 and/or an offset rear wheel 469 (as illustrated in FIG. 60). Various embodiments of such motorized collapsible carts also may be adapted to include other features, for example (as illustrated in FIG. 58) a drop-down front gate, and/or (as illustrated in FIG. 60) reinforcing front and rear bars and heavy-duty lattice members and wheels.

Although the various inventive aspects are herein disclosed in the context of certain preferred embodiments, implementations, and examples, it will be understood by those skilled in the art that the present invention extends beyond the specifically disclosed embodiments to other alternative embodiments and/or uses of the invention and obvious modifications and equivalents thereof. In addition, while a number of variations of the inventive aspects have been shown and described in detail, other modifications, which are within their scope will be readily apparent to those of skill in the art based upon this disclosure. It should be also understood that the scope this disclosure includes the various combinations or sub-combinations of the specific features and aspects of the embodiments disclosed herein, such that the various features, modes of implementation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this disclosure is not be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

Further, all claim terms should be interpreted in their most expansive forms so as to afford the applicant the broadest coverage legally permissible. Although the embodiments have been described with reference to the drawings and specific examples, it will readily be appreciated by those skilled in the art that many modifications and adaptations of the processes, methods and apparatuses described herein are possible without departure from the spirit and scope of the embodiments as claimed herein. This description is made only by way of example and not as a limitation on the scope of the embodiments as claimed below.

What is claimed is:

1. A motorized collapsible cart with a compartment foldable between an open condition forming a compartment and a closed condition, the motorized collapsible cart comprising:
- a foldable frame having a bottom assembly, a front assembly, a rear assembly, and two side assemblies, each of the side assemblies comprising:
  - a front section having a frontmost extent and a rearmost extent, the front section being pivotally coupled at its frontmost extent to the front assembly;
  - a rear section having a frontmost extent and a rearmost extent, the rear section being pivotally coupled at its rearmost extent to the rear assembly; and
  - a central section longitudinally defined between a first pivotal connection at the rearmost extent of the front section and a second pivotal connection at the frontmost extent of the rear section, the central section comprising a rigid member extending vertically and from the front section to the rear section;
- a battery;
- a first electrical line connected to the battery;
- a plurality of wheel assemblies, one or more of which is motor-driven and powered by the first electrical line; and
- a handle pivotally coupled to the front assembly of the motorized collapsible cart
  - wherein in the open condition, the front assembly and rear assembly extend upwardly from opposite ends of the bottom assembly, each side assembly extends upwardly between the front and rear assemblies along a respective lateral edge of the bottom assembly, such that the foldable frame defines an open-topped compartment; and
  - wherein in the closed condition, the front assembly, rear assembly, and side assemblies are folded inwardly toward each other, thereby forming a compact structure for storage or transport.

2. The motorized collapsible cart of claim 1, further comprising a front-facing housing, the battery disposed within the front-facing housing.

3. The motorized collapsible cart of claim 2, further comprising a second electrical line connecting the battery to the handle.

4. The motorized collapsible cart of claim 1, wherein one or more of the plurality of wheel assemblies includes a lock.

5. The motorized collapsible cart of claim 1, wherein the plurality of wheel assemblies comprises one or more pairs of tri-star wheel assemblies.

6. The motorized collapsible cart of claim 1, wherein the plurality of wheel assemblies includes a central front wheel assembly.

7. The motorized collapsible cart of claim 6, wherein the plurality of wheel assemblies further includes an offset front wheel assembly.

8. The motorized collapsible cart of claim 7, wherein the central front wheel assembly is swivelable.

9. The motorized collapsible cart of claim 8, wherein the direction of the central front wheel assembly is controllable by user interaction with the handle.

10. The motorized collapsible cart of claim 9, wherein the direction of the central front wheel assembly is controllable by user interaction with buttons on the handle.

11. The motorized collapsible cart of claim 10, wherein the handle is rotatable and the direction of the central front wheel assembly is controllable by manual rotation of the handle.

12. The motorized collapsible cart of claim 1, wherein the handle is telescoping and pivotally coupled to the front assembly.

13. The motorized collapsible cart of claim 1, further comprising a horizontal crossbar connecting the respective central sections of the side assemblies.

14. The motorized collapsible cart of claim 1, wherein the bottom assembly is pivotally coupled to the front assembly.

15. The motorized collapsible cart of claim 1, wherein the side assemblies are adapted to receive a partition extending vertically between the respective central sections of the side assemblies.

16. A motorized collapsible cart with a compartment foldable between an open condition forming a compartment and a closed condition, the motorized collapsible cart comprising:
- a foldable frame having a first, second, third, fourth, and fifth assemblies, wherein the third and fourth assembles are each rigid, adapted to fold laterally inwardly, and comprise:
  - a front section having a frontmost extent and a rearmost extent, the front section being pivotally coupled at its frontmost extent to the first assembly;
  - a rear section having a frontmost extent and a rearmost extent, the rear section being pivotally coupled at its rearmost extent to the second assembly; and
  - a central section longitudinally defined between a first pivotal connection at the rearmost extent of the front section and a second pivotal connection at the frontmost extent of the rear section, the central section comprising a rigid member extending vertically and from the front section to the rear section;
- a battery;
- a first electrical line connected to the battery;
- a plurality of wheel assemblies, one or more of which is motor-driven and powered by the first electrical line;
- a handle connected to the first assembly of the motorized collapsible cart; and
- a second electrical line connecting the battery to the handle.

17. The motorized collapsible cart of claim 16, further comprising a horizontal crossbar connecting the respective central sections of the third and fourth assemblies.

18. The motorized collapsible cart of claim 16, wherein the third and fourth assemblies are adapted to receive a partition extending vertically between the respective central sections of the third and fourth assemblies.

19. The motorized collapsible cart of claim 16, wherein:

in the open condition, the first assembly and second assembly extend upwardly from opposite ends of the fifth assembly, the third and fourth assemblies extend upwardly between the first and second assemblies along a respective lateral edge of the fifth assembly, such that the foldable frame defines an open-topped compartment; and in the closed condition, the first, second, third, and fourth assemblies are folded inwardly toward each other, thereby forming a compact structure for storage or transport.

20. The motorized collapsible cart of claim 16, wherein the plurality of wheel assemblies comprises one or more pairs of tri-star wheel assemblies.

21. A collapsible motorized cart with a compartment foldable between an open condition forming a compartment and a closed condition, the motorized collapsible cart comprising:

a foldable frame having a bottom member, a front member, a rear member, and two side members, each side member comprising:

a front section having a frontmost extent and a rearmost extent, the front section being pivotally coupled at its frontmost extent to the front member;

a rear section having a frontmost extent and a rearmost extent, the rear section being pivotally coupled at its rearmost extent to the rear member; and a central section longitudinally defined between a first pivotal connection at the rearmost extent of the front section and a second pivotal connection at the frontmost extent of the rear section, the central section comprising a rigid member that extends vertically;

wherein in the closed condition, the front member, rear member, and side members are folded inwardly toward each other;

a battery;

a first electrical line connected to the battery;

a plurality of wheel assemblies, one or more of which is motor-driven and powered by the first electrical line;

a handle connected to the rear of the motorized collapsible cart; and a second electrical line connecting the battery to the handle.

22. The motorized collapsible cart of claim 21, wherein:

in the open condition, the front member and rear member extend upwardly from opposite ends of the bottom member, each side member extends upwardly between the front and rear members along a respective lateral edge of the bottom member, such that the foldable frame defines an open-topped compartment.

23. The motorized collapsible cart of claim 21, wherein the plurality of wheel assemblies comprises one or more pairs of stair-climbing wheel assemblies.

* * * * *